(12) United States Patent
Gideon, III

(10) Patent No.: US 12,067,612 B2
(45) Date of Patent: Aug. 20, 2024

(54) SYSTEMS, DEVICES, AND METHODS FOR EMERGENCY RESPONSES AND SAFETY

(71) Applicant: Intrinsic Value, LLC, Nashville, TN (US)

(72) Inventor: Clarence J. Gideon, III, Nashville, TN (US)

(73) Assignee: Intrinsic Value, LLC, Nashville, TN (US)

( * ) Notice: Subject to any disclaimer, the term of this patent is extended or adjusted under 35 U.S.C. 154(b) by 298 days.

(21) Appl. No.: 17/177,930

(22) Filed: Feb. 17, 2021

(65) Prior Publication Data

US 2021/0166303 A1 Jun. 3, 2021

Related U.S. Application Data

(63) Continuation-in-part of application No. 15/977,457, filed on May 11, 2018, now Pat. No. 10,970,948,
(Continued)

(51) Int. Cl.
*G06Q 30/06* (2012.01)
*G06Q 20/40* (2012.01)
(Continued)

(52) U.S. Cl.
CPC ....... *G06Q 30/0645* (2013.01); *G06Q 20/401* (2013.01); *G07B 15/02* (2013.01); *G07C 9/00309* (2013.01); *G07C 9/00571* (2013.01)

(58) Field of Classification Search
None
See application file for complete search history.

(56) References Cited

U.S. PATENT DOCUMENTS 7,366,677 B1 * 4/2008 Liu ................. G06Q 10/02
709/204
9,499,128 B2 * 11/2016 Reh ................. G01S 19/51
(Continued)

OTHER PUBLICATIONS

Motorcycle Security System using GSM and RFID. Jusoh. JARAM. (Year: 2015).*
(Continued)

*Primary Examiner* — Venkat Perungavoor
(74) *Attorney, Agent, or Firm* — HOLLOWELL PATENT GROUP; Kelly J. Hollowell

(57) ABSTRACT

Disclosed systems and methods provide self-service access control for rental vehicles in which a user's mobile device may be used to access rental vehicles and to determine and process payments for rental vehicle usage. A user's mobile device may be configured to receive a user-profile including one or more access rules governing a user's access rights to one or more respective point-of-entry devices associated with one or more respective rental vehicles. The user device may then provide an access key to a point-of-entry device to unlock a rental vehicle. The user device and/or an external device may then determine and process a payment for usage of the rental vehicle after the vehicle has been returned to the point-of-entry device from which it was accessed or to a different point-of-entry device. The user's mobile device may further be configured to lock and unlock point-of-entry devices that secure various vehicle accessories.

20 Claims, 59 Drawing Sheets

Related U.S. Application Data which is a continuation-in-part of application No. 15/813,136, filed on Nov. 14, 2017, now Pat. No. 10,979,437.

(60) Provisional application No. 62/421,770, filed on Nov. 14, 2016.

(51) Int. Cl.
*G06Q 30/0645* (2023.01)
*G07B 15/02* (2011.01)
*G07C 9/00* (2020.01)
*G07C 9/02* (2006.01)

(56) References Cited

U.S. PATENT DOCUMENTS

| | | | | |
|---|---|---|---|---|
| 10,200,371 B2* | 2/2019 | Darnell | | G07C 5/008 |
| 10,297,097 B2* | 5/2019 | Mottla | | G07C 9/00571 |
| 10,981,541 B2* | 4/2021 | Golduber | | B60R 25/1009 |
| 2002/0186144 A1* | 12/2002 | Meunier | | G07B 15/00 |
| | | | | 340/901 |
| 2012/0105197 A1* | 5/2012 | Kobres | | G06Q 30/06 |
| | | | | 340/5.2 |
| 2013/0259232 A1* | 10/2013 | Petel | | H04W 12/06 |
| | | | | 455/411 |
| 2014/0278608 A1* | 9/2014 | Johnson | | B60R 25/24 |
| | | | | 705/5 |
| 2015/0135336 A1* | 5/2015 | Arasavelli | | H04W 4/80 |
| | | | | 726/29 |
| 2015/0194000 A1* | 7/2015 | Schoenfelder | | G07C 9/00309 |
| | | | | 340/5.61 |
| 2016/0055699 A1* | 2/2016 | Vincenti | | G07C 9/00857 |
| | | | | 340/5.61 |
| 2016/0241999 A1* | 8/2016 | Chin | | G07C 9/00182 |
| 2017/0349142 A1* | 12/2017 | Krishnan | | G07C 9/0069 |
| 2019/0197468 A1* | 6/2019 | Endo | | G06Q 10/0832 |
| 2021/0166303 A1* | 6/2021 | Gideon, III | | G07F 17/0057 |

OTHER PUBLICATIONS

Rights Management with NFC Smartphones and Electronic ID Cards: A Proof of Concept for Modern Car Sharing. Kasper. Springer-Verlag. (Year: 2013).*

Parking reservation policies in one-way vehicle sharing systems. Kaspi. Elsevier. (Year: 2014).*

GreenBicylcing: A Smartphone-based Public Bicycle Sharing System for Healthy Life. Zhao. IEEE. (Year: 2013).*

* cited by examiner

My Card - Dashboard        Logout

Jake Gideon

- Recent Activity
- Access Rights
- Employees
- Add Employee
- Roles
- Zones
- Departments
- Settings

ALL ACTIVITY    ZONES ACTIVITY    CARD EXCHANGES

All Departments                    [FILTER BY DATE]

- John Doe met Nestor Alcantara
- John Doe met Nestor Alcantara
- John Doe met Nestor Alcantara
- Nestor Alcantara met Tristian Azuara
- Nestor Alcantara met Tristian Azuara
- Jake Gideon met John Doe
- John Doe met Nestor Alcantara
- John Doe met Nestor Alcantara
- Nestor Alcantara exited Zone C
- John Doe entered Zone C
- Jake Gideon exited Zone A
- Jane Doe met Nestor Alcantara
- Tristian Azuara entered Zone B
- Jake Gideon met Jane Doe

FIG. 15

| ALL ACTIVITY | ZONES ACTIVITY | CARD EXCHANGES |

All Departments     FILTER BY DATE

Nestor Alcantara exited Zone C

Sun Aug 02 04:00:00 UTC 2015

John Doe entered Zone C

Jake Gideon exited Zone A

Tristian Azuara entered Zone B

Nestor Alcantara exited Zone C

| ALL ACTIVITY | ZONE ACTIVITY | CARD EXCHANGE |

All Departments                                FILTER BY DATE

John Doe met Nestor Alcantara

John Doe met Nestor Alcantara
Sat Jun 04 02:24:46 UTC 2016
Calz Del Tecnologico 14487, Parque Internation Industrial Tijuana,Tijuana, Bais, California John Doe met Nestor Alcantara Nestor Alcantara met Tristian Azuara Nestor Alcantara met Tristian Azuara Jake Gideon met John Doe John Doe met Nestor Alcantara John Doe met Nestor Alcantara Jane Doe met Nestor Alcantara Jake Gideon met Jane Doe Jane Doe met Tristian Azuara Nestor Alcantara met Will Smith

My Card - Dashboard

Jake Gideon

- Recent Activity
- Access Rights
- Employees
- Add Employee
- Roles
- Zones
- Departments
- Settings Logout

Settings

Company [EDIT]

Name: Intrinsic Value, LLC
Address: 524 Wesview
Nashville, TN 37205
USA

Server: http://intrinsicvalue.herokuspp.com/

SMS - Twilio [EDIT]

Account SID: ACX197X1a1eeb3e8exx421a1187eb7804e1
Auto Tokens: e31x788de3x072181300100000x7x28
Twilio phone number: 123-456-7890
Country phone number: +1

Managers [DEFINE MANAGERS]

Will Smith
Jake Gideon
Jane Doe
Nestor Alcantara
Tristian Azuara
User Test 1
IOS Employee
Android Employee

| Aspect | NFC | Bluetooth | Bluetooth Low Energy |
|---|---|---|---|
| Tag Requires Power | No | Yes | Yes |
| Range | <20 cm | ~100 m (Class 1) | ~50 m |
| 10 more rows | | | |

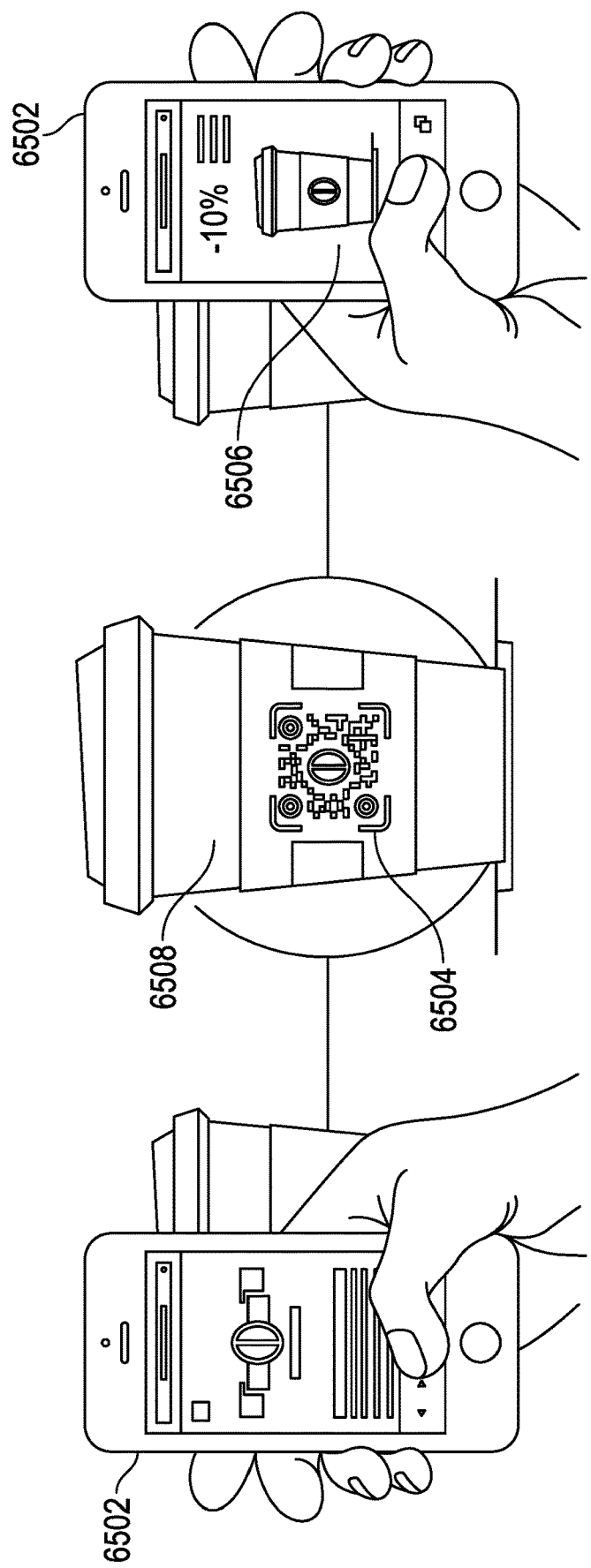

SYSTEMS, DEVICES, AND METHODS FOR EMERGENCY RESPONSES AND SAFETY

CROSS-REFERENCE TO RELATED APPLICATIONS

This application is a continuation-in-part of U.S. patent application Ser. No. 15/977,457, filed on May 11, 2018, which is a continuation-in-part of U.S. patent application Ser. No. 15/813,136, filed on Nov. 14, 2017, which is related to and claims the benefit of U.S. Provisional Patent Application No. 62/421,770, filed Nov. 14, 2016, the contents of which are incorporated herein by reference in their entirety. This application is also related to international application PCT/US2017/061648, filed Nov. 14, 2017, the contents of which are incorporated herein by reference in its entirety.

BRIEF DESCRIPTION OF THE DRAWINGS

The accompanying drawings form part of the disclosure and are incorporated into the subject specification. The drawings illustrate example embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure may be implemented in many different forms and should not be construed as limited to the implementations set forth herein. Like numbers refer to like, but not necessarily the same or identical, elements throughout.

FIG. 15 illustrates an example user interface for access control and identification, according to an embodiment.

FIG. 18 illustrates an example user interface for access control and identification, according to an embodiment.

Figure 19:
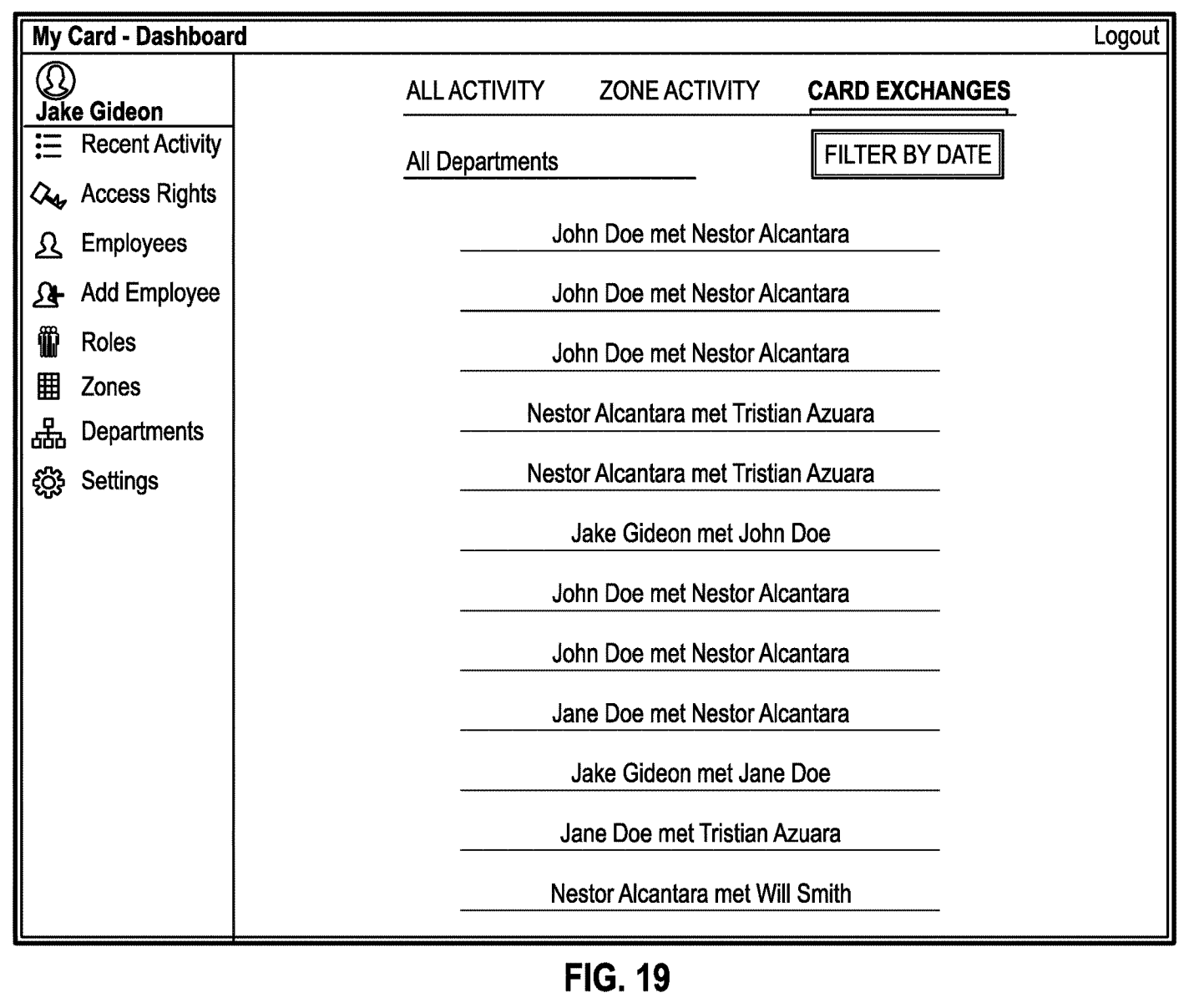

FIG. 19 illustrates an example user interface for access control and identification, according to an embodiment.

FIG. 20 illustrates an example user interface for access control and identification, according to an embodiment.

Figure 21:
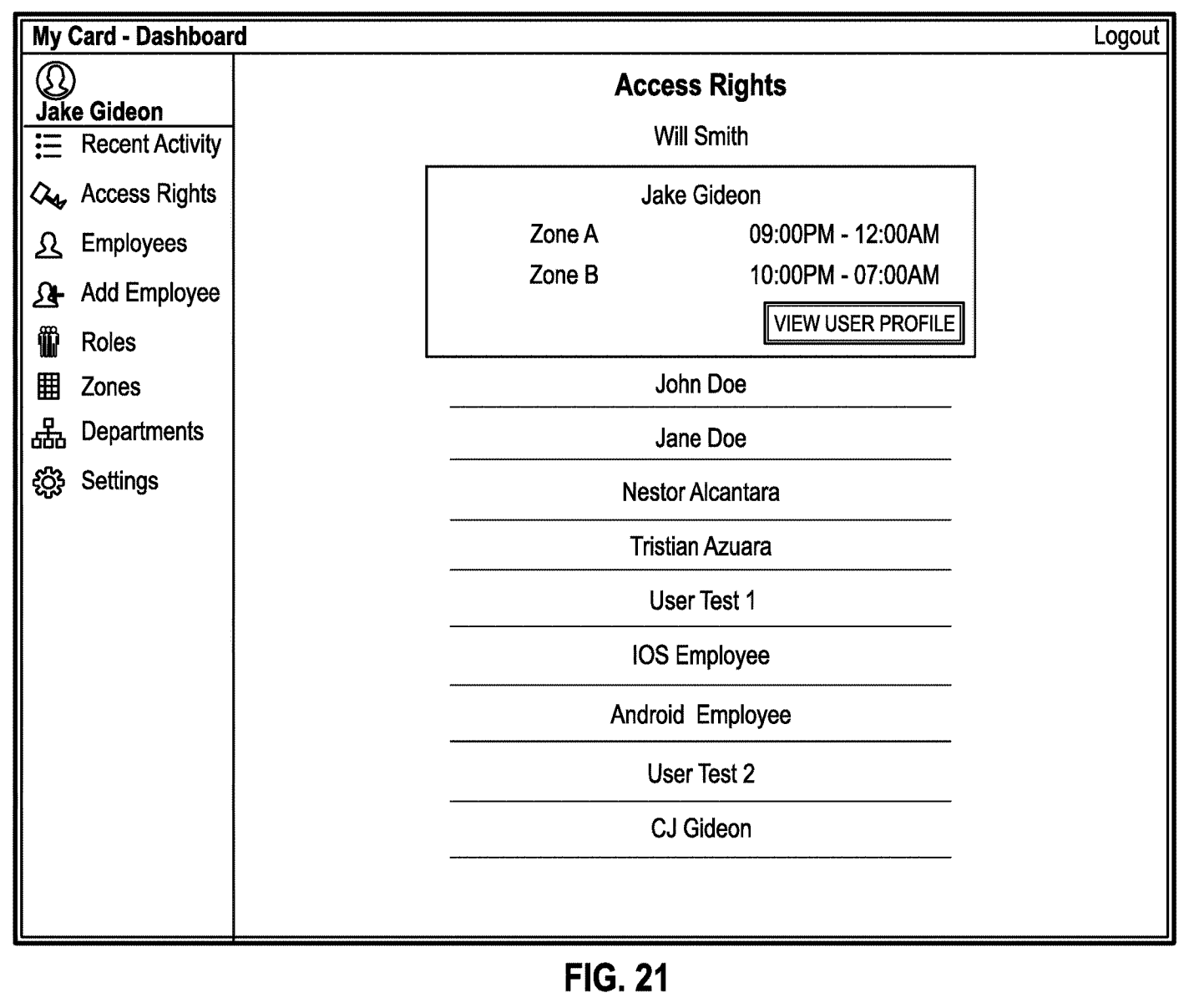

FIG. 21 illustrates an example user interface for access control and identification, according to an embodiment.

FIG. 22 illustrates an example of a user interface for access control and identification, according to an embodiment.

FIG. 24 illustrates an example user interface for access control and identification, according to an embodiment.

FIG. 25 illustrates an example user interface for access control and identification, according to an embodiment.

FIG. 26 illustrates an example user interface for access control and identification, according to an embodiment.

FIG. 27 illustrates an example user interface for access control and identification, according to an embodiment.

FIG. 28 illustrates an example user interface for access control and identification, according to an embodiment.

FIG. 65A illustrates a computing device scanning a barcode or QR code from a consumer product to trigger retrieval of enhanced content on the computing device, according to an embodiment.

FIG. 65B illustrates an example barcode or QR code on a consumer product, according to an embodiment.

FIG. 65C illustrates enhanced content displayed on a computing device triggered by scanning the barcode or QR code of FIGS. 65A and 65B, according to an embodiment.

DETAILED DESCRIPTION

Disclosed systems and methods provide improved digital identification, networking, communication, and security. Embodiments of the disclosure may be utilized as a time-saving enterprise system including a multi-faceted mobile software application ("mobile app") and a command and access control web app ("web app"). In various embodiments, the systems, devices, and methods may be configured as an "all-in-one" software application that may act as a comprehensive digital identification, networking, communication, and security system, as well as a communication, command, and control system.

Figure 1:
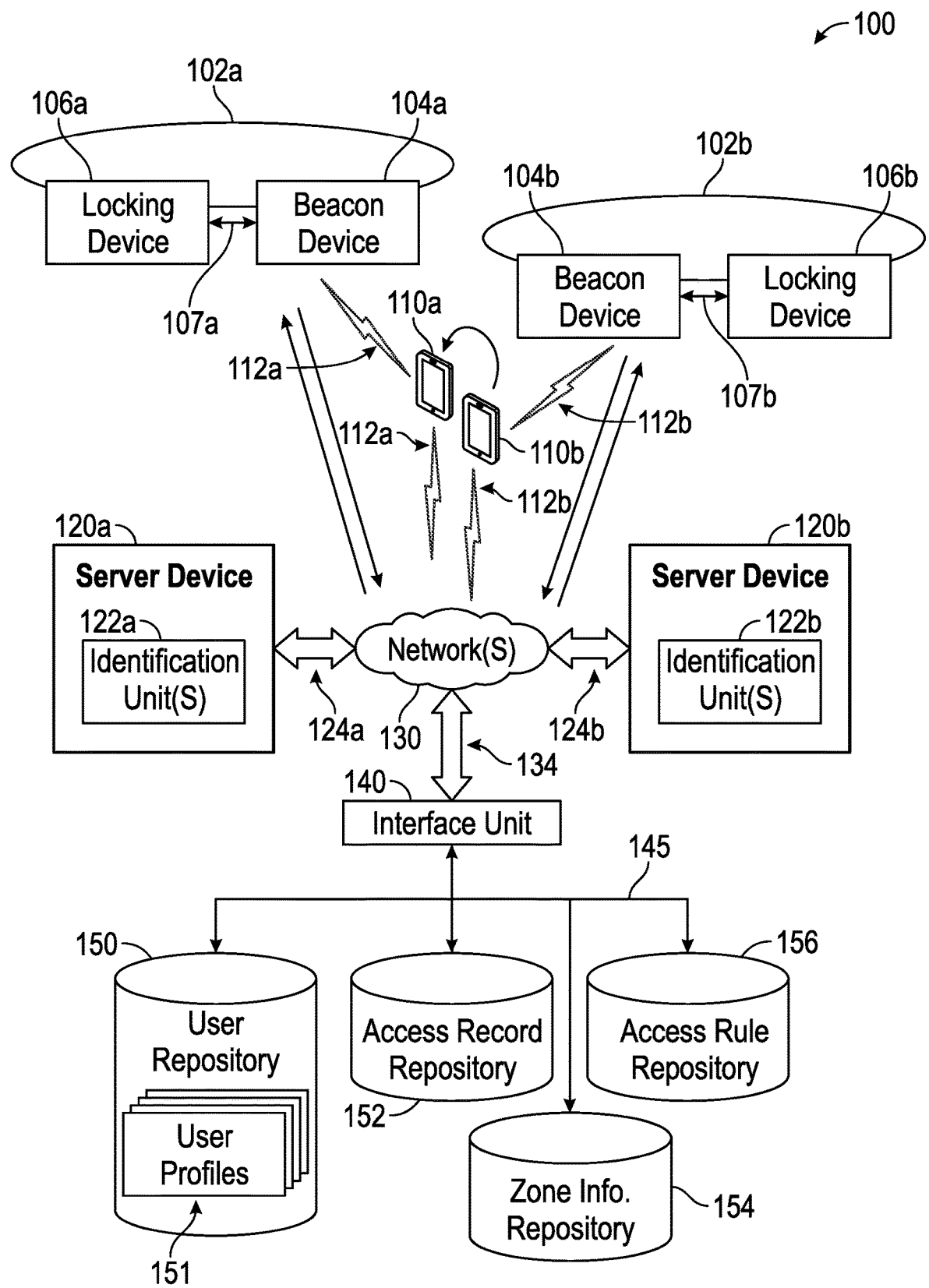
FIG. 1 is a schematic illustration of an example operational environment 100 for identification, safety, and access control, according to an embodiment.

FIG. 1 is a schematic illustration of an example operational environment 100 for identification, safety, and access control, according to an embodiment of the disclosed system. As is illustrated, the operational environment 100 may include a first zone 102a associated with a beacon device 104a. The first zone 102a may be embodied in or may include a defined region secured by a locking device 106a. The defined region may include a confined area indoors, a confined area outdoors, or a confined area that includes a combination of indoor and outdoor spaces. The beacon device 104a and the locking device 106a may be functionally coupled (e.g., electrically coupled, mechanically coupled, and/or electromechanically coupled).

The coupling may include wireless coupling and/or wireline coupling, and is represented by link(s) 107a. The locking device 104a may be actuated to transition between a locked state and an unlocked state, thus unlocking or locking a gate, a door, a turnstile, a padlock, or another type of access structure. As such, the beacon device 104a and the locking device 106a may be referred to collectively as a point-of-entry device. In some embodiments, a zone (e.g., zone 102a or zone 102b) may not include a beacon device and, thus, the zone may be associated exclusively with a locking device. In an embodiment, the point-of-entry device may include the locking device (e.g., locking device 106a), where the locking device may be configured to exchange wireless signals with a mobile computing device according to one or more defined protocols of a radio technology (e.g., 3G, Long Term Evolution (LTE), LTE-Advanced, 5G, IEEE 802.11, IEEE 802.16, Bluetooth, ZigBee, or near-field communication (NFC)). As an example, the radio technology may include Bluetooth, and the locking device (e.g., locking device 106a) may include a Bluetooth locking pad.

The operational environment 100 may also include a second zone 102b associated with a beacon device 104b. The second zone 102b may be embodied in or may include a defined region secured by a locking device 106b. The defined region associated with the second zone 102b may also include a confined area indoors, a confined area outdoors, or a confined area including a combination of indoor and outdoor spaces. The second zone 102b may be geographically distinct from the first zone 102a. The beacon device 104b and the locking device 106b may be functionally coupled (e.g., electrically coupled, mechanically coupled, and/or electromechanically coupled). The coupling may include wireless coupling and/or wireline coupling, and is represented by link(s) 107b.

The locking device 106b may be actuated to transition between a locked state and an unlocked state, thus unlocking or locking a gate, a door, a padlock, a turnstile, or another type of access structure. As such, the beacon device 104b and the locking device 106b may also be referred to collectively as a point-of-entry device. As described herein, in some embodiments, a zone (e.g., zone 102a or zone 102b) may be provided without a beacon device and, thus, the zone may be associated exclusively with a locking device. In one such embodiment, the point-of-entry device may include the locking device (e.g., locking device 106b), wherein the locking device may be configured to exchange wireless signals with a mobile computing device according to one or more defined protocols of a radio technology (e.g., 3G, Long Term Evolution (LTE), LTE-Advanced, 5G, IEEE 802.11, IEEE 802.16, Bluetooth, ZigBee, or near-field communication (NFC)). As an example, the radio technology may include Bluetooth, and the locking device (e.g., locking device 106a) may include a Bluetooth locking pad.

The operational environment 100 may also include a server device 120a. In one aspect, the server device 120a and the beacon device 104a may be functionally coupled via a network 130 via one or more links 124a and one or more wireless links 112a. The server device 120a may also be associated with one or more other beacon devices. For example, in one embodiment, the server device 120a may be functionally coupled to beacon device 104b via one or more links 124a and one or more wireless links 112b.

As illustrated in FIG. 1, operational environment 100 may also include a server device 120b. The server device 120b and the beacon device 104b may be functionally coupled via a network 130. In this example, the server device 120b is associated with the beacon device 104b. While not illustrated in FIG. 1, the server device 120b may also be associated with one or more other beacon devices. For example, the server device 120b may be associated with the beacon device 104a and therefore, zone 102a. The server device 120b may be have similar architecture to that of the server device 120a and may provide similar functionality.

The server device 120a may configure a zone associated with a point-of-entry device. In this regard, the server device 120a may generate a logical association between a beacon device and a region spanned by the zone. Specifically, the server device 120a may generate a logical association between the region spanned by the zone 102a and one or more of the beacon device 104a and the locking device 106a. The server device 120a may also generate a record of the logical association.

As is illustrated in FIG. 1, the server devices 120a and 120b may be functionally coupled to one or more interface units 140. For example, the server devices 120a and 120b may communicate with the network 130 via links 124a and 124b, respectively, and the interface unit 140 may communicate with the network 130 via a link 134.

In some embodiments, the interface unit 140 may be embodied in or may include a computing device (e.g., a server device 120a or 120b) that includes one or more application programming interfaces (APIs) that permit exchange of information between the interface unit 140 and the server devices 120a and 120b. Therefore, the server devices 120a and 120b may utilize or otherwise leverage the interface unit 140 to retain a record of logical associations between zones 102a and 120b and respective beacon devices 104a and 104b and/or respective locking devices 106a and 106b. Such a record may be retained in one or more memory devices 154 (collectively referred to as zone information repository 154), as described in greater detail below. As mentioned, in some embodiments, server device 120a may be functionally coupled to zone 102b. Server device 120a may therefore configure zone 102b as well as zone 102a. Similarly, server device 120b may be functionally coupled to zone 102a. Server device 120b therefore configure zone 102a as well as zone 102b.

Interface unit 140 may also be functionally coupled to various repositories (i.e., multiple memory or storage devices) 150, 152, 154 (mentioned above), and 156, as illustrated in FIG. 1. Repositories 150, 152, 154, and 156 may, respectively, retain information associated with end-users, access records, zones, and access rules. User repository 150 may retain one or more user profiles 151.

Access record repository 152 may retain records (or other types of information) indicative of access attempts to various zones (e.g., zones 102a and/or 102b) by user devices 110a and 110b and/or outcomes of the access attempts (e.g., records of instances of access granted or access denied). Such zones may be associated with one or more server devices, such as server device 120a and/or server device 120b. For example, the access record repository 152 may include records (or other types of information) indicative of access attempts to enter zone 102a and/or zone 102b by user devices 110a and 110b. The information retained in access record repository 152 may permit or otherwise facilitate, among other things, the tracking of a user device within zone(s)—either from a single organization or multiple organizations associated with the user device—thus providing clarity and records of actions, legal defensibility, etc.

Further, the repositories may include a zone information repository 154 that may retain information (e.g., data and/or metadata) indicative or otherwise representative of one or more zones. For instance, the information may include first information indicative of beacon devices associated with respective zones. The repositories may further include an access rule repository 156 that may retain information indicative of access rules (e.g., a schedule of permitted entry to a zone).

Server devices 120a and 120b may generate a user record including first user information (e.g., a name an address, a role within an organization, etc.) and a communication address, such as an email address. In addition, server devices 120a and 120b may generate an access rule using at least the user record, wherein the access rule may regulate entry to a zone (e.g., zone 102a and/or, in some embodiments, zone 102b). To that end, in some embodiments, server devices 120a and 120b may generate a schedule for authorized entry to the zone, the schedule being one of a daily schedule having a recurring group of authorized periods over a 24 hour interval; a weekly schedule having a second recurring group of authorized periods over seven days; a monthly schedule having a third recurring group of authorized periods over a month; a defined non-recurring authorized period, etc. Accordingly, in some instances, the access rule may include a start time and an end time for authorized access.

In addition or in other embodiments, to configure an access rule, server devices 120a and 120b may receive input information indicative of a schedule for authorized entry to a zone (e.g., zone 102a and/or, in some embodiments, zone 102b) and may generate the access rule using at least the input information. In some instances, the input information may be input at a user interface, such as a graphical user interface (GUI) provided on user device 110a and/or 110b, and may be sent to server devices 120a and 120b. Server devices 120a and 120b may validate the access rule. For instance, server devices 120a and 120b may determine that the received schedule has logical integrity (e.g., an end time is later than a start time, times are adequate, etc.). Server devices 120a and 120b may also utilize or otherwise leverage the interface unit 140 to retain or store the access rule in one or more memory devices 156 (collectively referred to as access rule repository 156).

In some embodiments, the server device 120a may activate a user device 110a to serve as an access control instrument for a specific zone. For instance, the server device 120a may generate an activation code (e.g., a numeric code or an alphanumeric code), and may send the activation code to the communication address associated with a user record. In one such embodiment, the activation code may be received and displayed (or otherwise presented) at a user device 110a, which may be embodied in or may include a mobile computing device that may communicate wirelessly, via a wireless link 112a, according to one or more radio technologies (e.g., 3G, Long Term Evolution (LTE), LTE-Advanced, 5G, IEEE 802.11, IEEE 802.16, Bluetooth, ZigBee, or near-field communication (NFC)). Such a mobile computing device 110a may have a defined form factor, and may be embodied in or may include a smartphone, tablet computer, a wearable device, a key fob, a pocket card, etc.

In response to receiving the activation code, user devices 110a and 110b may generate user information including a telephone number or another type of communication address (e.g., an email address) of the mobile computing device. To that end, in one embodiment, user devices 110a and 110b may receive input information indicative or otherwise representative of the user information. For example, the user devices 110a and 110b may also include one or more identification units (not depicted in FIG. 1) that may cause the user devices 110a and 110b to display, via a display device or display unit, for example, a GUI that includes one or more selectable visual elements. At least one of the selectable visual element(s) may be a fillable form, and may permit or otherwise facilitate receiving input information at the user device 110a or 110b. User devices 110a and 110b may communicate wirelessly with a beacon device or other types of devices via one or more wireless links 112a and 112b, respectively.

User devices 110a and 110b may send, to server devices 120a and 120b, user information that includes a telephone number or another type of communication address (e.g., an email address) of the mobile computing device. As is illustrated in FIG. 1, user device 110a and 110b, may be functionally coupled to server devices 120a and 120b, by one or more wireless links 112a and 112b, and to network 130, via one or more links 124a and 124b, respectively. Server devices 120a and 120b may receive user information, and may generate a user profile using a user record associated with (e.g., the user record that prompted transmission of) the activation code. The user profile may include a telephone number (or another type of communication address) of respective user devices 110a and 110b. Server devices 120a and 120b may utilize or otherwise leverage the interface unit 140 to retain a record of the user profile. Such a record may be retained in one or more memory devices 150 (collectively referred to as user repository 150). For example, the user profile may be retained in one or more memory elements 151 (referred to as user profiles) which may embody or may constitute a database or another type of data structure.

Server devices 120a and 120b may also associate access rules based on user records that are associated with corresponding user profiles. Such an association may permit assigning or otherwise associating an access rule (also referred to as an access right) to a corresponding user device 110a or 110b. In one embodiment, to associate the access rule with the user profile, server devices 120a and 102b may define a relationship between the user profile and the access rule. To associate the access rule with the user profile, the server device 120a may update the user profile to include the access rule. The server device 120a may also generate a unique access key indicative of a unique user identifier associated with the user profile. The access key may be embodied in or may include one of a linear barcode or a matrix barcode (e.g., a QR code).

As such, in some embodiments, the server device 120b may also generate an access key as described herein, and may send the access key to the user device 110b. The access key generated by the server device 120b may be associated with zone 102b, and may permit or otherwise facilitate access to the zone 102b in accordance with an access rule configured for a user profile associated with the user device 110, for the zone 102b. Further, the access key generated by the server device 120b may be associated with zone 102a, and may permit or otherwise facilitate access to the zone 102a in accordance with an access rule configured for a user profile associated with the user device 110a, for the zone 102a.

The server device 120a and the server device 120b may serve as zone access controller devices (or regulator devices) that may grant respective types of access to respective zones for a user device. Accordingly, user devices (e.g., mobile computing devices utilizing respective identification units included therein) may include access keys issued from different zone access controller devices, the access keys providing the user devices with credentialed access to different locations and/or devices (e.g., locking devices for rental car access, front door, checking in for an appointment with a doctor, dentist, etc.).

In other embodiments, the access key may be embodied in or may include a unique code that may correspond to a radio technology that the user devices 110a and 110b may have utilized to transmit the unique code. In one example, the unique code may correspond to a code to be transmitted by means of Bluetooth radio technology. In another example, the unique code may correspond to a code to be transmitted by means of near field communication (NFC) radio technology. The disclosure is not limited to Bluetooth or NCF radio technologies, and the access key may be embodied in or may include a code that may be transmitted, by user devices 110a and 110b, via other radio technologies (e.g., ZigBee).

The server devices 120a and 120b may send an access key associated with a zone to the communication address of the user device 110a. For example, the access key may be associated with zone 102a. In some embodiments, the server device 120a may generate a first access key for zone 120a and a second access key for zone 102b, and may send the first access key and the second access key to the user device 110b. Access keys in accordance with this disclosure may unlock respective locking devices associated respective zones. Thus, an access key may permit or otherwise facilitate access to a credentialed zone.

Regardless of which server device configures a given zone and/or generates an access key, each server device may provide a notification to one or more user devices 110a and 110b indicating that one or more access rules have been generated. The one or more user devices 110a and 110b may each be associated with a respective user profile associated with respective access keys and/or the access rules. Notifications may be directed to an initial configuration of an access rule or to a subsequent change to the access rule. A subsequent change to an access rule may be determined based on one or more rules. For example, a server device (e.g., server device 120a or 120b) may determine that an update rule is satisfied, and may in turn update the access rule. In another example, the server device (e.g., server device 120a or 120b) may determine that a deletion rule is satisfied, and the server device may in turn delete the access rule.

A notification of a change to an access rule may be embodied in or may include a push notification. To provide the push notification, the server device (e.g., server device 120a or server device 120b) may determine one or more communication addresses (e.g., telephone number, email address, etc.) of respective one or more user devices 110a and 110b (e.g., mobile computing devices) associated with the user profile. Further, the server device may send a notification request to a messaging system to deliver the push notification, wherein the notification request may include the one or more communication addresses. The messaging system may deliver the push notification, and depending on the type of notification, the messaging system may be a third-party messaging system.

In embodiments in which a notification, regarding an update to an access rule, is embodied in or includes an email notification, the server device (e.g., server device 120a or server device 120b) that updates or otherwise configures the access rule, may provide the email notification. In this regard, the server device may determine an email address corresponding to a user profile having an associated updated access rule, and may generate or otherwise compose the email notification. The server device (e.g., server device 120a or server device 120b) may also send the email notification as an email message to the email address.

As described herein, one or more server devices (e.g., server device 120a and/or server device 120b shown in FIG. 1) may generate access keys and may grant the access keys to user devices 110a and 110b or any other type of mobile computing device. In addition, user device 110a or 110b may transmit first wireless signals and may receive second wireless signals according to one or more defined protocols of a radio technology, as described in greater detail below with reference to FIGS. 2 and 3, using a radio having one or more antennas. The one or more antennas may receive the second wireless signals, and the communication processing unit may processes the second wireless signals. In an example, the communication processing unit may convert analog signals associated with the second wireless signals into digital signal that may be further processed by user devices 110a and 110b.

Similarly, the multi-mode communication processing unit 224 (e.g., see FIG. 2) may process digital signals to generate the first wireless signals, and the one or more antennas 222 (e.g., see FIG. 2) may transmit the first wireless signals. Upon entering zone 102a, for example, user device 110a may become proximate to the beacon device 104a and may initiate establishment of a connection with the beacon device 104a (e.g., see FIG. 1). After or upon establishing the connection, the user device 110a may send an access key associated with the zone 102a to the beacon device 104a. The beacon device 104a may process the access key (e.g., by applying access logic) or may send the access key to the server device 120a or another device to process the key. When the access key is processed, the beacon device 104a may determine that access to zone 102a should be granted. In response, the beacon device 104a may cause the locking device 106a to transition from a locked state to an unlocked state. Alternatively, beacon device 104a may determine that access to zone 102a should be denied, as described in greater detail below.

When access to zone 102a is granted, beacon device 104a (e.g., see FIG. 1) may also send, to the server device 120a, a message providing an indication of granted entry to zone 102a. The server device 120a may receive the indication of granted entry to zone 102a and may retain a record of the indication in the access record repository 152 (e.g., see FIG. 1). The server device 120a may further generate a record of access granted by using the indication, and may retain the record in access record repository 152 (e.g., see FIG. 1). The record may include a timestamp indicative of a date and/or time of access granted or denial of entry; an identifier for zone 102a; an identifier of the user device 110a or a user profile associated with the user device; a combination thereof; etc.

As mentioned above, beacon device 104a (e.g., see FIG. 1) may alternatively determine that access to zone 102a should be denied, after or upon processing the access key. In response, the locking device 106a may remain in a locked state. The beacon device 104a may send, to the server device 120a, for example, an indication of denial of entry to zone 102a. The server device 120a may receive the indication of denied entry to zone 102a, may generate a record of access denied by using the indication, and may retain the record in access record repository 152. As mentioned above, the record may include a timestamp indicative of a date and/or time of the denial of entry; an identifier for zone 102; an identifier of the user device 110 or a user profile associated with the user device; a combination thereof; etc.

As described herein, the operational environment 100 may also include one or more interface units 140 that may be functionally coupled to the server device 120a and/or the server device 120b via links 112a and 112b, 124a and 124b, and 134. Interface unit 140 may be embodied in, or may include, a computing device (e.g., a server device 102a or 102b) that includes one or more APIs that permit the exchange of information between the interface unit 140 and the server device (120a and/or the server device 120b).

Figure 1A:
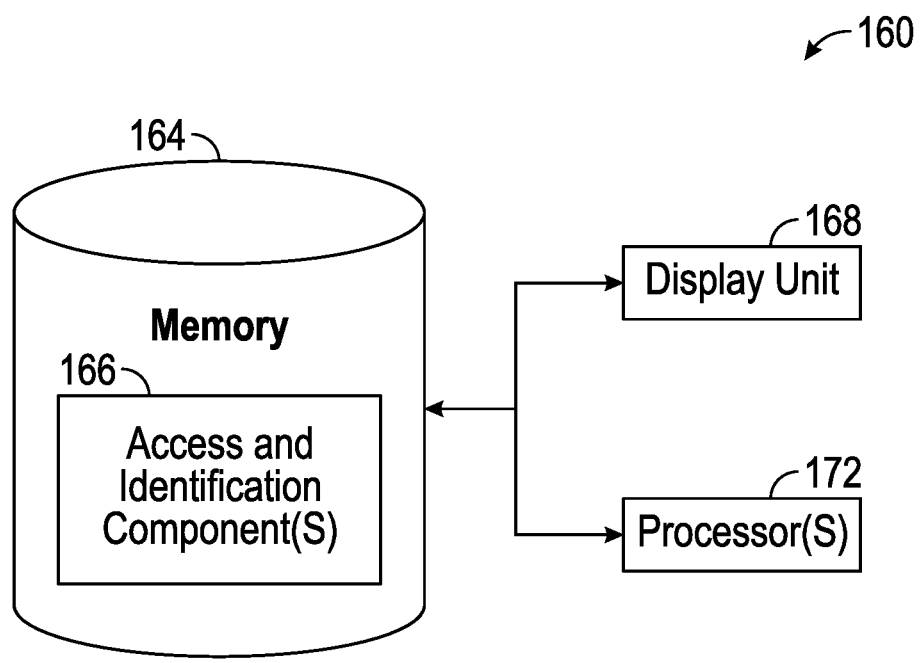
FIG. 1A is a schematic illustration of an example server device, according to an embodiment.

Server devices, 120a and 120b, may implement functionality described herein via identification unit(s) 122a and identification unit(s) 122b, respectively (e.g., see FIG. 1). As is illustrated in FIG. 1A, a server device 160 (which may embody or may include server device 120a or sever device 120b) may include one or more memory devices 164 having one or more access and identification components 166. The access and identification component(s) 166 may configure the server device 160 to provide the functionality described above. Further, in response to execution of computer program instructions, the server device 160 may implement or otherwise provide the various functionalities described herein. The server device 160 may include one or more processors 172 that may execute computer program instructions to control the access and identification component(s) 166, and to control display unit 168 to display data. Server device 160 may also enable remote login access to various functionalities. Thus, the server device 160 may enable an end-user to log into a portal provided by the server device 160.

Figure 2:
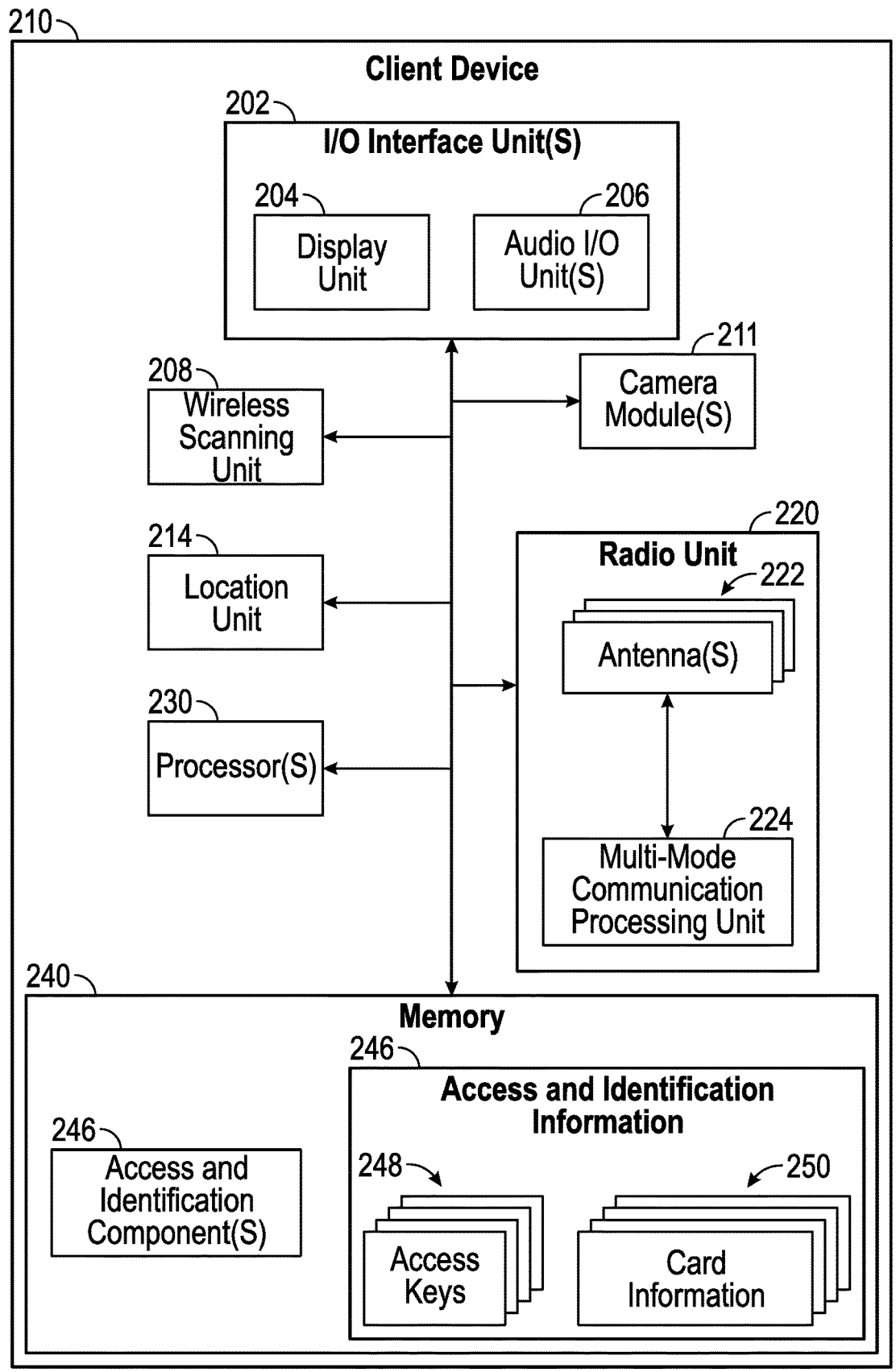
FIG. 2 is a schematic illustration of an example client device for access control and identification of user devices, according an embodiment.

FIG. 2 illustrates an example client device 210 (e.g., client device 110*a* or 110*b*) that provides access control and identification functionality, according to one or more embodiments. The client device 210 may include one or more input/output (I/O) units 202 that may receive input information at the client device 210. In this regard, the I/O interface unit(s) 202 may include a display unit 204. The client device 210 may also include an audio input unit and an audio output unit (collectively referred to as audio I/O unit(s) 206). Further, the client device 210 may include one or more camera modules 211. At least one of the camera module(s) 211 may enable collection of information through analysis of a digital image of at least a portion of an object.

The client device 210 may also include a wireless scanning unit 208 that may generate pilot signals (e.g., beacon signals) that may be transmitted wirelessly, for example, by means of a radio unit 220 (also referred to as radio 220). To that end, the radio unit 220 may include one or more antennas 222 functionally coupled to a multi-mode communication processing unit 224. The radio unit 220, via the multi-mode communication processing unit 224, may process the pilot signals according to one or more defined protocols of a radio technology. The radio technology may include, for example, 3G, Long Term Evolution (LTE), LTE-Advanced, 5G, IEEE 802.11, IEEE 802.16, Bluetooth, ZigBee, near-field communication (NFC), etc. At least one of the antenna(s) 222 may send the processed pilot signals wirelessly.

Further, the multi-mode communication processing unit 224 (e.g., see FIG. may process at least wireless signals in accordance with one or more radio technology protocols and/or modes (such as MIMO, single-input-multiple-output (SIMO), multiple-input-single-output (MISO), etc. Each of such protocol(s) may be configured to communicate (e.g., transmit, receive, or exchange) data, metadata, and/or signaling over a specific air interface. The one or more radio technology protocols may include 3.sup.rd Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; etc.).

The multi-mode communication processing unit 224 may also process non-wireless signals (analogic, digital, a combination thereof, etc.). While illustrated as separate blocks in the client device 210, it should be appreciated that in certain embodiments, at least a portion of the multi-mode communication processing unit 224 and the communication unit 224 may be integrated into a single unit (e.g., a single chipset or other type of solid state circuitry).

In addition, processor(s) that may be included in the client device 210 (e.g., processor(s) included in the radio unit 220 or other functional element(s) of the client device 210) may permit processing data (e.g., symbols, bits, or chips) for multiplexing/demultiplexing, modulation/demodulation (such as implementing direct and inverse fast Fourier transforms), selection of modulation rates, selection of data packet formats, inter-packet times, etc.

With further reference to FIG. 2, the client device 210 may also include a location unit 214 that may enable generation of a location estimate of a current location of the client device 210. The location unit 214 may be configured to receive timing messages from a global navigation system (e.g., global positioning system (GPS)), and may generate the location estimate using at least the timing messages.

The client device 210 may also include one or more processors 230 and one or more memory devices (collectively referred to as memory 240). The memory 240 may include one or more access and identification (A&I) component(s) 246 that may configure the processor(s) 230 to provide one or more functionalities described herein. The A&I component(s) may be controlled by at least one of the processor(s) 230 executing computer program instructions. The A&I component(s) 246 may provide one or more functionalities.

The memory 240 may also include A&I information 246 that includes multiple access keys 248 and card information 250. In some embodiments, the multiple access keys 248 may embody or may constitute a library of access keys available to an end-user of the mobile device. The card information 250 may also include a user profile for the end-user. In other embodiments, card information 250 may be absent. As mentioned above, at least a first one (or, in some embodiments, each one) of the access keys 248 may be embodied in or may include an identification badge associated with an end-user of the client device 210. In addition, at least a second one of the access keys 248 may be embodied in or may include an access code that provides access to a zone, as described in greater detail below.

Figure 3:
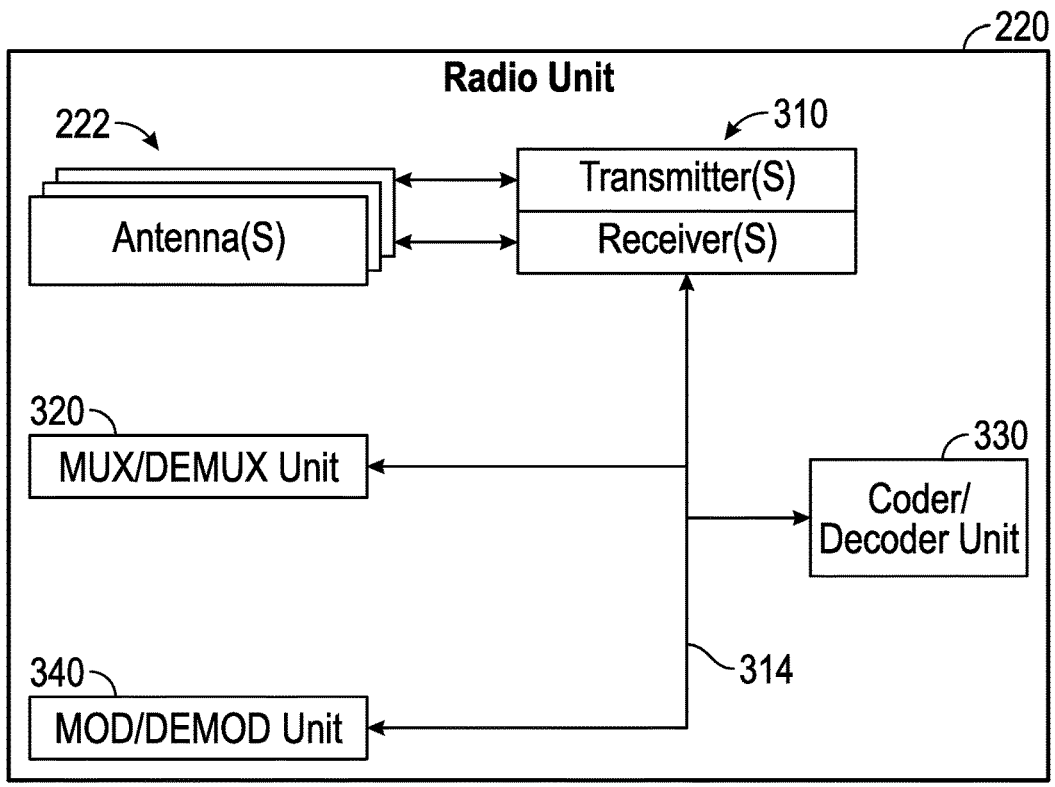
FIG. 3 is a schematic illustration of an example radio unit, according to an embodiment.

FIG. 3 illustrates radio unit 220, which may include antenna(s) 222, and one or more transmitters and one or more receivers, collectively referred to as transceiver(s) 310. Further, radio unit 220 may include a multiplexer/demultiplexer (mux/demux) unit 320, a coder/decoder (codec) unit 330, and a modulator/demodulator (modem) unit 340. Antenna(s) 222 may be embodied in or may include directional or omnidirectional antennas, including, for example, dipole antennas, monopole antennas, patch antennas, loop antennas, microstrip antennas or other types of antennas suitable for transmission of RF signals. At least some of the antenna(s) 222 may be physically separated to leverage spatial diversity and related different channel characteristics associated with such diversity. Transceiver(s) 310 may transmit and receive wireless signal (e.g., electromagnetic radiation) via the one or more antennas 222. In other embodiments, the multi-mode communication processing unit 224 (e.g., see FIG. 2) may include other functional elements, such as one or more sensors, a sensor hub, an offload engine or unit, a combination thereof, etc.

Electronic components and associated circuitry, such as mux/demux unit 320, codec 330, and modem 340 may permit or facilitate processing and manipulation (e.g., coding/decoding, deciphering, and/or modulation/demodulation) of signal(s) received by the client device 210 and signal(s) to be transmitted by the client device 210. Received and transmitted wireless signals may be modulated and/or coded, or otherwise processed, in accordance with one or more radio technology protocols. Such radio technology protocol(s) may include 3GPP UMTS; 3GPP LTE; LTE-A; Wi-Fi protocols, such as the IEEE 802.11 family of standards (IEEE 802.ac, IEEE 802.ax, etc.); WiMAX; radio technologies and related protocols for ad hoc networks, such as Bluetooth or ZigBee; other protocols for packetized wireless communication; etc.

As shown in FIG. 3, for example, electronic components in the described radio unit 220, including the one or more transmitters/receivers 310, may exchange information (e.g., data, metadata, computer program instructions, signaling and related payload data, combinations thereof, etc.) through a bus 314, which may embody or may include at least one of a system bus, an address bus, a data bus, a message bus, a reference link or interface, a combination thereof, etc. Each of the one or more receivers/transmitters 310 may convert signals from analog to digital and vice versa. The receiver(s)/transmitter(s) 310 may divide a single data stream into multiple parallel data streams, or perform the reciprocal operation. Such operations may be conducted as part of various multiplexing schemes.

As illustrated in FIG. 3, the mux/demux unit 320 is functionally coupled to the one or more receivers/transmitters 310 and may permit processing of signals in time and frequency domain. The mux/demux unit 320 may multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), or space division multiplexing (SDM). The mux/demux unit 320 may scramble and spread information (e.g., codes) according to most any code, such as Hadamard-Walsh codes, Baker codes, Kasami codes, polyphase codes, etc. The modem 340 may modulate and demodulate information (e.g., data, metadata, signaling, or a combination thereof) according to various modulation techniques, such as frequency modulation (e.g., frequency-shift keying), amplitude modulation (e.g., Q-ary quadrature amplitude modulation (QAM), with Q a positive integer; amplitude-shift keying (ASK)), phase-shift keying (PSK), etc.

The codec 330, illustrated in FIG. 3, may operate on information (e.g., data, metadata, signaling, or a combination thereof) in accordance with one or more coding/decoding schemes suitable for communication, at least in part, through the one or more transceivers formed from respective transmitter(s)/receiver(s) 310. Such coding/decoding schemes, or related procedure(s), may be retained as a group of one or more computer-accessible instructions (computer-readable instructions, computer-executable instructions, or a combination thereof) in one or more memory devices 240.

In a scenario in which wireless communication among the client device 210 (e.g., see FIG. 2) and another computing device (e.g., a station or other type of user equipment) utilizes MIMO, MISO, SIMO, or SISO operation, the codec 330 may implement at least one of space-time block coding (STBC) and associated decoding, or space-frequency block coding (SFBC) and associated decoding. The codec 330 may extract information from data streams coded in accordance with a spatial multiplexing scheme. To decode received information (e.g., data, metadata, signaling, or a combination thereof), the codec 330 may implement at least one of computation of log-likelihood ratios (LLRs) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, etc. The codec 330 may utilize, at least in part, mux/demux unit 320 and mod/demod unit 340 to operate in accordance with disclosed embodiments.

Figure 4:
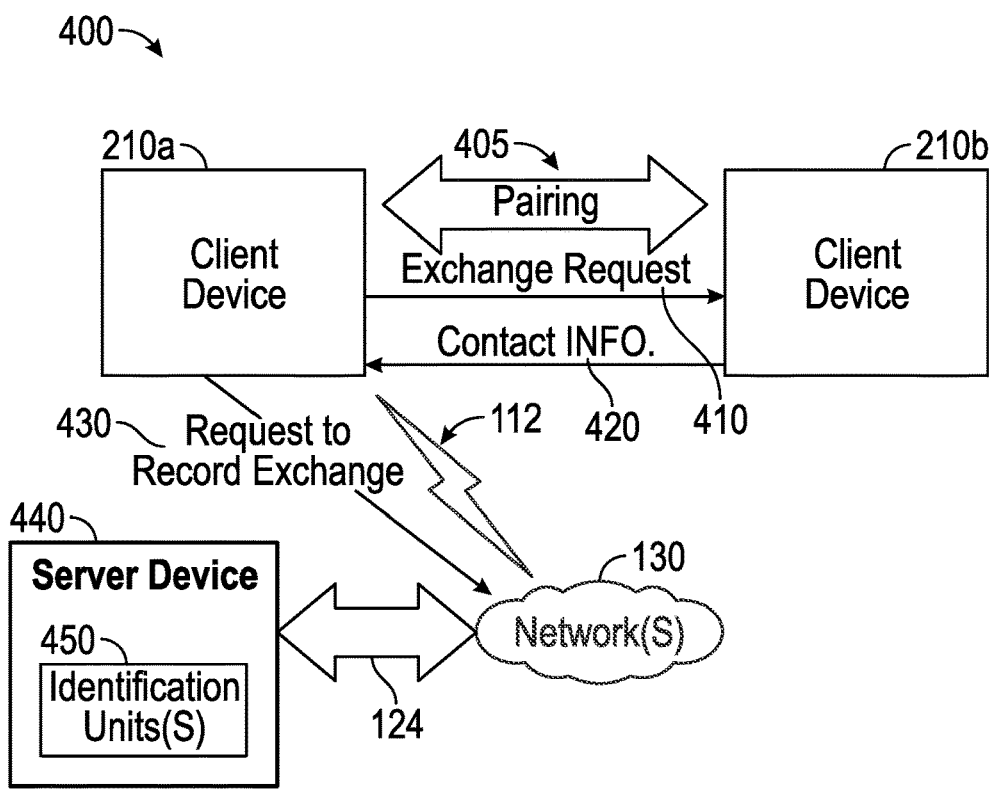
FIG. 4 is a schematic illustration of an example operational environment for identification of user devices, according an embodiment.

FIG. 4 illustrates an example operational environment 400 that identifies user devices, according to one or more embodiments. The operational environment 400 may include a first client device 210a and a second client device 210b. Such devices may include functional elements described above in connection with client device 210, as illustrated in FIG. 2. Client device 210a may establish a connection with the client device 210b. In one example, to establish such a connection, the client device 210a may send a connection request message to connect with the client device 210b, and in response, the client device 210a may receive a response message (e.g., an ACK message), from client device 210b, indicating that the connection has been established. Establishment of such a connection is represented as pairing 405 in FIG. 4.

Client device 210a may send the connection request message in response to receiving input information indicative of a selection to exchange contact information (e.g., business information or other type of identification (ID) information). The input information may be received, for example, via a GUI displayed on the client device 210a. Client device 210a may be configured to broadcast an indication of availability to supply contact information. The indication may be broadcasted wirelessly, for example, using pilot signals. Broadcasting such an indication may permit or otherwise facilitate reaching out to other client device(s), including the client device 210b, that may be configured to "listen" (e.g., monitor wireless signals) for an opportunity to receive, send, or exchange contact information. In this regard, user devices may detect other user devices that are in proximity and that are available to exchange contact information regardless of a prior association between such user devices.

Once a connection has been established, client device 210a may send a message 410 to client device 210b, requesting device 210b to supply contact information 420. In response, client device 210b may send contact information 420 to client device 210a. Client device 210a may then receive the contact information 420 and may retain at least a portion of the contact information 420 in a memory device 240 (e.g., see FIG. 2) of client device 210a.

Upon receipt of at least a portion of the contact information 420, client device 210a may send a request message 430 to a server device 440 requesting the server device 440 to record information related to exchange of contact information 420 between client device 210a and client device 210b. The request message 430 may include location information indicative or otherwise representative of a location of client device 210a at the time of the exchange or at a time shortly (e.g., tens of milliseconds, hundreds of millisecond, a second, a few seconds, etc.) after the exchange. The request message 430 may also include a timestamp (or other type of information) indicative of a date and a time at which the contact information 420 is received.

As is illustrated in FIG. 4, the request message 430 may be sent to a server device 440 that includes one or more identification units 450. The request message 430 may be sent via a network 130 using links 112 and 124. The identification unit(s) 450 may be the same as or similar to the identification unit(s) 122a (e.g., see FIG. 1). In one instance, the server device 440 may receive the request message 430 and, in response, may determine that a user profile associated with client device 210b is present in a user repository (e.g., user repository 150; shown in FIG. 1). In response, in one aspect, the server device 440 may generate a record of the exchange (which may be referred to as a card exchange record) and may retain such a record in a card exchange repository (e.g., see 246 of FIG. 2).

Service device 440, illustrated in FIG. 4, may determine that a user profile associated with client device 210*b* is not present or otherwise available in the user repository. In response, the server device 440 may generate a user profile using the at least contact information 420. The user profile may be associated with the client device 210*b*. Further, the server device 440 may generate a record of the exchange and may retain such a record in the card exchange repository. Client device 210*a* may operate based on card information stored in a memory device of the client device 210*a* and/or stored in the card exchange repository.

Whenever zones are accessed (e.g., access is denied or granted) a record of the access occurrence may be logged and saved in access record repository 152 (e.g., see FIG. 1) or in any other memory device accessible to a server device (e.g., server device 120*a* or server device 120*b*, illustrated in FIG. 1). Thus, information providing an audit trail applicable to one or more zones may be created and stored. In addition, records indicative of access granted and/or access denied for one or more zones and/or one or more user devices (e.g., mobile device(s) 110*a* and 110*b* illustrated in FIG. 1) may be utilized or otherwise leveraged to generate insights related to access behavior of a user device or a group of user devices.

Figure 5:
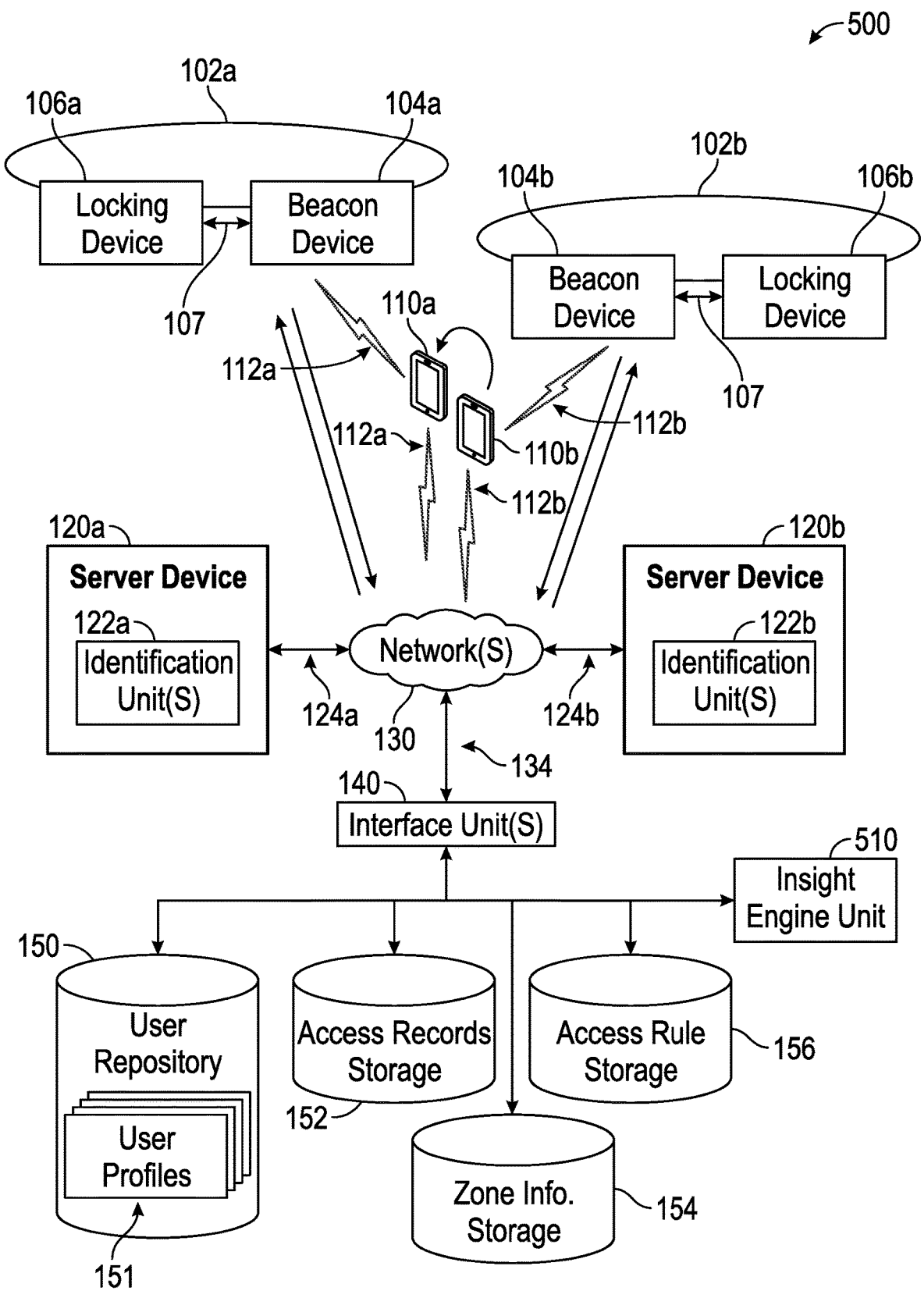
FIG. 5 is a schematic illustration of an example operational environment for access control and identification of user devices, according to an embodiment.

In this regard, as is illustrated in FIG. 5, an operation environment 500 may include an insight engine unit 510 functionally coupled to user repository 150; access records storage 152; zone information storage 154; and/or access rule storage 156. As such, the insight engine unit 510 may determine that a correlation is present between (a) first entry records (first access granted records, first access denied records, or a combination thereof) associated with a first zone 102*a* and, (b) second entry records associated with a second zone 102*b*. The insight engine unit 510 may send information indicative of the correlation to server device 120*a* and/or server device 120*b*. Based on the correlation, server device 120*a* and/or server device 120*b* may generate a second access rule associated with a user profile. The second access rule may regulate entry to a third zone. In addition, a server device that generates the access rule may generate an access key indicative of a unique user identifier associated with the user profile. Such server device(s) may associate the access key with the third zone, and may send the second access key to the communication address of user device 110*a* and/or 110*b*. Features illustrated in FIG. 5 that are not explicitly described are essentially similar to corresponding features illustrated in FIG. 1 and described above.

Insight engine 510 (e.g., see FIG. 5) may perform or otherwise facilitate a data mining process that may include four groups of operations: (I) data selection, (II) data preprocessing and transformation, (III) data analysis and/or data mining, and (IV) generation of insight and/or interpolation, as described in greater detail below.

With (I) data selection, data is pulled into the insight engine unit 510 from multiple sources. These sources may be log files, external data and databases. The selection process typically involves aggregating these different sources into a single source, normally a flat list of key value pairs.

With (II) data preprocessing and transformation, preprocessing operations may include normalizing the data from the selection process, running basic validation rules and removing erroneous samples. Transformation is normally applied to the preprocessed data to prepare the sample set of data for processing in a next step. Different processing algorithms require different transformations. At times these transformations may be as simple as ordering the data according to a particular attribute. An example of a more complicated transformation may include running further calculations on the sample set to produce derived attributes such as a sum of failed access occurrences for a particular user or an average time a particular zone is accessed.

With (III) data analysis (or data mining), operations may include determination of patterns or other types of features presents in the pre-processed and transformed data. In this regard, the insight engine unit 510 may implement (e.g., perform) various algorithms to process a preprocessed and transformed set of data. Such algorithms may include various feature detection algorithms. The algorithms may produce different results depending on a specific feature of interest, such as a type of pattern. Algorithms may include clustering, classification (e.g., decision trees), regression, etc. Insight engine unit 510 may implement a decision tree, which is a type of classification. Insight engine unit 510 may apply a set of rules to available data, wherein the set of rules may be modeled after a defined set of patterns. The defined set of patterns may be determined based on an access behavior of interest. As part of the implementation of the decision tree, the insight engine unit 510 may train one or more of the rules in the defined set of rules against a training set of data. Such rule(s) may be adjusted based at least on available non-training data.

With (IV) generation of insight and/or interpolation, once a pattern has been determined or otherwise identified, insight engine unit 510 may further analyze data associated with the pattern. Such further analysis may permit adjusting a group of algorithms applied by insight engine unit 510 to extract one or more features and, ultimately, to determine an insight (e.g., an amount of actionable knowledge). Such adjustment may be implemented in a learning stage of the data analysis. A determined set of patterns may be reported in various ways, and may be stored in a database for later review. Operational environment 500 may also perform various predefined automated actions. For example, push notifications or other types of notification may be sent to one or more user devices 110*a*, 100*b*, etc.

Figure 6:
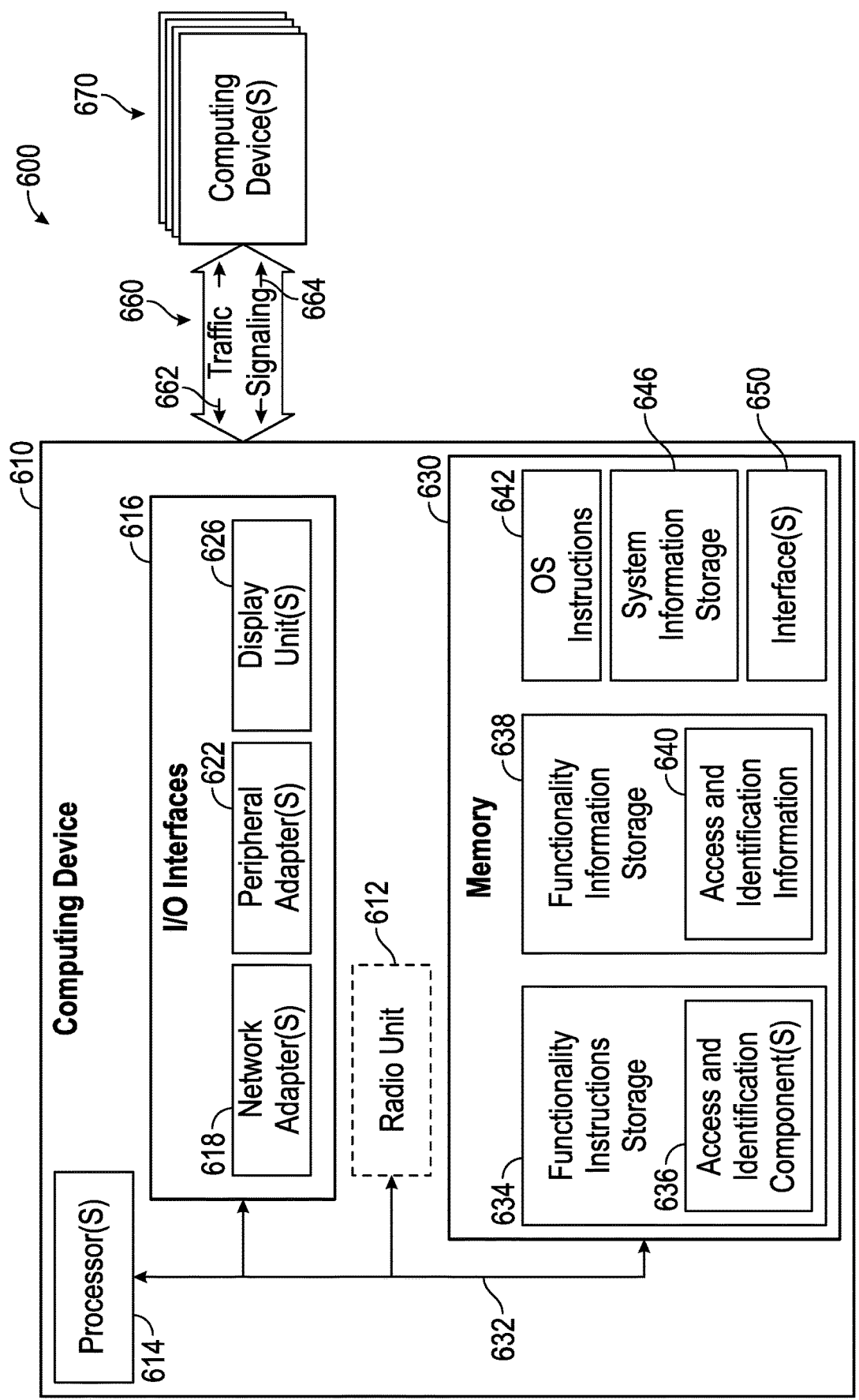
FIG. 6 is a schematic illustration of an example computing environment for access control and identification, according to an embodiment.

FIG. 6 illustrates example computational environment 600 for access control and identification of a user device, in accordance with one or more embodiments. The example computational environment 600 is merely illustrative and is not intended to suggest or otherwise convey any limitation as to the scope of use or functionality of the computational environment's architecture. In addition, the illustrative computational environment 600 depicted in FIG. 6 should not be interpreted as having any dependency or requirement relating to any one or combination of components illustrated in the disclosed example operational environments. The example computational environment 600 or portions thereof may embody or may constitute the operational environments described above. As such, a computing device 610 may embody or may constitute, for example, any of the communication devices or servers (e.g., servers 120*a* and 120*b*, illustrated in FIG. 1) described above.

In one example, the computing device 610, of FIG. 6, may be embodied in a portable personal computer or a handheld computing device, such as a mobile tablet computer, an electronic-book reader, a mobile telephone (e.g., a smartphone), etc. In another example, the computing device 610 may be embodied in a wearable computing device, such as a watch, goggles, head-mounted visors, etc. In a further example, the computing device 610 may be embodied in portable consumer electronics equipment, such as a camera, a portable television set, a gaming console, a navigation device, a voice-over-internet-protocol telephone, a media playback device, etc.

Computational environment 600 (e.g., see FIG. 6) represents an example implementation in which processing or execution of operations associated with operational environment 500 may be performed. Such operations may be performed, for example, by a processor executing computer program instructions associated with one or more software components of computing device 610. The one or more software components may render the computing device 610, or any other computing device that contains such components, a particular machine (i.e., a special purpose computing device) for the management of the operational environment 500 in accordance with aspects described herein, among other functional purposes.

A software component may be embodied in or may include one or more computer-accessible instructions (e.g., computer-readable and/or computer-executable program instructions). In one scenario, at least a portion of the computer-accessible instructions may embody and/or may be executed to perform at least a part of one or more of the example methods described below. The portion of the computer-accessible instructions may be retained (e.g., stored, made available, or stored and made available) in a computer storage non-transitory medium and executed by a processor. The one or more computer-accessible instructions that embody a software component may be assembled into one or more program modules, for example, that may be compiled, linked, and/or executed at the computing device 610 or other computing devices. Generally, such program modules comprise computer code, routines, programs, objects, components, information structures (e.g., data structures and/or metadata structures), etc., that may perform particular tasks (e.g., one or more operations) in response to execution by one or more processors, which may be integrated into the computing device 610 or functionally coupled thereto.

Various example embodiments may be operational with various other general purpose or special purpose computing system environments or configurations. Examples of well-known computing systems, environments, and/or configurations that may be suitable for implementation of various aspects or features of the disclosure may include personal computers; server computers; laptop devices; handheld computing devices, such as mobile tablets or e-readers; wearable computing devices; and multiprocessor systems. Additional examples may include set-top boxes, programmable consumer electronics, network personal computers (PCs), minicomputers, mainframe computers, blade computers, programmable logic controllers, distributed computing environments that include any of the above systems or devices, etc.

As illustrated in FIG. 6, computing device 610 may include one or more processors 614, one or more input/output (I/O) interfaces 616, a memory 630, and a bus architecture 632 (also termed bus 632) that functionally couples various functional elements of the computing device 610. In certain embodiments, the computing device 610 may include, optionally, a radio unit 612. Radio unit 612 may include one or more antennas and a communication processing unit that may permit wireless communication between the computing device 610 and another device, such as computing device(s) 670. Bus 632 may include at least one of a system bus, a memory bus, an address bus, or a message bus, and may permit the exchange of information (data, metadata, and/or signaling) between the processor(s) 614, the I/O interface(s) 616, and/or the memory 630, or respective functional elements therein. In certain scenarios, bus 632 in conjunction with one or more internal programming interfaces 650 (also referred to as interface(s) 650) may permit such exchange of information. In scenarios in which processor(s) 614 include multiple processors, computing device 610 may utilize parallel computing processes.

I/O interface(s) 616, of FIG. 6, may permit communication of information between the computing device and an external device, such as another computing device (e.g., a network element or an end-user device). Such communication may include direct communication or indirect communication, such as the exchange of information between the computing device 610 and the external device via a network or elements thereof. As illustrated, I/O interface(s) 616 may comprise one or more of network adapter(s) 618, peripheral adapter(s) 622, and display unit(s) 626. Such adapter(s) may permit or facilitate connectivity between the external device and one or more of the processor(s) 614 or the memory 630. For example, the peripheral adapter(s) 622 may include a group of ports, which may include parallel ports, serial ports, Ethernet ports, V.35 ports, X.21 ports, etc. In certain embodiments, the parallel ports may comprise General Purpose Interface Bus (GPIB), IEEE-1284, while the serial ports may include Recommended Standard (RS)-232, V.11, Universal Serial Bus (USB), FireWire or IEEE-1394.

At least one of the network adapter(s) 618 may functionally couple the computing device 610 to one or more computing devices 670 via one or more traffic and signaling pipes 660 that may permit or facilitate the exchange of traffic 662 and signaling 664 between the computing device 610 and the one or more computing devices 670. Such network coupling provided at least in part by the at least one of the network adapter(s) 618 may be implemented in a wired environment, a wireless environment, or both. Information that is communicated by network adapter(s) 618 may result from the implementation of one or more operations of a method to generate output. Such output may be any form of visual representation, including, but not limited to, textual, graphical, animation, audio, tactile, etc.

In certain scenarios, each of the computing device(s) 670 may have substantially the same architecture as the computing device 610. Display unit(s) 626 may include functional elements (e.g., lights, such as light-emitting diodes; a display, such as a liquid crystal display (LCD), a plasma monitor, a light-emitting diode (LED) monitor, an electrochromic monitor; combinations thereof; etc.) that may permit control of the operation of the computing device 610, or may permit conveying or revealing the operational conditions of the computing device 610.

Bus 632 represents one of several possible types of bus structures, including a memory bus or a memory controller, a peripheral bus, an accelerated graphics port, and a processor or local bus using any of a variety of bus architectures. As an illustration, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), etc.

Bus 632, and all buses described herein may be implemented over a wired or wireless network connection and each of the subsystems, including processor(s) 614, memory 630 and memory elements therein, and I/O interface(s) 616 may be contained within one or more remote computing devices 670 at physically separate locations, connected through buses of this form, in effect implementing a fully distributed system.

In certain embodiments, as illustrated in FIG. 6, such a distributed system may implement the functionality described herein in a client-host or client-server configuration in which the access and identification component(s) 636 (e.g., of functionality instructions storage 636, described below) or the access and identification information 640 (e.g., of functionality information storage 640, described below), or both, may be distributed between the computing device 610 and at least one of computing device(s) 670. In this regard, computing device 610 and at least one of computing device(s) 670 may execute such components and/or leverage such information. In an embodiment in which the computing device 610 embodies or constitutes a client device (e.g., client device 210, shown in FIG. 2), the access and identification component(s) 636 may be different from those in an embodiment in which the computing device 610 embodies or constitutes a server device (e.g., server device 120a or server device 120b of FIG. 1, of server device 160 of FIG. 1A) or an interface unit 140 (e.g., see FIG. 1).

Computing device 610, of FIG. 6, may comprise a variety of computer-readable storage media. Computer-readable storage media may be any available media (transitory and non-transitory) that may be accessed by a computing device. Computer-readable media may comprise computer non-transitory storage media (or computer-readable non-transitory storage media) and communications media. Example computer-readable non-transitory storage media may be any available media that may be accessed by the computing device 610, and may comprise, for example, both volatile and non-volatile media, and removable and/or non-removable media. In one aspect, the memory 630 may comprise computer-readable media in the form of volatile memory, such as random access memory (RAM), and/or non-volatile memory, such as read-only memory (ROM).

Memory 630, of FIG. 6, may comprise functionality instructions storage 634 and functionality information storage 638. The functionality instructions storage 634 may comprise computer-readable program instructions that, in response to execution (by at least one of the processor(s) 614), may implement one or more of the functionalities of the disclosure. The computer-accessible instructions may embody or may comprise one or more software components illustrated as access and identification component(s) 636, mentioned above. Execution of computer program instructions corresponding to at least one component of the access and identification component(s) 636 may implement one or more of the methods described herein, such as the example methods 700, 750, 800, 900, 1000, 1100, 1200, and 1300, of FIGS. 7A, 7B, and 8-13, respectively.

For instance, such execution may cause a processor (e.g., one of the processor(s) 614 of FIG. 6) that executes the at least one component to carry out a disclosed example method. A processor 614 that executes computer program instructions corresponding to at least one of the access and identification component(s) 636 may retrieve information from or retain information in one or more memory elements 630 in the functionality information storage 638 in order to operate in accordance with the functionality programmed or otherwise configured by the access and identification component(s) 636. The one or more memory elements 630 may embody at least some of the repositories coupled to the interface unit 140 (e.g., see FIG. 1). Such elements may be referred to as access and identification information 640 and may include at least one of code instructions, information structures, etc. For instance, at least a portion of such information structures may be indicative or otherwise representative of elements retained in the repositories functionally coupled to the interface 140 (e.g., see FIG. 1).

An interface 650 (e.g., an API), of FIG. 6, may permit or facilitate communication of information between two or more components within the functionality instructions storage 634. The information that is communicated by the interface 650 may result from an implementation of one or more operations of a disclosed method. One or more of the functionality instructions storage 634 and the functionality information storage 638 may be embodied in or may comprise removable/non-removable, and/or volatile/non-volatile computer storage media.

Computer program instructions associated with the access and identification component(s) 636 or with the access and identification information 640 may program or otherwise configure one or more of the processors 614 to provide functionality as described herein (e.g., see FIG. 6). One or more of the processor(s) 614 may execute at least one of the access and identification component(s) 636 and leverage at least a portion of the information in the functionality information storage 638 to provide access control and identification of user devices.

The functionality instructions storage 634, of FIG. 6, may embody or may comprise a computer-readable non-transitory storage medium having computer-accessible instructions stored thereon that, when executed by a processor 614, cause the processor 614 to perform operations comprising the operations or blocks associated with methods disclosed below.

In addition, memory 630, of FIG. 6, may comprise computer-accessible instructions and information (e.g., data, metadata, and/or programming code instructions) that permit or facilitate the operation and/or administration (e.g., upgrades, software installation, any other configuration, etc.) of the computing device 610. Accordingly, as illustrated, memory 630 may comprise a memory element 642 (labeled operating system (OS) instruction(s) 642) that contains one or more program modules that embody or include one or more operating systems, such as Windows operating system, Unix, Linux, Symbian, Android, Chromium, and substantially any OS suitable for mobile computing devices or tethered computing devices. The operational and/or architectural complexity of the computing device 610 may dictate a suitable OS. Memory 630 may also include an information storage 646 having data, metadata, and/or programming code that permits or facilitates the operation and/or administration of computing device 610. Elements of OS instruction(s) 642 and system information storage 646 may be accessible or may be executed by at least one of processor(s) 614.

While functionality instructions storage 634, of FIG. 6, and other executable program components, such as OS instruction(s) 642, are illustrated herein as discrete blocks, such software components may reside at various times in different memory components of computing device 610, and may be executed by at least one of processor(s) 614. In certain scenarios, an implementation of access and identification component(s) 636 may be retained on or transmitted across some form of computer-readable media.

Computing device 610 and/or one of computing device(s) 670, of FIG. 6, may include a power supply (not shown), which may supply electrical power to components or functional elements within such devices. The power supply may be a rechargeable power supply (e.g., a rechargeable battery), and may include one or more transformers to achieve a power level suitable for the operation of the computing device 610 and/or one of the computing device(s) 670, and components, functional elements, and related circuitry therein. The power supply may be attached to a conventional power grid to recharge and ensure that such devices may be operational. The power supply may include an I/O interface (e.g., one of network adapter(s) 618 shown in FIG. 6) to connect operationally to the conventional power grid. Further, the power supply may include an energy conversion component, such as a solar panel, to provide additional or alternative power resources or autonomy for the computing device 610 and/or one of the computing device(s) 670.

Computing device 610, of FIG. 6, may operate in a networked environment by utilizing connections to one or more remote computing devices 670. As an illustration, a remote computing device 670 may be a personal computer, a portable computer, a server, a router, a network computer, a peer device or other common network node, and so on. As described herein, connections (physical and/or logical) between the computing device 610 and a remote computing device 670 may be made via one or more traffic and signaling pipes 660, which may include wired link(s) and/or wireless link(s) and several network elements (such as routers or switches, concentrators, servers, and the like) that form a LAN, a MAN, a WAN, and/or other networks (wireless or wired) having different footprints. Such networking environments may be implemented in dwellings, offices, enterprise-wide computer networks, intranets, local area networks, and wide area networks.

Access keys may be received by barcode/QR code scanners, Bluetooth readers, chip readers, radio signal readers, among other electronic receiving and processing devices. The reader devices (also referred to as beacon devices, such a beacon devices 104a and 104b of FIG. 1)—whichever type they may be (or location of installment) may be functionally coupled (e.g., wirelessly coupled) to a client device (e.g., client devices 110a and 110b of FIG. 1).

The functionality of client devices (e.g., user devices 110a and 110b of FIG. 1, client devices 210a and 210b of FIG. 4) and server devices (e.g., server device 120a or server device 120b of FIG. 1) may be leveraged or utilized in multiple scenarios. As is illustrated in FIGS. 40-47, for example, such functionality may be utilized or otherwise leveraged in a housing unit for a receiver device controlled in accordance with disclosed methods. The housing unit may be configured to interact with the mobile app via at least one barcode scanner in the unit connected to a computing device such that the at least one barcode scanner or scanner responds to a signal from the mobile app to, for example, unlock a door of a house. Multiple housing units may be secured to different areas in a house, as described in greater detail below.

Various techniques for access control and/or identification of user devices (e.g., user devices 110a and 110b of FIG. 1, which may be mobile computing devices) may be implemented. An example of such techniques may be better appreciated with reference to the flowcharts provided in FIGS. 7A-13. For simplicity of explanation, example methods are described with reference to FIGS. 7A-13 as a series of blocks (with each block representing an action or an operation in a method, for example). However, such example methods are not limited by the order of blocks and associated actions or operations, as some blocks may occur in different orders and/or concurrently with other blocks from those that are shown and described herein. For example, the disclosed methods (or processes or techniques) may be alternatively represented as a series of interrelated states or events, such as in a state diagram. Furthermore, not all illustrated blocks, and associated action(s), may be required to implement a disclosed method. Similarly, two or more disclosed methods or processes may be implemented in combination with each other, to accomplish one or more features or advantages.

The techniques of this disclosure may be implemented as computer program instructions that may be stored on an article of manufacture, or computer-readable medium. Storage of computer program instructions may facilitate transfer of disclosed methods to a computing device (e.g., a desktop computer; a mobile computer, such as a tablet, or a smartphone; a gaming console, a mobile telephone; a blade computer; a programmable logic controller, etc.). The stored instructions may then be executed by a processor of the computing device and/or may be stored in a memory device thereof. The code instructions may provide a computer-executable or machine-executable framework to implement the disclosed techniques.

Figure 7A:
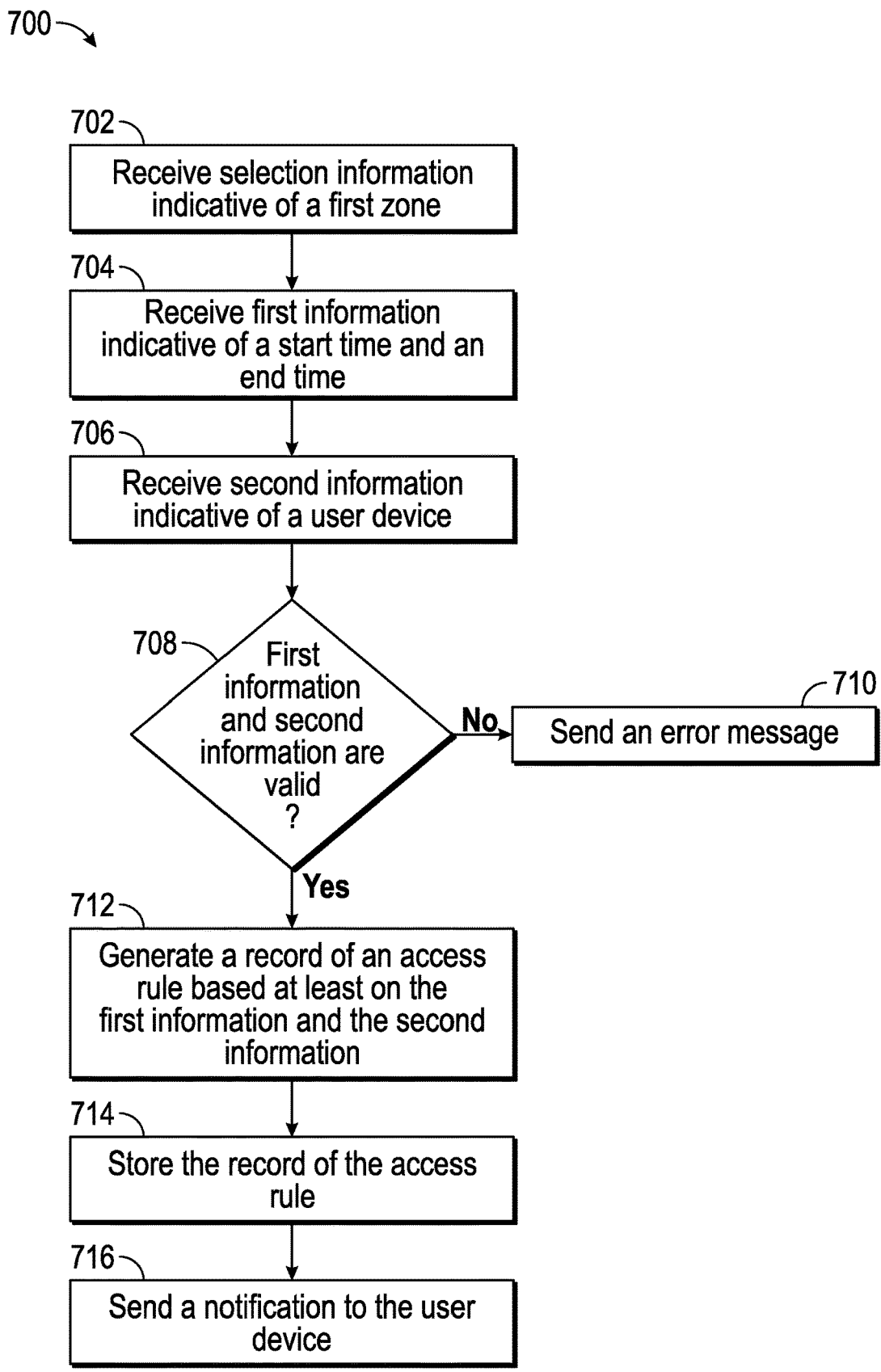
FIG. 7A is a flowchart illustrating an example method for generating an access rule, according to an embodiment.

FIGS. 7A-13 illustrate example methods for access control and/or identification of user devices. FIG. 7A is a flow chart illustrating an example method 700 that generates an access rule in accordance with one or more embodiments. The example method 700 may be implemented by one or more computing devices. At block 702, the method includes receiving selection information indicative of a first zone. At block 704, the method includes receiving first information of a start time and an end time. At block 706, the method includes receiving second information indicative of a user device. At block 708, the method includes determining if the first information and the second information are valid. When the first and second information are determined in block 708 to be not valid, the method includes sending an error message at block 710. When the first and second information are determined in block 708 to be valid, the method includes generating a record of an access rule based at least on the first information and the second information at block 712. At block 714, the method may include storing the record of the access rule. At block 716, the method may include sending a notification to the user device in accordance with aspects of this disclosure.

Figure 7B:
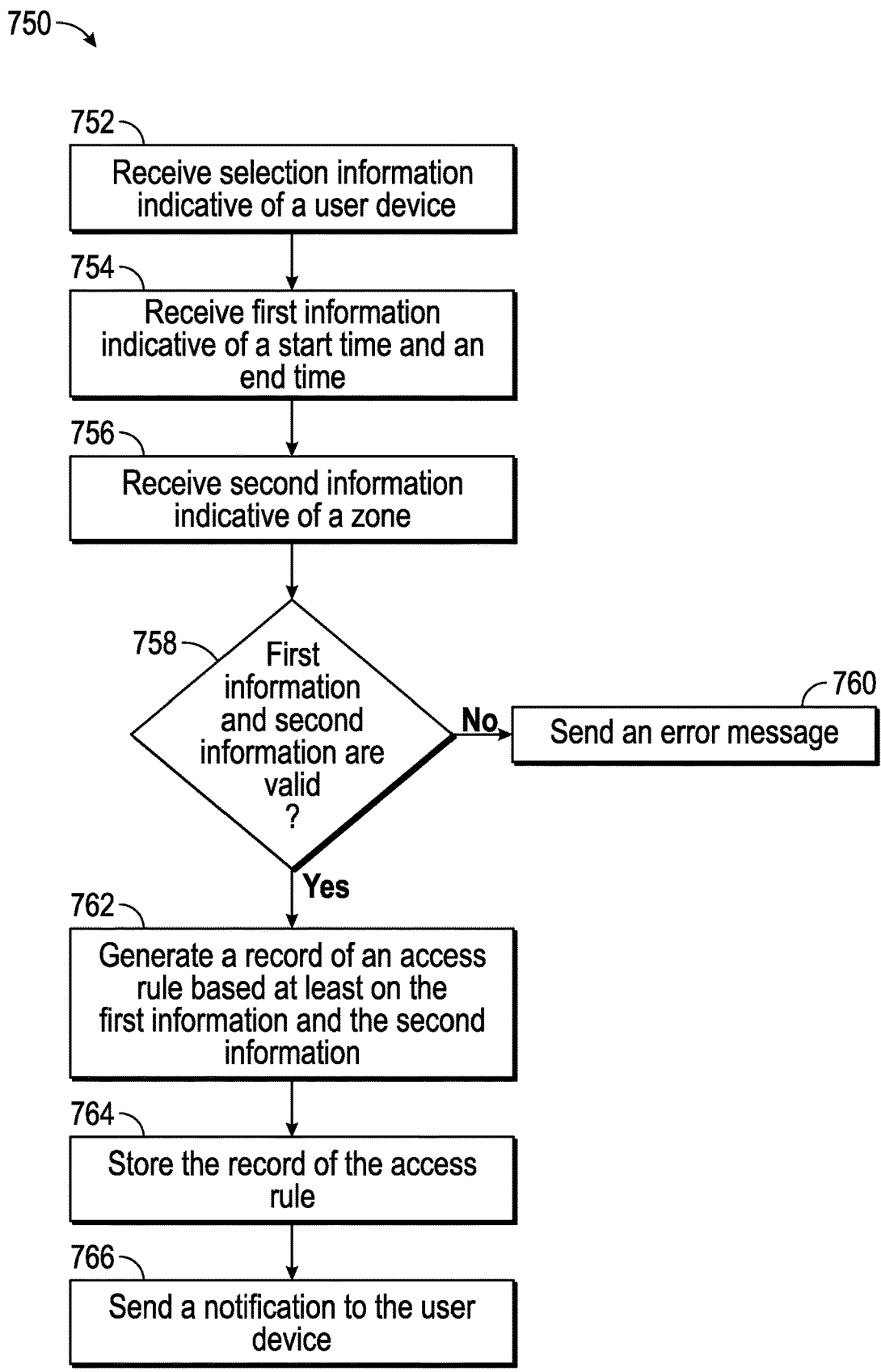
FIG. 7B is a flowchart illustrating an example method for generating an access rule, according to an embodiment.

FIG. 7B is a flow chart illustrating an example method 750 for generating an access rule, according to one or more embodiments. The example method 750 may be implemented by one or more computing devices. At block 752, the method includes receiving selection information indicative of a user device. At block 754, the method includes receiving first information indicative of a start time and an end time. At block 756, the method includes receiving second information indicative of a zone. At block 758, the method includes determining if the first information and the second information are valid. When the first and second information are determined in block 758 to be not valid, the method includes sending an error message at block 760. When the first and second information are determined in block 758 to be valid, the method, at block 762, includes generating a record of an access rule based at least on the first information and the second information. At block 764, the method includes storing the record of the access rule. At block 766, the method includes sending a notification to the user device.

Figure 8:
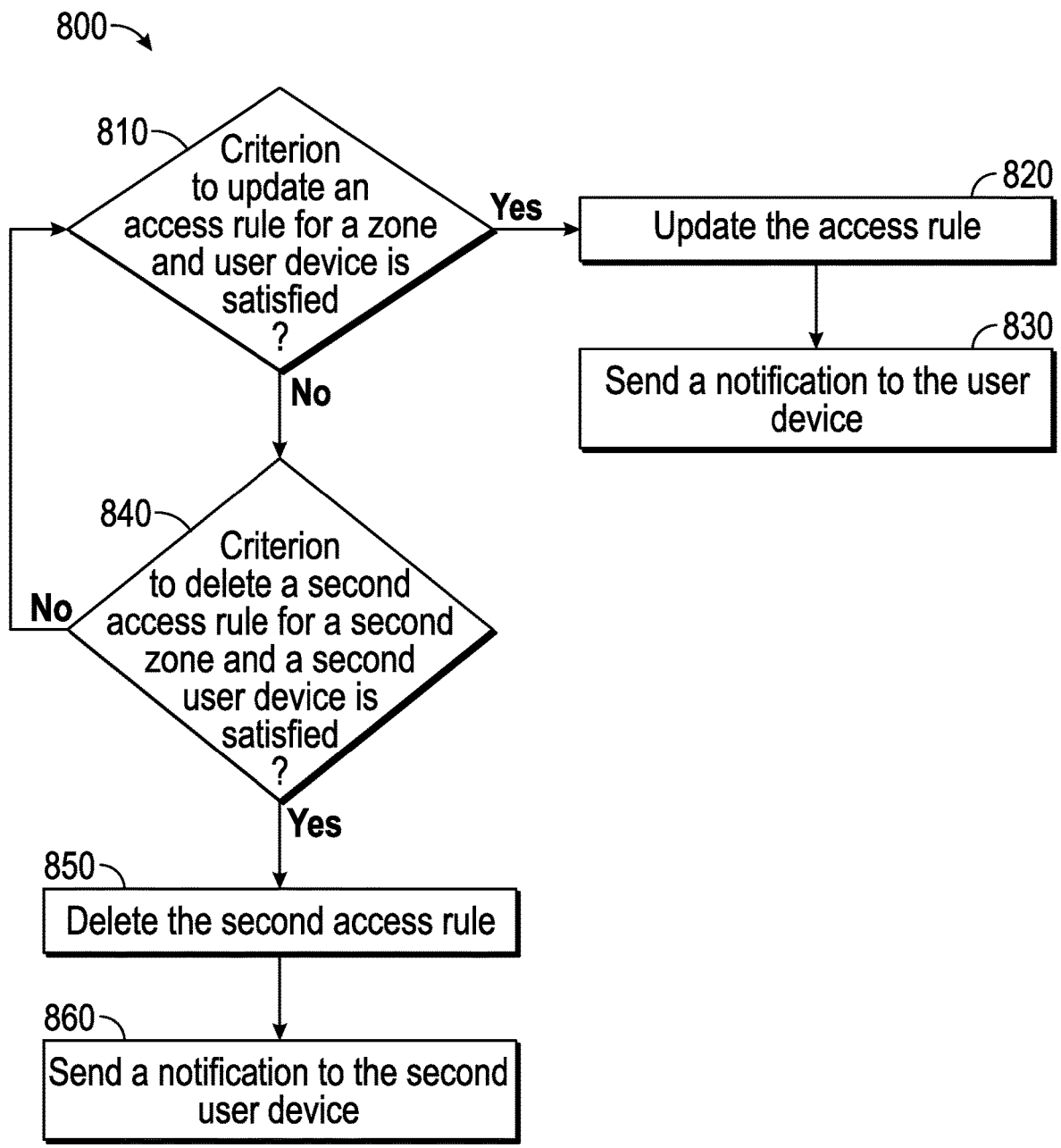
FIG. 8 is a flowchart illustrating an example method for changing access rules, according to an embodiment.

FIG. 8 is a flow chart illustrating an example method 800 for changing access rules, according to one or more embodiments. The example method 800 may be implemented by one or more computing devices. At block 810, the method may include determining whether a criterion to update an access rule for a zone and user device is satisfied. When, at block 810, the method determines that the criterion is satisfied, the method includes updating the access rule at block 820. At block 830, the method may include sending a notification to the user device. When at block 810 the method determines that the criterion is not satisfied, the method may include determining at block 840 whether a criterion to delete a second access rule for a second zone and a second user device is satisfied. At block 840 when the method determines that the criterion to delete a second access rule for a second zone is not satisfied, the method may include returning to block 810. When at block 840 the method determines that the criterion to delete a second access rule for a second zone is satisfied, the method may include deleting the second access rule at block 850. At block 860, the method may include sending a notification to the second user device.

Figure 9:
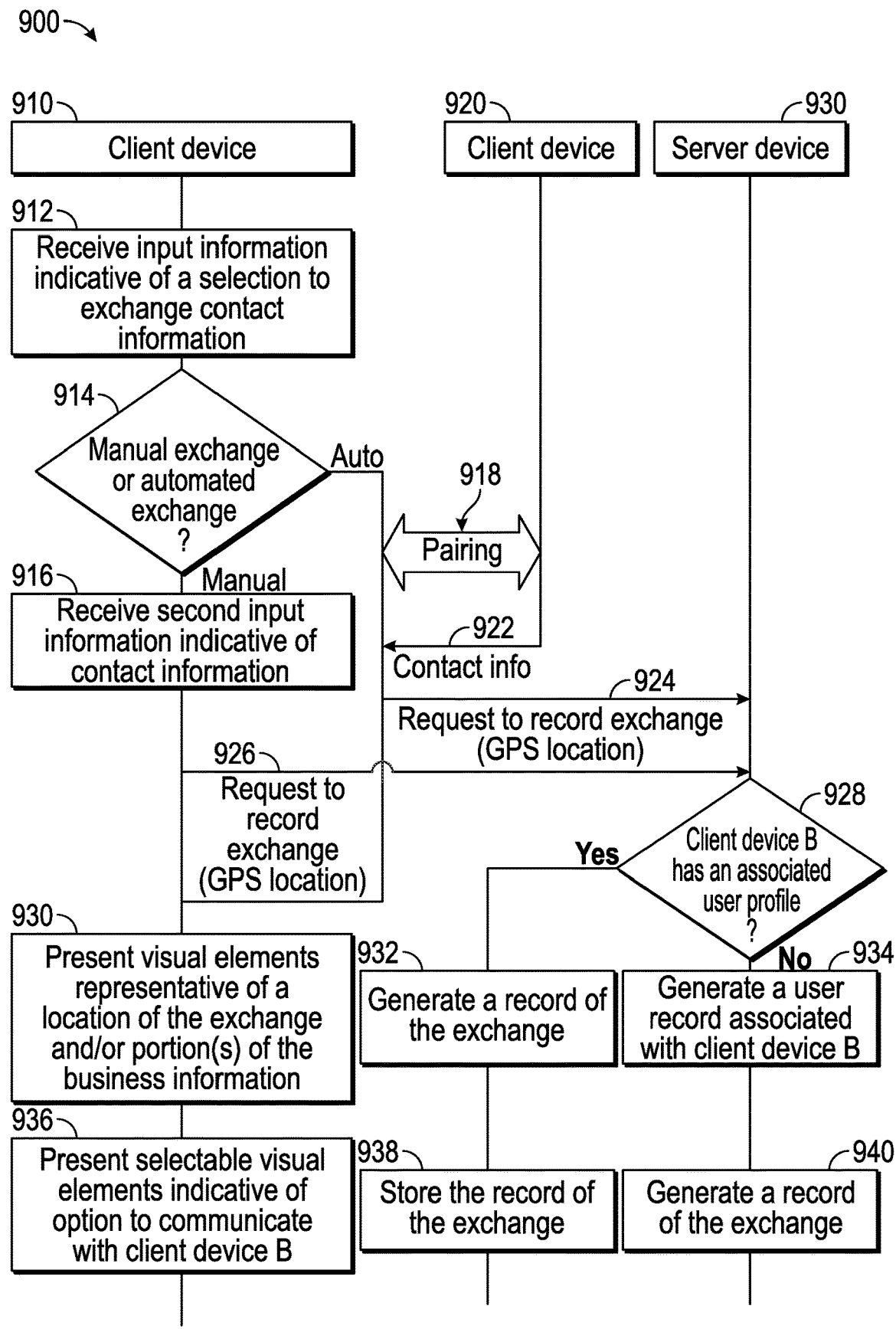
FIG. 9 is a flowchart illustrating an example method for exchanging contact information, according to an embodiment.

FIG. 9 is a flow chart illustrating an example method 900 for activating a client device (e.g., user device 110a and/or 110b of FIG. 1) for access control and identification, according to one or more embodiments. At block 912, a client device 910 may receive input information indicative of a selection to exchange contact information (e.g., a business card) with another client device (e.g., user device 110). At block 914, client device 910 may determine if the exchange is a manual exchange or an automated exchange. In response to the exchange being manual ("Manual" branch), the client device 910 may receive, at block 916, second input information indicative of contact information. At block 926, client device 910 may send a request to a server device 930 to record the exchange of information. The request may include location information, such as a GPS location estimate, representative of the location of the device at the time or nearly at the time the information is exchanged. In the alternative, in response to an automated exchange ("Auto" branch), client device 910 and a client device 920 may establish a connection by pairing 918 or otherwise attaching to each other.

After or upon the connection is established, client device 920 may send contact information 922 to client device 910. In response to receipt of contact information (e.g., name(s), address, place of business, etc.), at block 924, client device 910 may send a request to server device 930 to record the exchange of information. Server device 930 may determine, at block 928, whether the client device 920 has an associated user profile (e.g., one of the user profiles 151 retained in user repository 150, shown in FIG. 1). In response to a positive determination ("Yes" branch), at block 928, server device 930, in block 932, may generate a record of the exchange of the contact information. At block 938, server device 930 may store the record of the exchange of the contact information. In response to a negative determination ("No" branch), at block 928, the server device 930, in block 934, may generate a user record associated with the client device. At block 940, the server device 930 may generate a record of the exchange.

Figure 10:
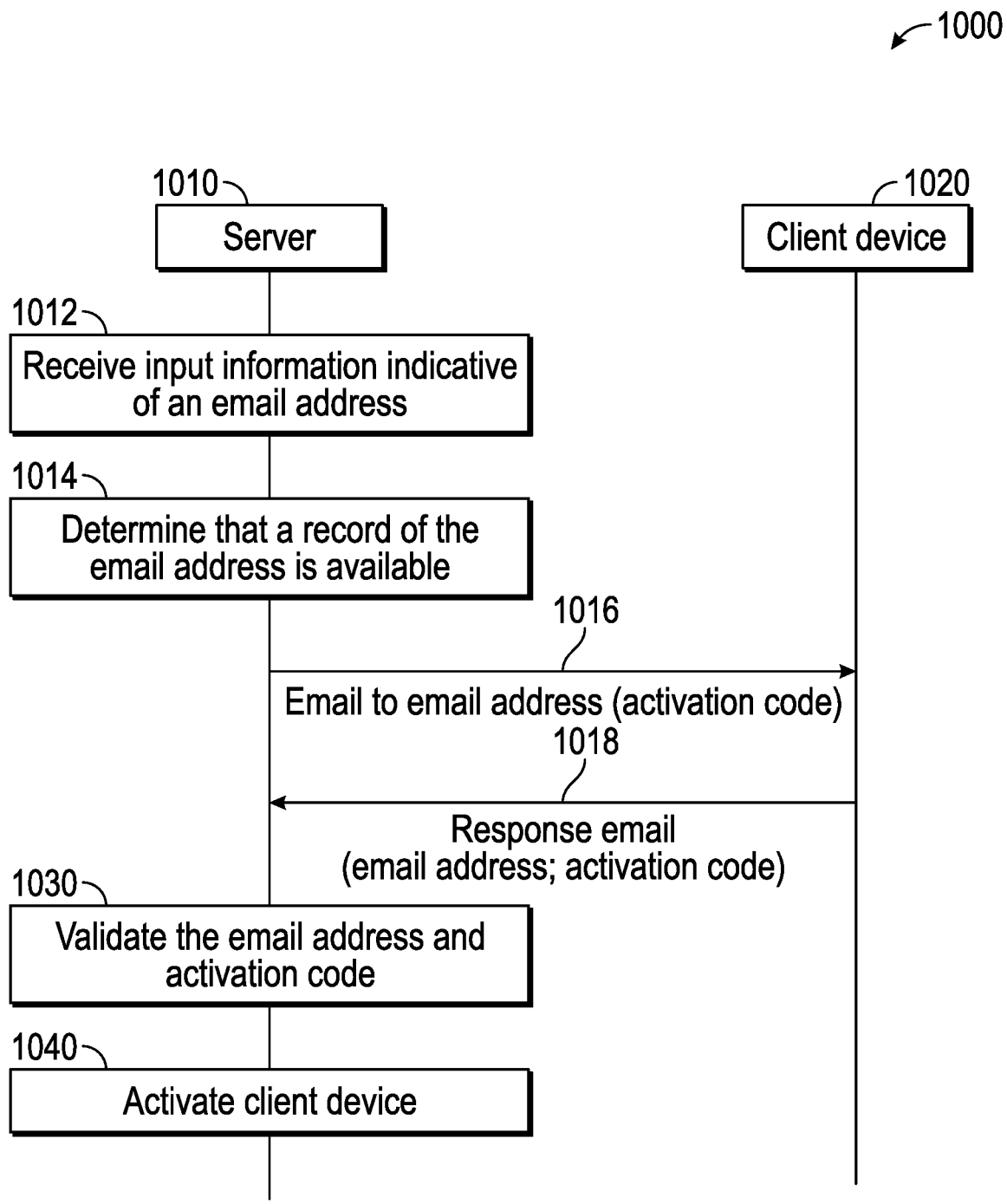
FIG. 10 is a flowchart illustrating an example method for activating a client device for access control and identification, according to an embodiment.

FIG. 10 is a flow chart illustrating an example method 1000 for exchange of contact information, according to one or more embodiments. At block 1012, a server device 1010 may receive input information indicative of an email address. At block 1014, the server device 1010 may determine that a record of the email address is available. For instance, the server device may determine that the email address is available in a user profile 151 retained in user repository 150 (e.g., see FIG. 1). At 1016, the server device may send an email to the email address. The email may include an activation code (e.g., a numeric code or an alphanumeric code). A client device 1020 may receive the email and, at 1018, the client device 1020 may send a response email to the server device 1010. The response email may include the email address and the activation code. At block 1030, the server device 1010 may validate the email address and the activation code. At block 1040, the server device may activate the client device 1020.

Figure 11:
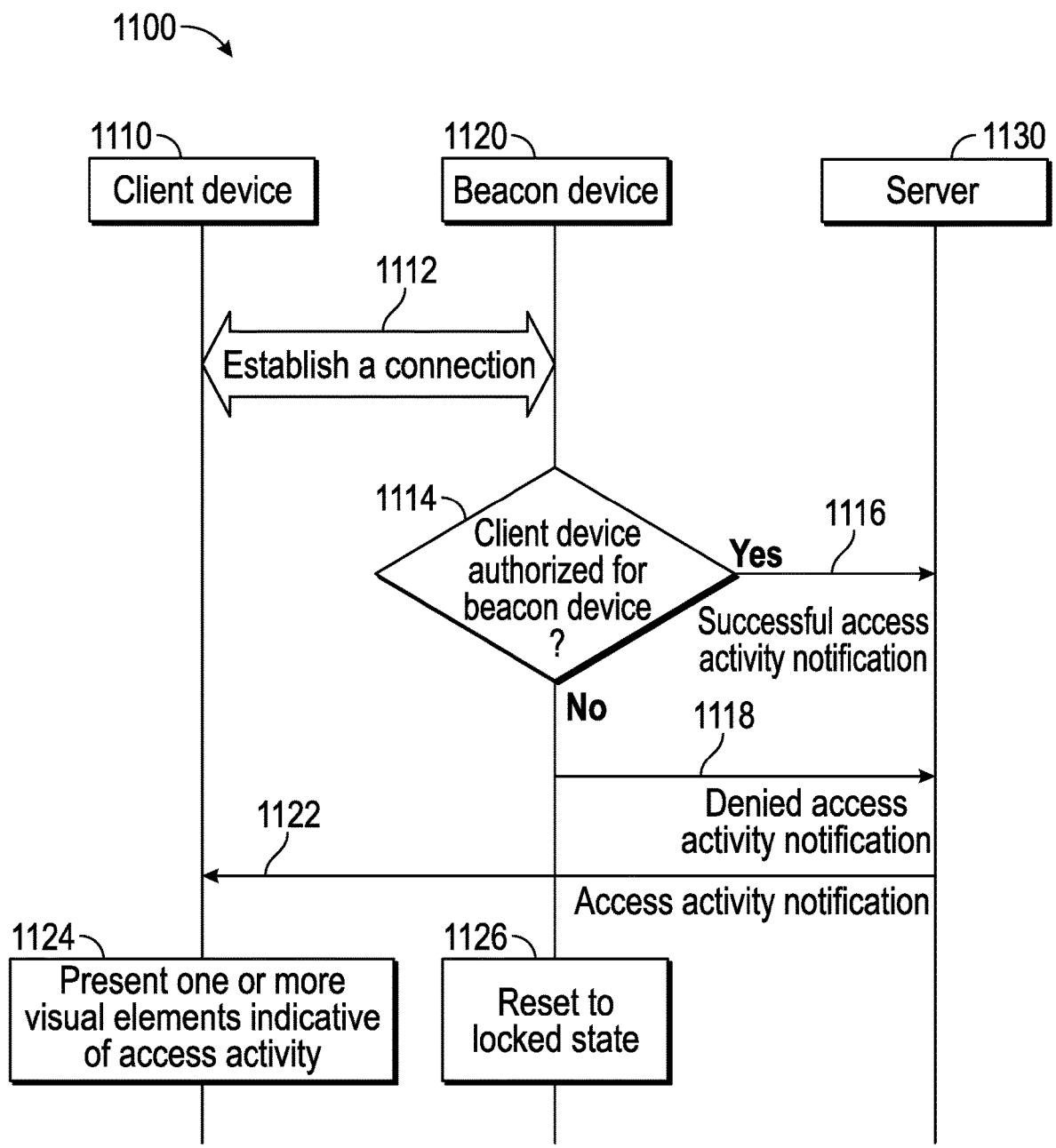
FIG. 11 is a flowchart illustrating an example method for interaction between a client device and a beacon device, according to an embodiment.

FIG. 11 is a flow chart illustrating an example method 1100 for interaction between a client device 1110 and a beacon device 1120, according to one or more embodiments. At block 1112, the client device 1110 and the beacon device 1120 (e.g., beacon device 104a or beacon device 104b, shown in FIG. 1) may establish a connection for wireless communication between such devices. At block 1114, the beacon device 1120 may determine whether the client device is authorized to communicate with beacon device 1120. In response to a positive determination, at 1116, the beacon device 1120 may send, to the server device 1130, a notification or another type of indication of successful access activity. In response to a negative determination, at 1118, the beacon device 1120 may send, to the server device 1130, a notification or another type of indication of denied access activity. At block 1122, the server device 1130 may send an access notification or another type of indication to the client device 1110. At block 1124, the client device 1110 may present one or more visual elements indicative of access activity. At block 1126 the beacon device 1120 may send a message to a locking device (e.g., locking device 106a and/or 106b, shown in FIG. 1) to return to a locked state.

Figure 12:
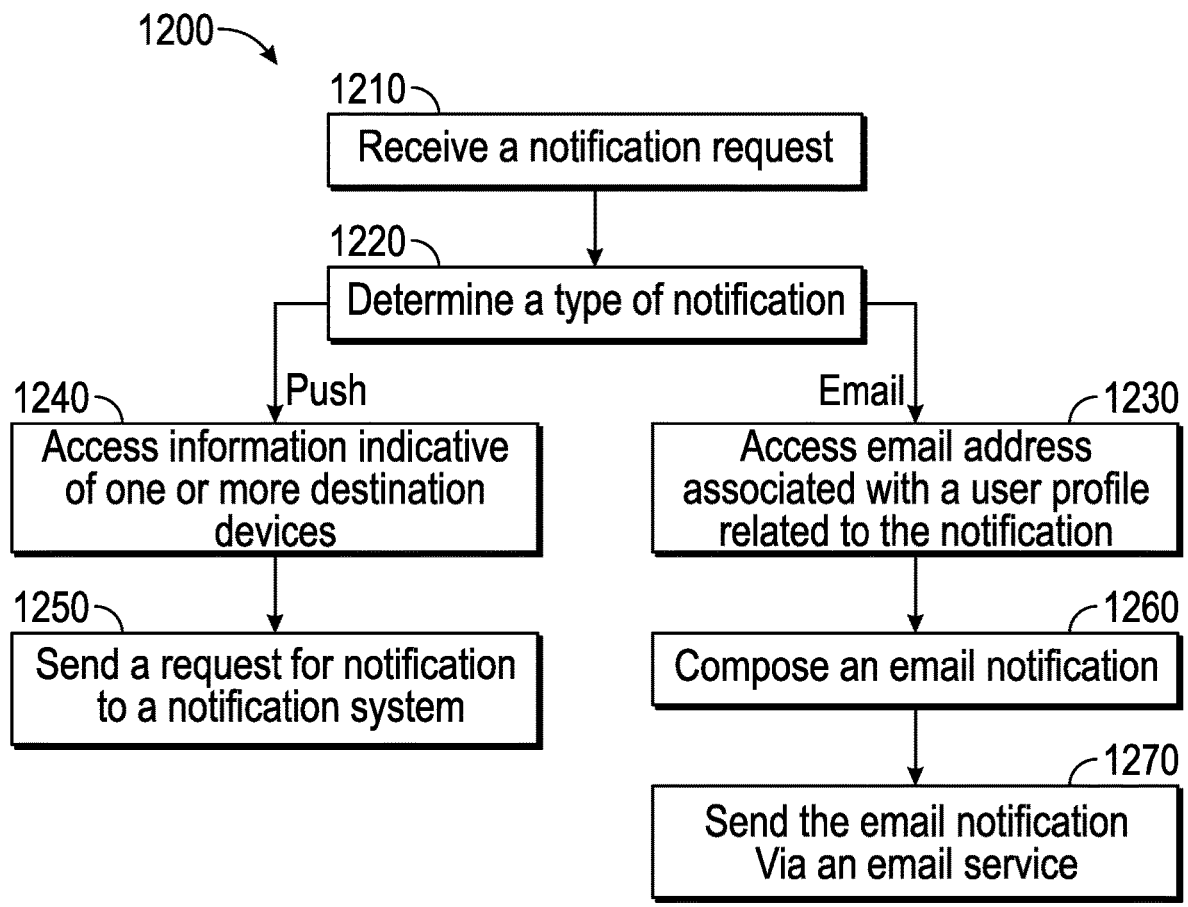
FIG. 12 is a flowchart illustrating an example method for notifying a client device, according to an embodiment.

FIG. 12 is a flow chart illustrating an example method 1200 for notifying a client device, according to one or more embodiments. One or more computing devices may implement at least a portion of the method 1200. In this regard, a processor of a computing device may execute computer program instructions that cause the processor perform operations of method 1200. At block 1210, the one or more computing devices may receive a notification request. At block 1220, the one or more computing devices may determine a type notification, for example, an email notification or a push notification. For a push notification ("Push" branch), at block 1240, the one or more computing devices may determine access information indicative of one or more destination devices. At block 1250, the one or more computing devices may send a request for notification to a notification system. For an email notification ("Email" branch), at block 1230, the one or more computing devices may access an email address associated with a user profile related to the notification. At block 1260, the one or more computing devices may compose or otherwise generate an email notification. At block 1270, the one or more computing devices may send the email notification via an email service.

Figure 13:
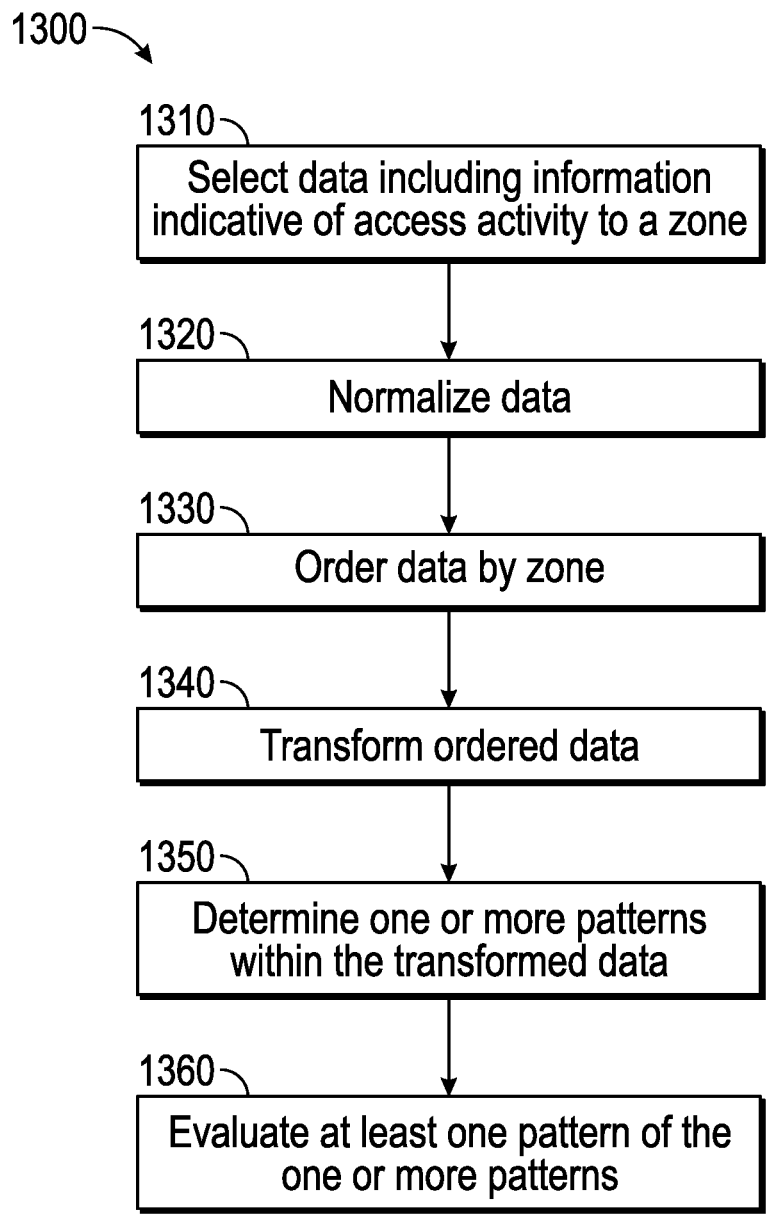
FIG. 13 is a flowchart illustrating an example method for determining features from data associated with access control and identification, according to an embodiment.

FIG. 13 is a flow chart illustrating an example method 1300 for determining features from data associated with access control and identification, according to one or more embodiments. Example method 1300 may be implemented by one or more computing devices. In one example, such devices may embody or may constitute the insight engine unit 510 (e.g., see FIG. 5). At block 1310, the one or more computing devices may select data including information indicative of access activity to a zone. At block 1320, the one or more computing devices may normalize the data. At block 1330, the one or more computing devices may order data by zone (e.g., zone 102a or zone 102b of FIG. 1). At block 1340, the one or more computing devices may transform the ordered data. At block 1350, the one or more computing devices may determine one or more patterns within the transformed data. At block 1360, the one or more computing device may evaluate at least one of the one or more patterns.

Figure 14:
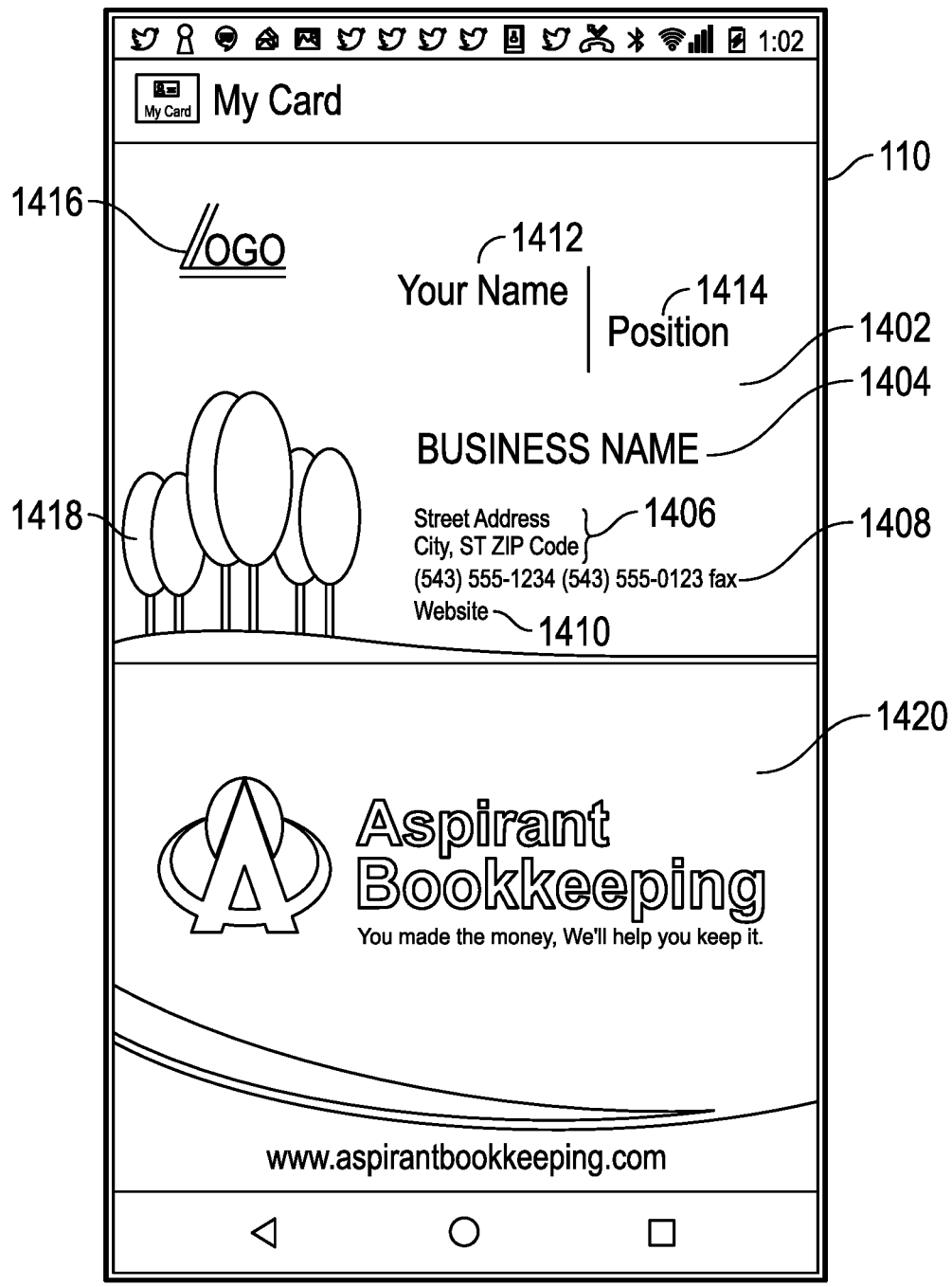
FIG. 14 illustrates visual elements as may be displayed on a graphical user interface (GUI) of a client device 110, according to an embodiment.
Figure 16:
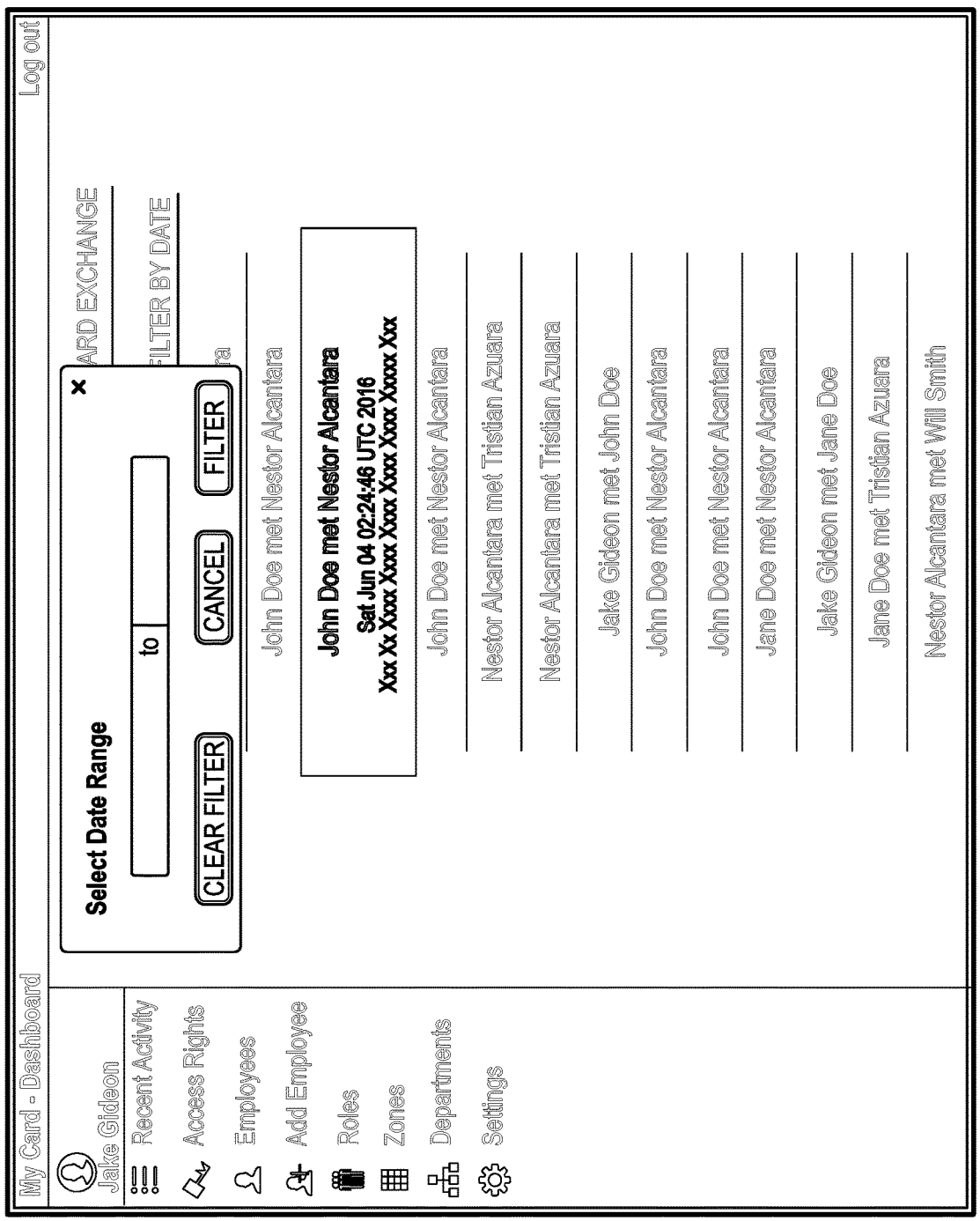
FIG. 16 illustrates an example user interface for access control and identification, according to an embodiment.
Figure 17:
FIG. 17 illustrates an example user interface for access control and identification, according to an embodiment.

The client device 210 and other client devices described herein may generate and display a digital business card, as is illustrated, for example, in FIG. 14. The user may upload a file of an existing physical business card to the mobile app. Alternatively a user may create a contact card within the mobile app. The functionality provided by the access and identification component(s) 246 (e.g., see FIG. 2) may be activated as described below. After or upon activation, the client device may begin receiving access keys and ID badges from the web app.

FIG. 14 illustrates visual elements that may be displayed on a GUI of a client device 110, according to an embodiment. In this example, the visual elements presented on the client device 110 were generated using the MyCard™ mobile app. The MyCard™ mobile app may generate and display one or more digital business cards. In this example, two digital business cards are displayed. A first digital business card may represent a template 1402 that may provide functionality for a user to create a new digital business card. As shown, there is a template field 1404 that may represent a place holder for a business name. A user may enter a business name in the template field 1404. Similarly, the template 1402 may provide fields 1406 in which a street address may be entered. The template 1402 may further include fields 1408 in which phone and fax numbers may be entered. The template 1402 may further allow additional information to be entered. For example, template 1402 may include a field 1410 that allows a website address to be entered. The template 1402 may further include fields 1412 and 1414 allowing a user to enter a name and position, respectively.

Template 1402 may include further visual elements 1416 and 1418 which may be used to represent a business logo. Template 1402 may allow a user to upload visual elements to represent desired visual elements 1416 and 1418. Visual elements 1416 and 1418 may be obtained in digital form from various sources. For example, visual elements 1416 and 1418 may be downloaded from an internet or cloud based source. Visual elements 1416 and 1418 may further be retrieved from a storage device on the client device 110. Visual elements 1416 and 1418 may also include digital images that may be captured by an image capture device. For example, a camera module 211 of client device 210 (e.g., see FIG. 2) may be used to capture one or more digital images that may be selected as visual elements 1416 and 1418.

FIG. 14 also presents a second digital business card 1420. Digital business card 1420 may be a digital business card that was previously created using a template similar to template 1402 and stored as card information 250 (e.g., see FIG. 2) on client device 210. Alternatively, digital business card 1420 may have been downloaded from an internet- or cloud-based source. Further, digital business card 1420 may have been captured using the camera module 211 of the client device 210. For example, as described above, when a user meets a colleague or new business contact, digital business cards may be exchanged. The exchange of digital business cards may take place in addition to or instead of the more traditional exchange of physical business cards. Digital business cards may be exchanged in a variety of ways. For example, a user may capture an image of a physical business card using a camera module 211 of the client device 210. Image processing techniques may then be applied to the captured image of the physical business card to extract information from the image. The extracted information may then be used as a representation of the digital business card. Alternatively, digital business cards may be transferred from one client device 110 to another client device through a wired or wireless connection.

In addition, the server device 160 may include or may be coupled to a display unit 168 that may present various interfaces that may permit administration of access rules, addition of user devices, removal of user devices, etc. As is illustrated, for example, in FIGS. 15, 16, 17, 18, 19, 20, and 21, the server device 160 may enable monitoring of recent activity, such as zone access activity and/or contact information exchange (e.g., card exchanges). Further, as is illustrated in FIGS. 24-25, the server device 160 may enable creation, control, and termination of zone access rights related to zones controlled or otherwise configured by the server device 160 or other server devices, in accordance with disclosed embodiments.

Figure 22:
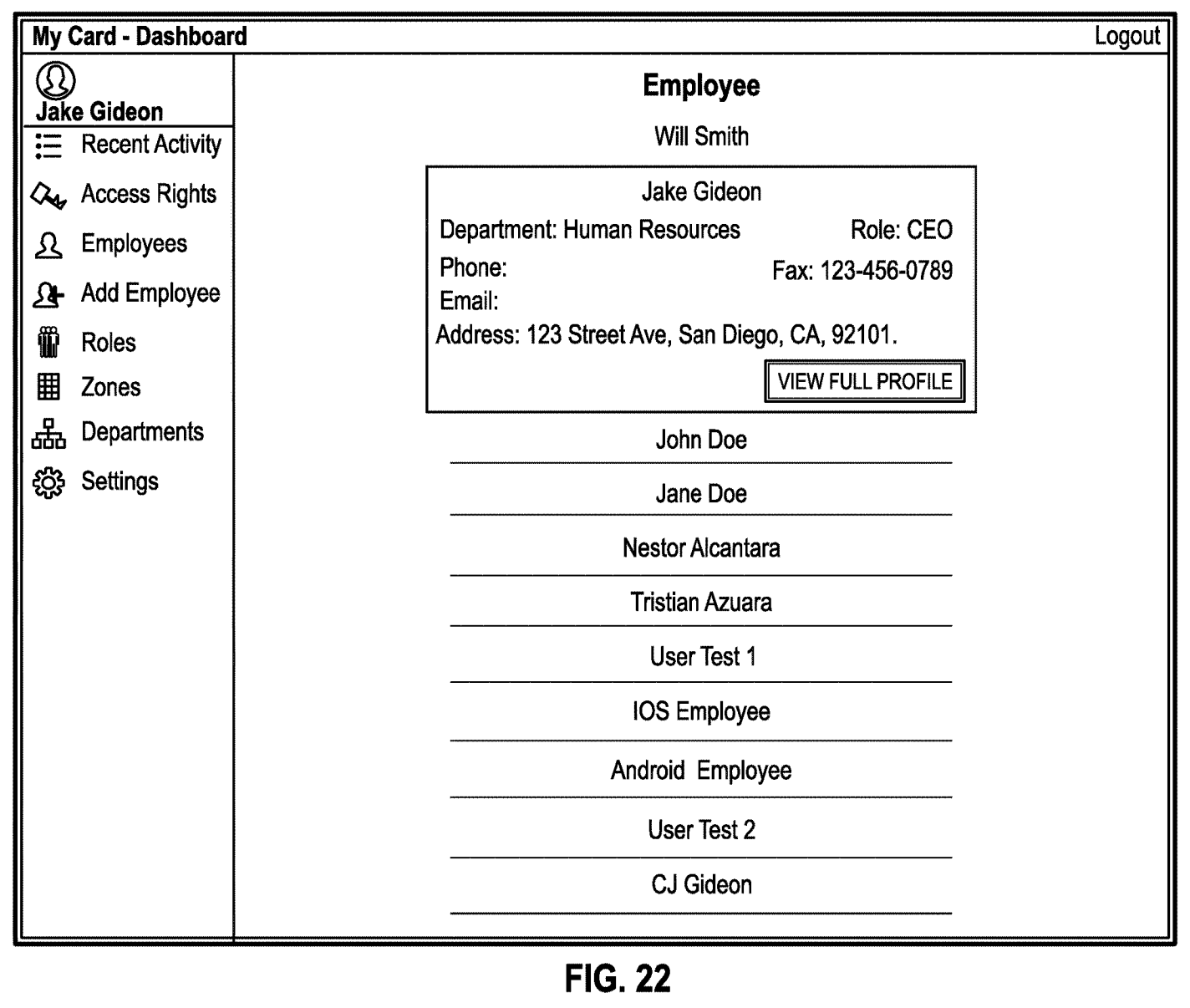
Figure 23:
FIG. 23 illustrates an example user interface for access control and identification, according to an embodiment.

As is illustrated in FIGS. 22-23, for example, the server device 160 may permit viewing information for employees or other end-users for which a user profile is available within the user repository 150. The information may include a name, picture, email, department (if applicable), address, fax number, phone number, or other relevant information. Server device 160 may also enable addition and creation of information related to employees/users and to define access to various zones. See, for example, FIG. 21. As illustrated in FIG. 23, the server device 160 may permit creating roles for employees/users within an organization that leverages or otherwise utilizes the server devices in accordance with disclosed embodiments.

Figure 24:
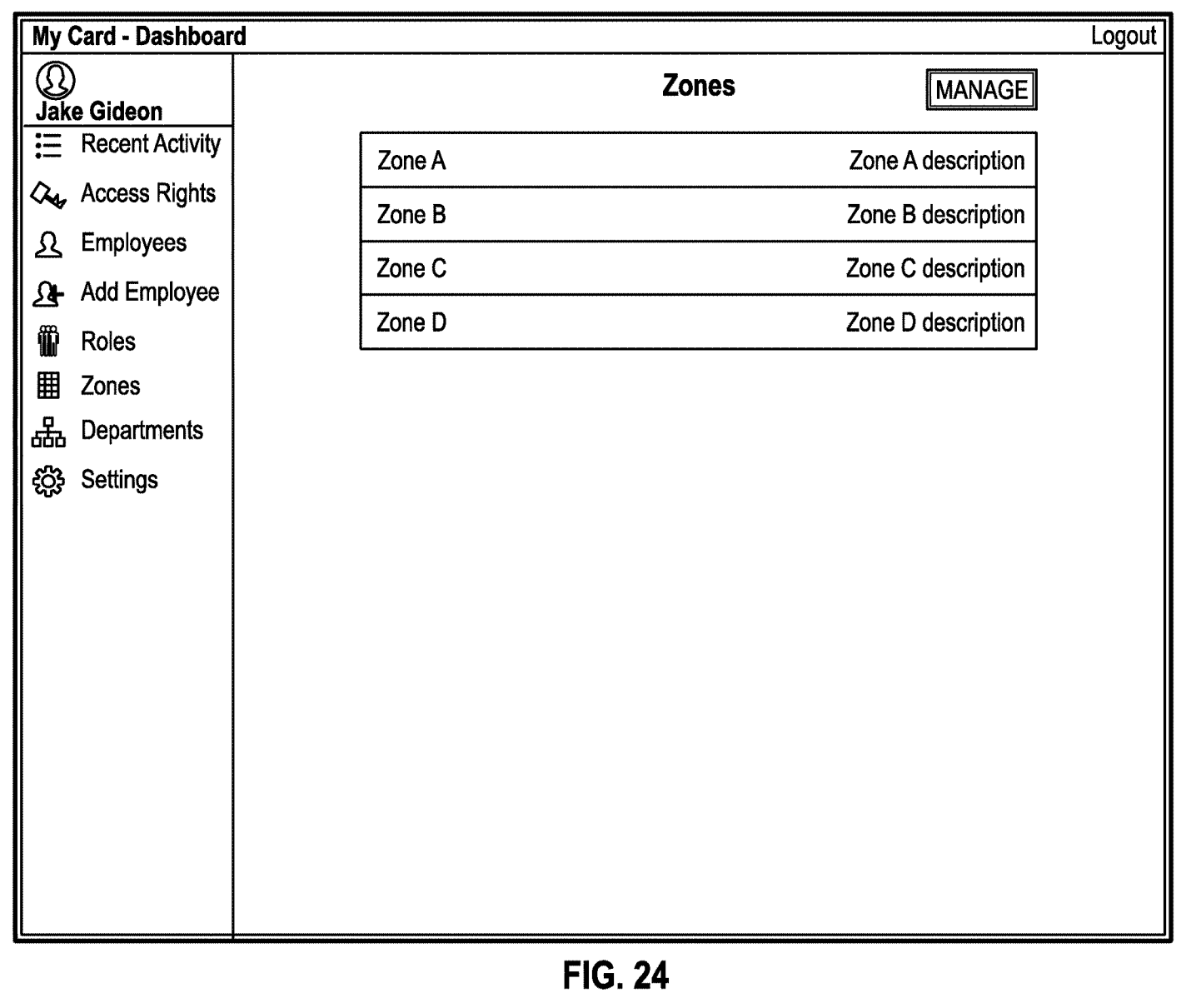

As is illustrate in FIG. 24, for example, the server device 160 may enable processing information related to management of employees. For example, the server device 160 may permit sending and/or updating access rights, deactivating user mobile devices, terminating zone access, uploading business cards for employees/users, and monitoring of an employee's recent activity. A manager device, for example, may deactivate a user's zone access at any time by electing an option to "deactivate device." A manager device may also be used to manage the user's access rights.

Figure 25:
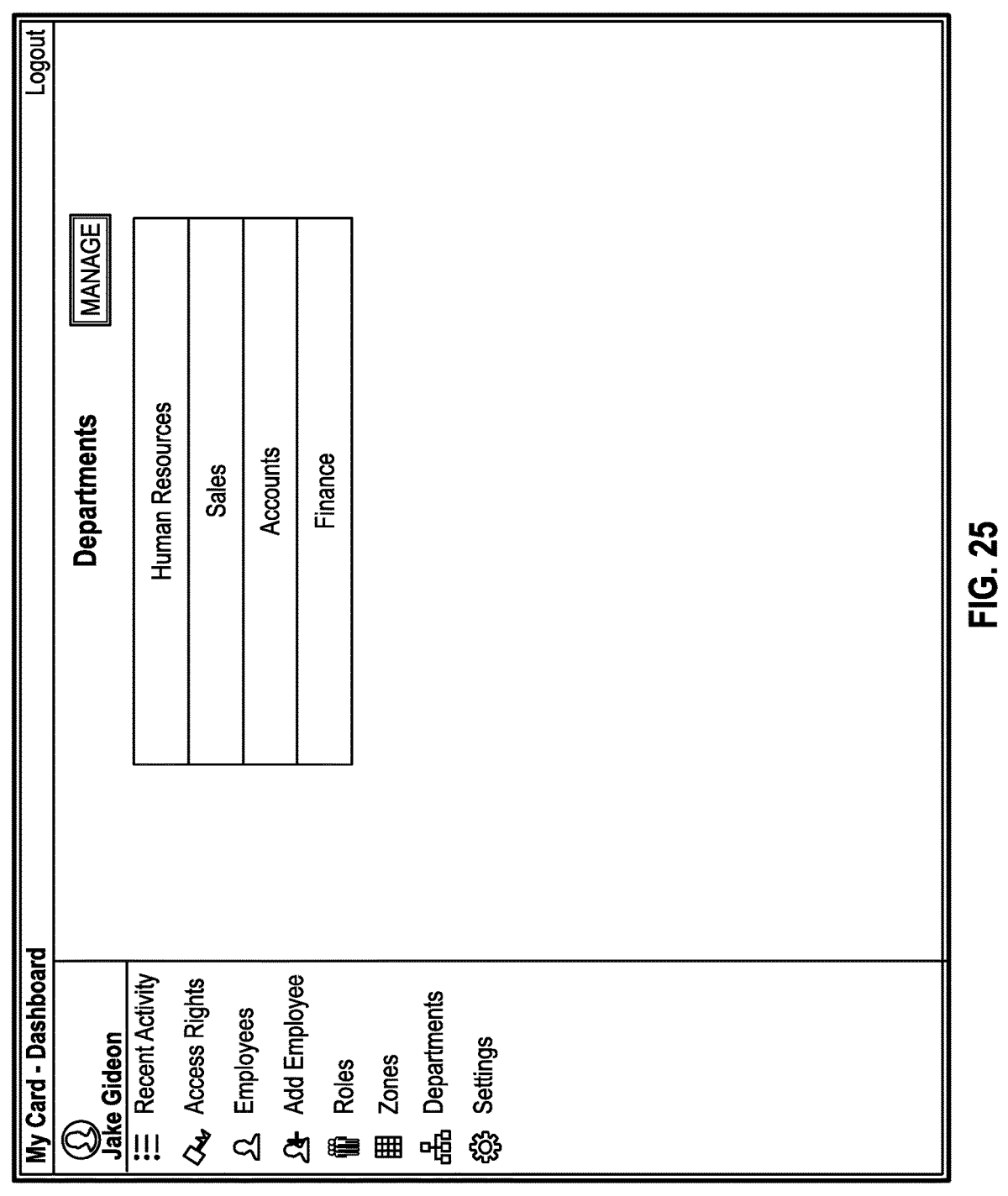

Similarly, as is illustrated in FIG. 25, the server device 160 may permit creation of information related to departments associated with employees/users within an organization that leverages or otherwise utilizes the server devices 160. Further, the server device 160 may permit or otherwise facilitate zone creation and definition of zone access rights. In addition, the server device may also permit, via at least a user interface, editing company settings and/or adding new managers authorized to operate the web app.

Figure 27:
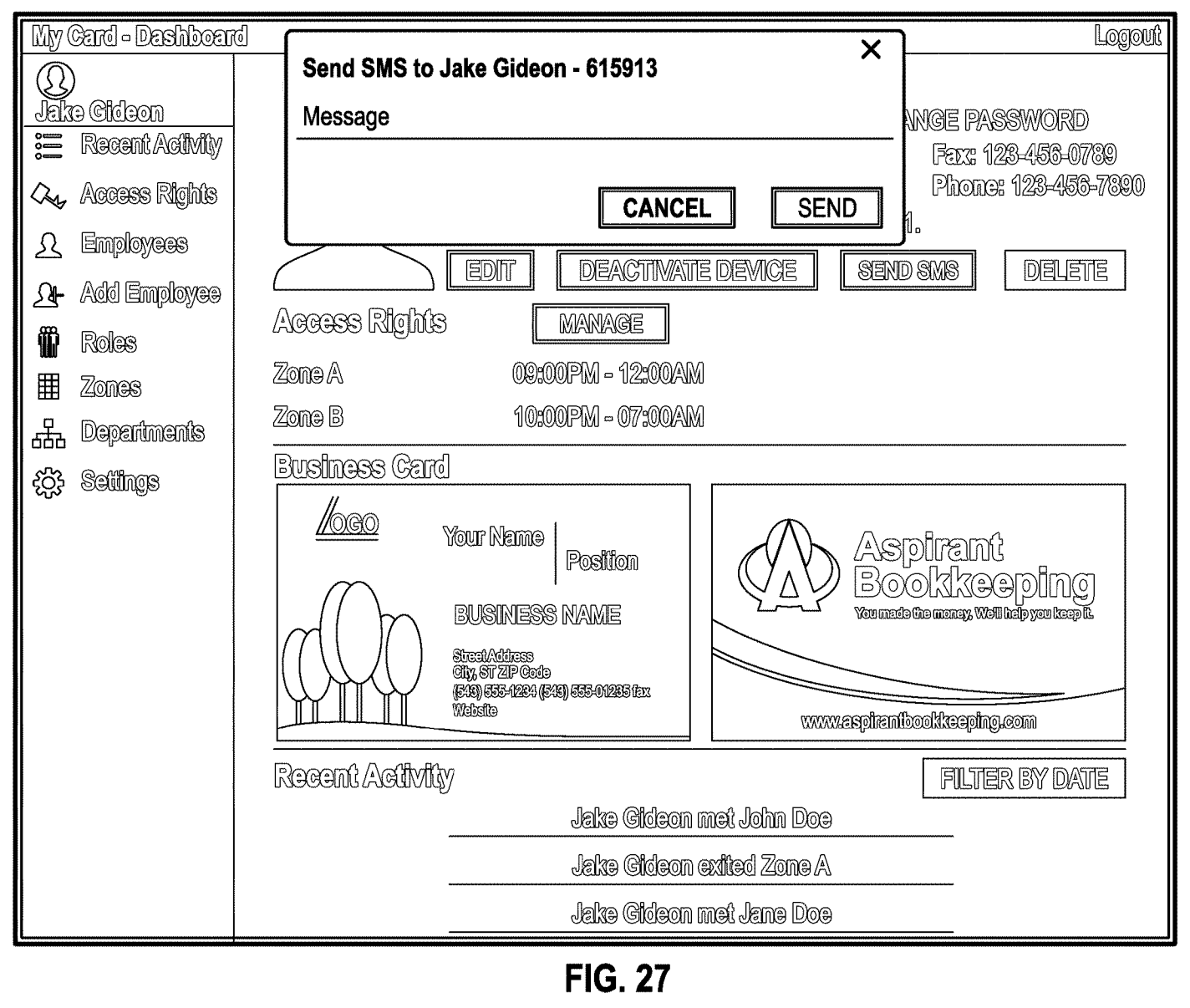
Figure 28:
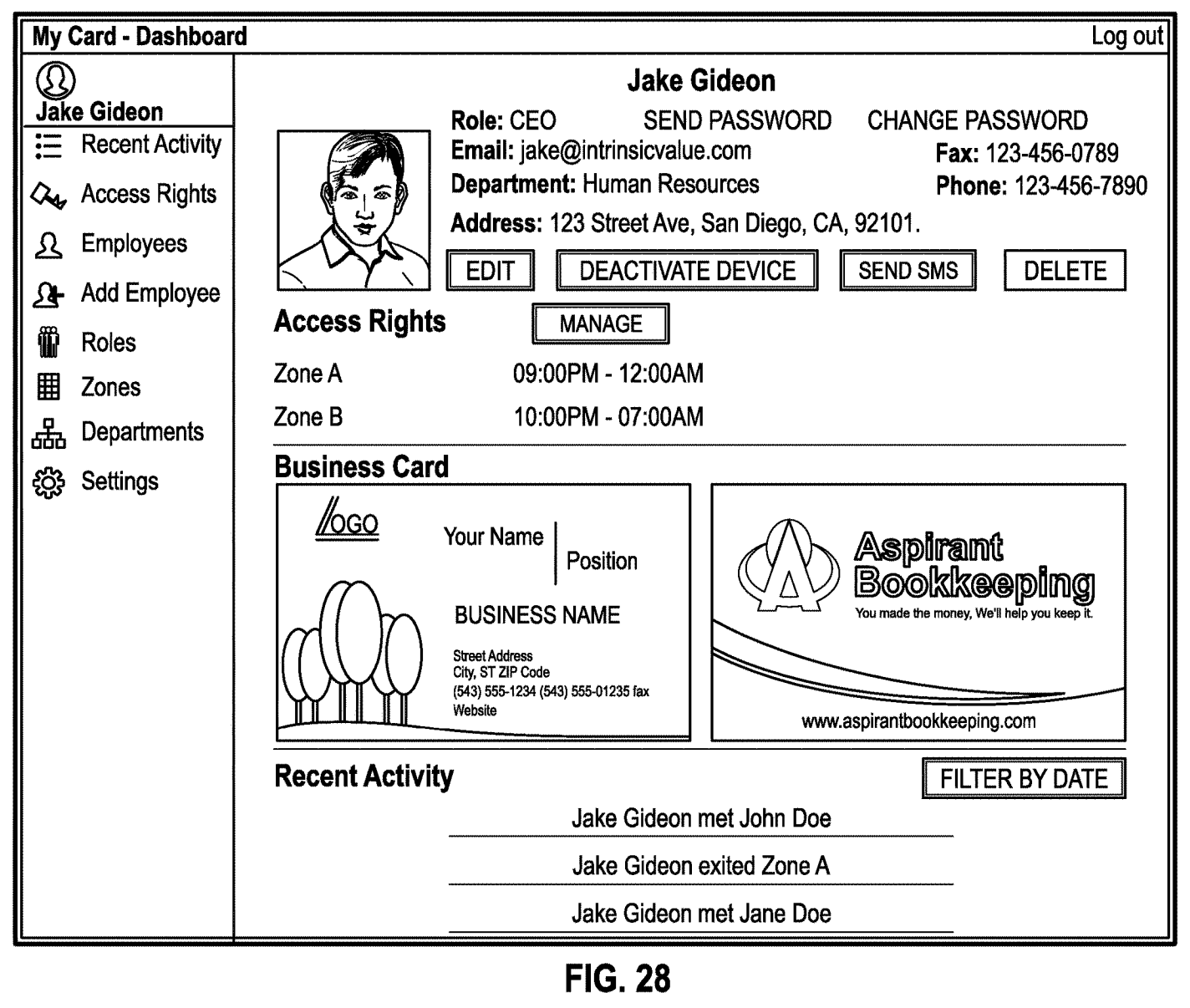

Further, as is illustrated in FIGS. 27-28, for example, the server device 160 may permit or otherwise facilitate sending messages to employees/clients mobile devices directly via SMS text message. Furthermore, as is also illustrated in FIGS. 27-28, the sever device 160 may generate access keys for devices used by new user. Upon creation of a new user's profile, a manager using a manager device may send an access code to a mobile device used by the new user, activating all of their access keys to specified zones.

Figure 29:
FIG. 29 illustrates an example user interface for access control and identification, according to an embodiment.

As is illustrated by FIG. 29, for example, the client device 210 may be utilized as a digital ID badge for an end-user. To that end, the display unit 204 may present a virtual ID badge using a mobile app (called MyCard in this example). Multiple ID badges may be stored within the MyCard app. For example, a user may have a digital work ID badge and government driver's license saved. Different IDs may be displayed as needed for various circumstances. In the interest of security and fraud protection, a badge on the MyCard app may be issued by an issuing authority that cannot be altered by a mobile user.

Figure 30:
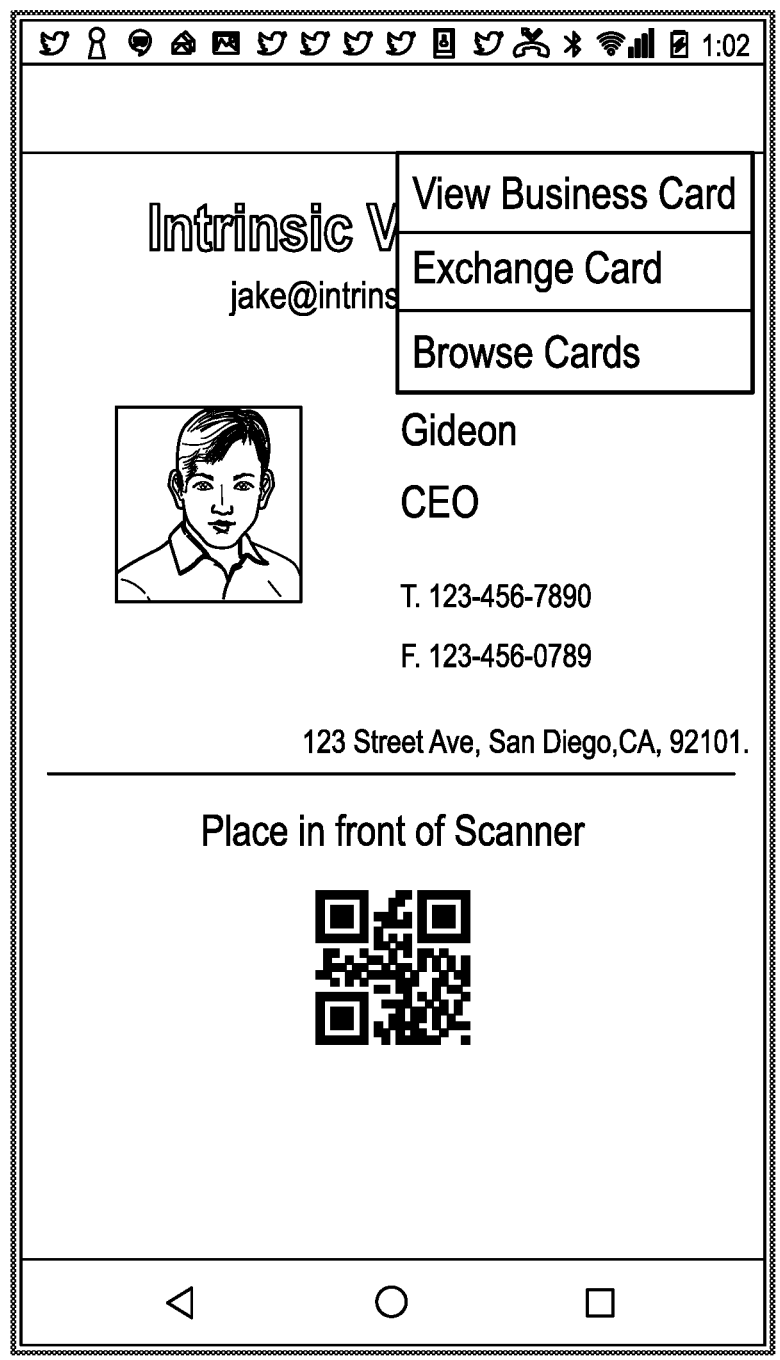
FIG. 30 illustrates an example user interface for access control and identification, according to an embodiment.
Figure 31:
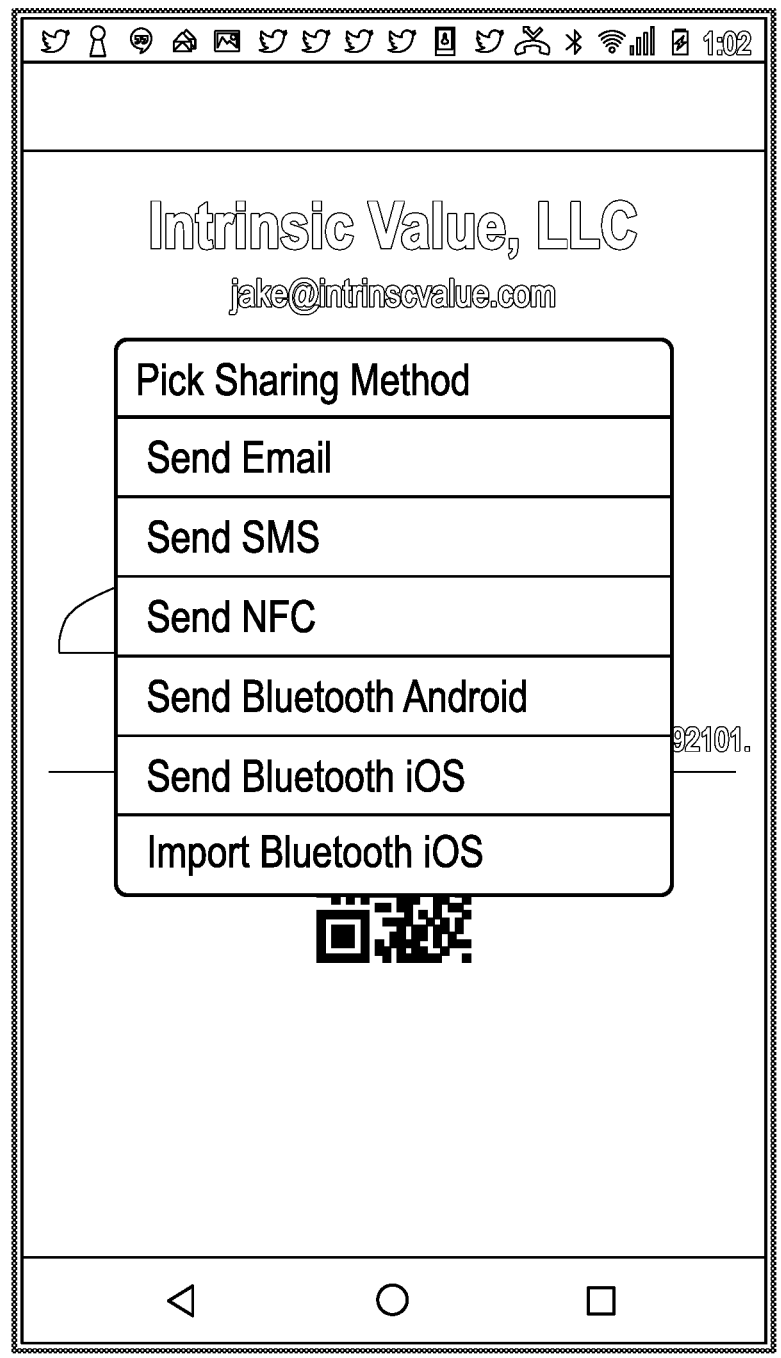
FIG. 31 illustrates an example user interface for access control and identification, according to an embodiment.

As illustrated in FIGS. 30 and 31, for example, digital business card may be transferred via SMS, NFC, Bluetooth, email, etc. Received cards may be stored, or uploaded directly to the MyCard mobile app. Cards (business or personal contact cards) may be created either by a manager (managing employees/clients) or by the mobile user. In addition, as is illustrated in FIG. 30, exchanged contacts may be searched in a contact database, which may be retained in the client device 210 or may be stored remotely.

Figure 32:
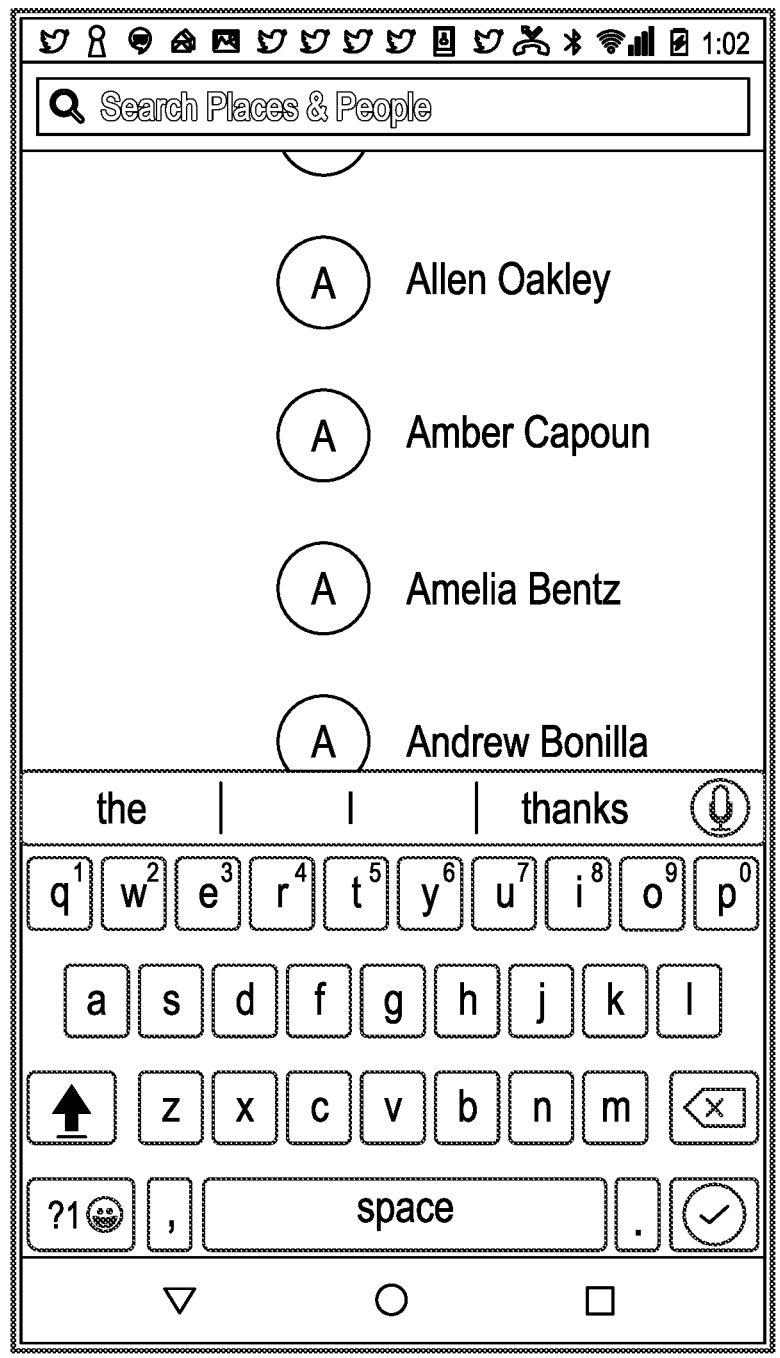
FIG. 32 illustrates an example user interface for access control and identification, according to an embodiment.
Figure 34:
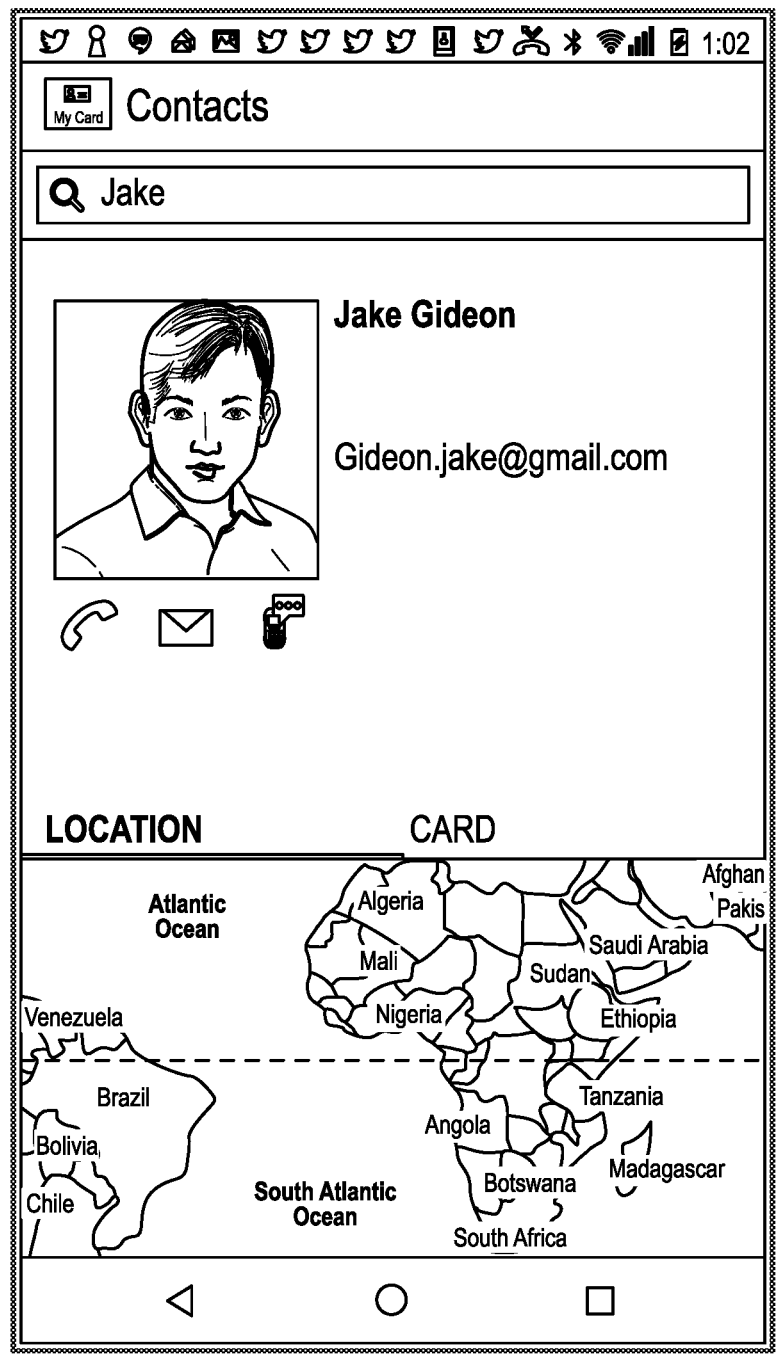
FIG. 34 illustrates an example user interface for access control and identification, according to an embodiment.
Figure 35:
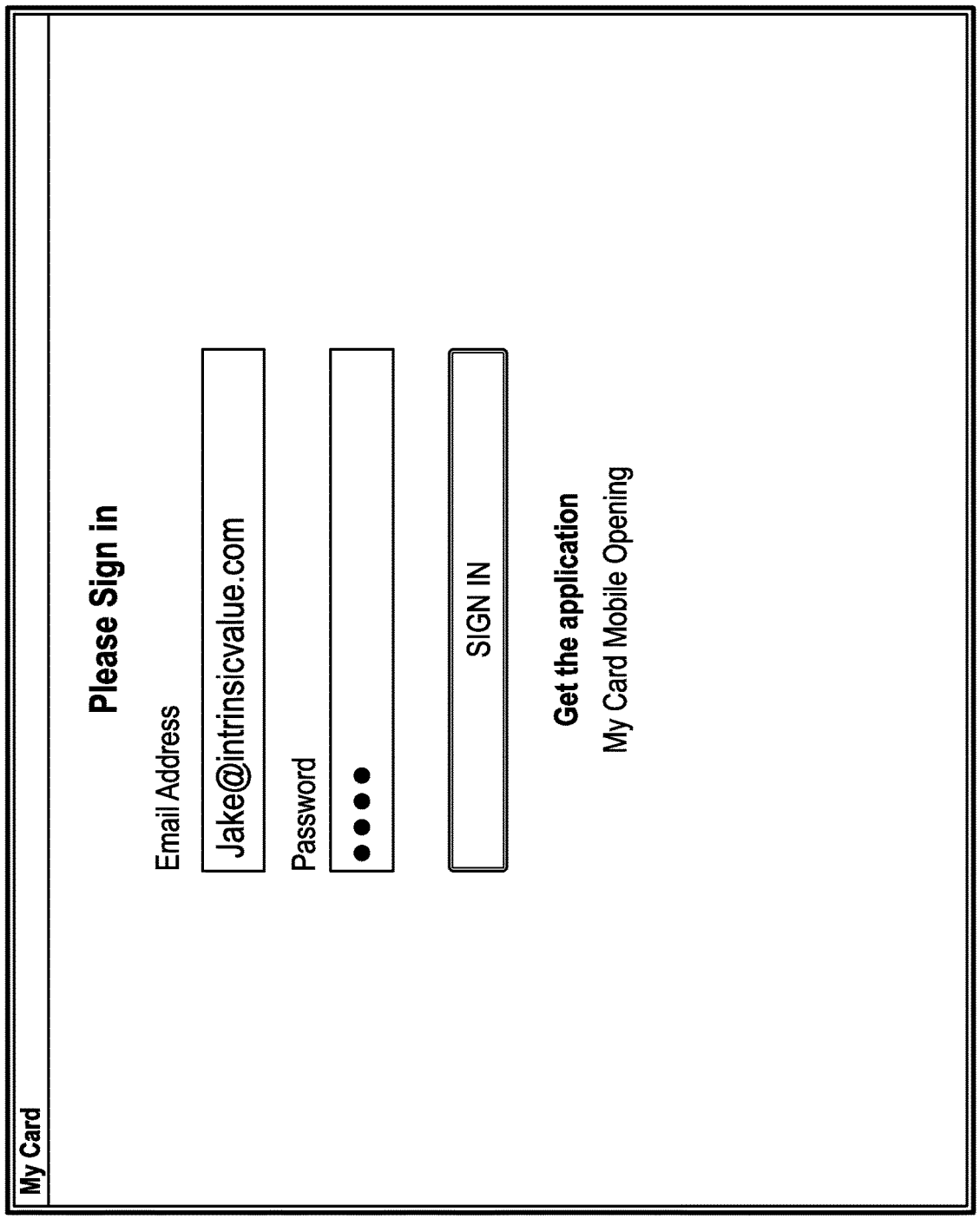
FIG. 35 illustrates an example user interface for access control and identification, according to an embodiment.
Figure 36:
FIG. 36 illustrates an example user interface for access control and identification, according to an embodiment.
Figure 37:
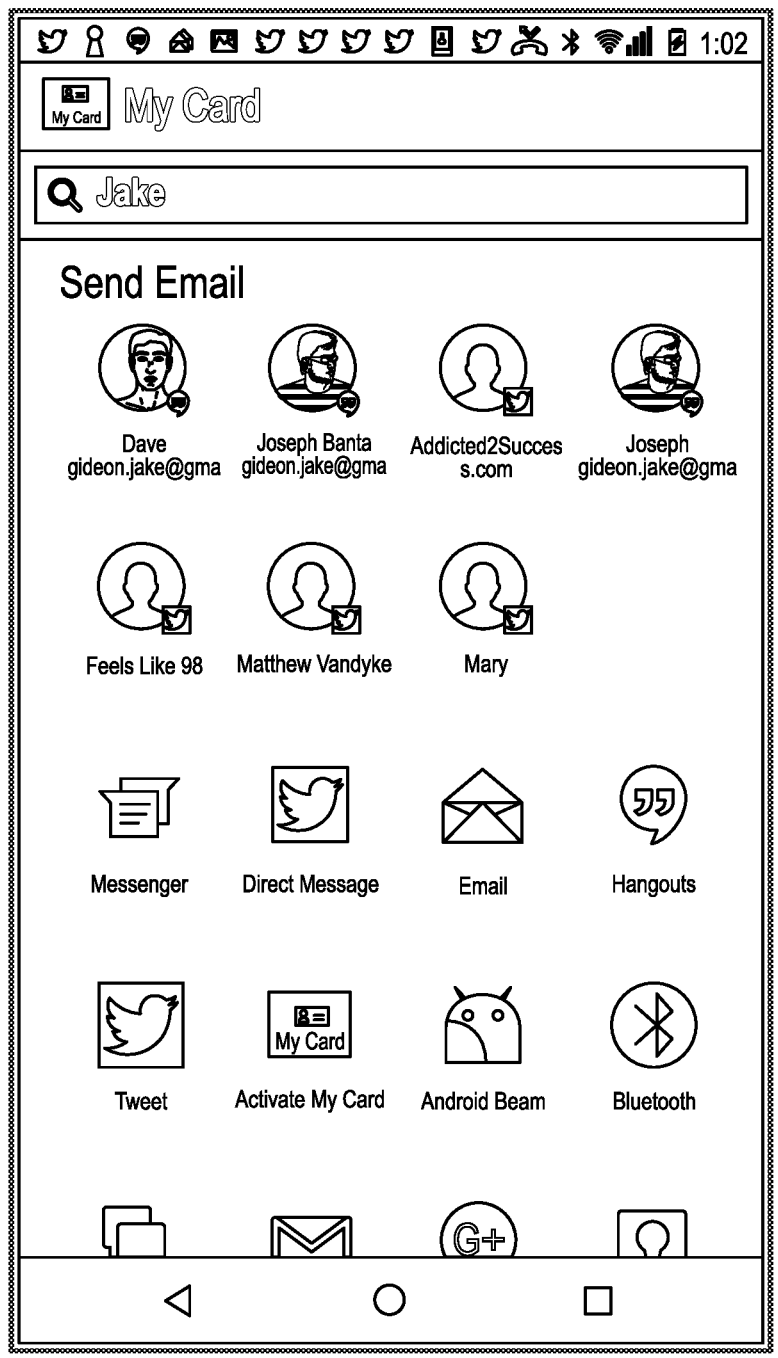
FIG. 37 illustrates an example user interface for access control and identification, according to an embodiment.
Figures 38, 39:
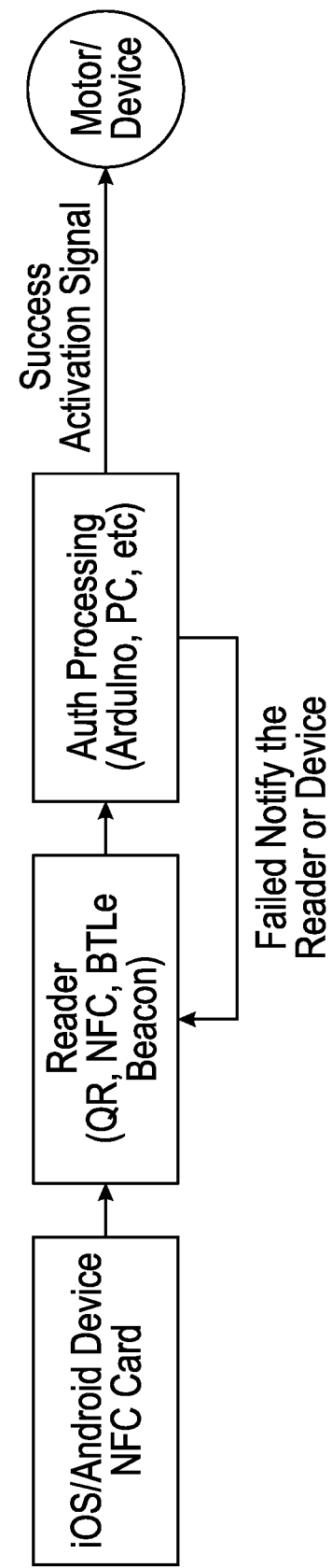
FIG. 38 illustrates an example user interface for access control and identification, according to an embodiment.
FIG. 39 illustrates an example operation environment for access control and identification, according to an embodiment.
Figure 40:
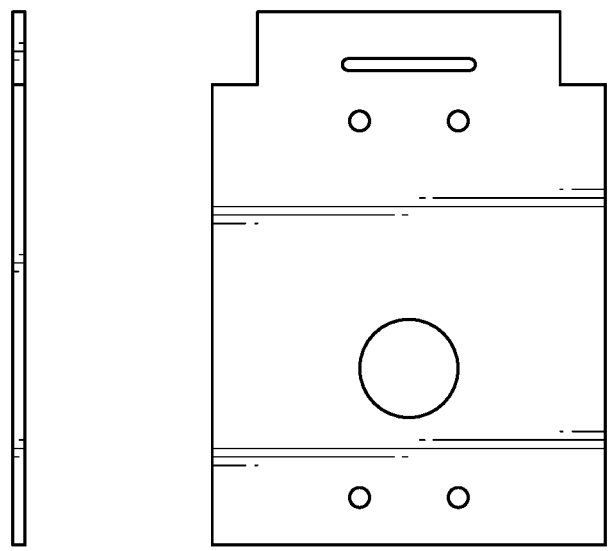
FIG. 40 illustrates views of a wall mount of a housing unit tied to an access control and identification system, according to an embodiment.
Figure 41:
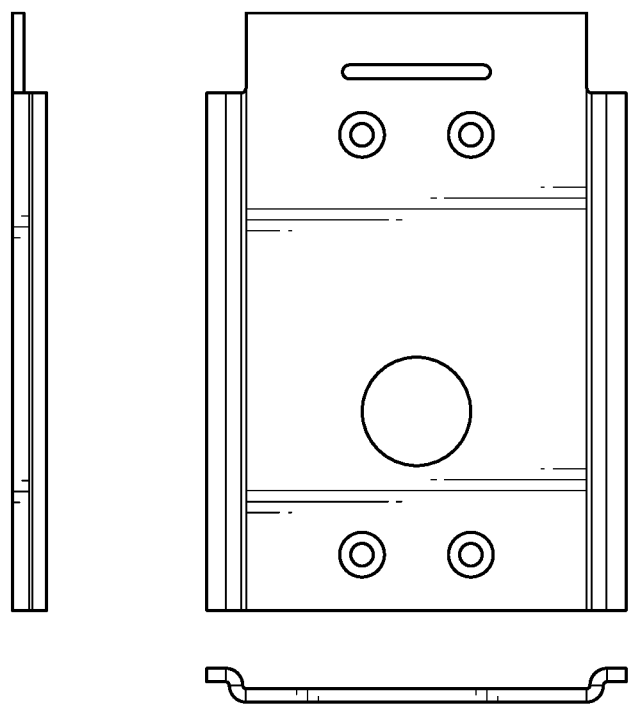
FIG. 41 illustrates views of a wall mount of a housing unit tied to an access control and identification, according to an embodiment.
Figure 42:
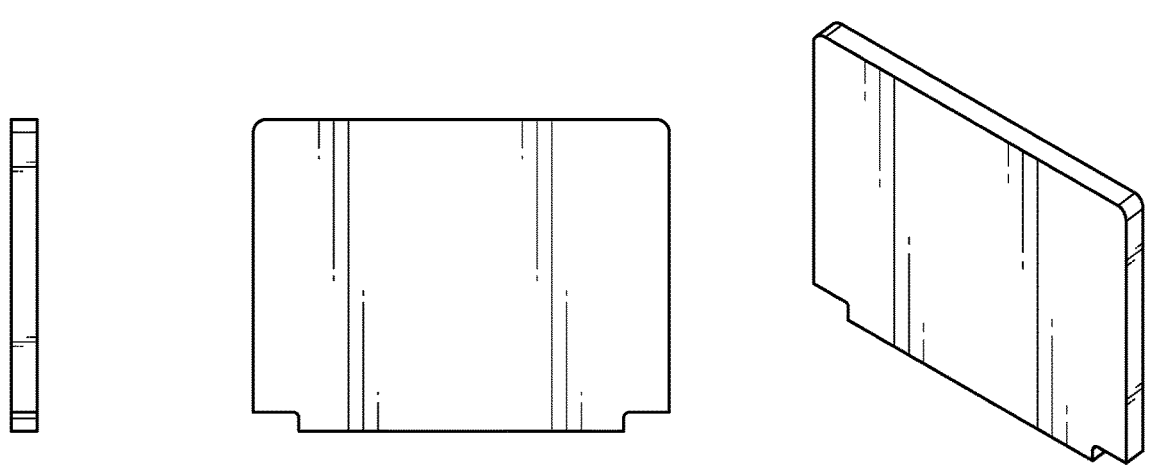
FIG. 42 illustrates views of a plate of a housing unit tied to an access control and identification system, according to an exemplary embodiment of the present disclosure.
Figure 43:
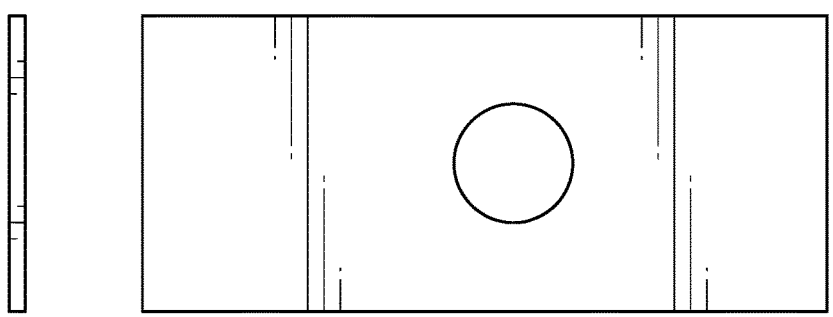
FIG. 43 illustrates views of a scanner mount of a housing unit tied to an access control and identification system, according to an exemplary embodiment of the present disclosure.
Figure 44:
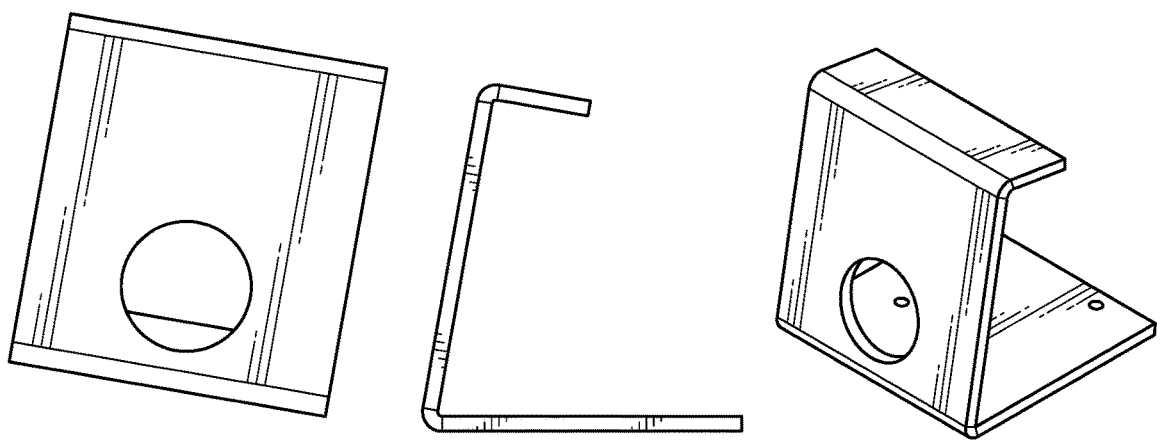
FIG. 44 illustrates views of a scanner mount of a housing unit tied to an access control and identification system, according to an exemplary embodiment of the present disclosure.
Figure 45:
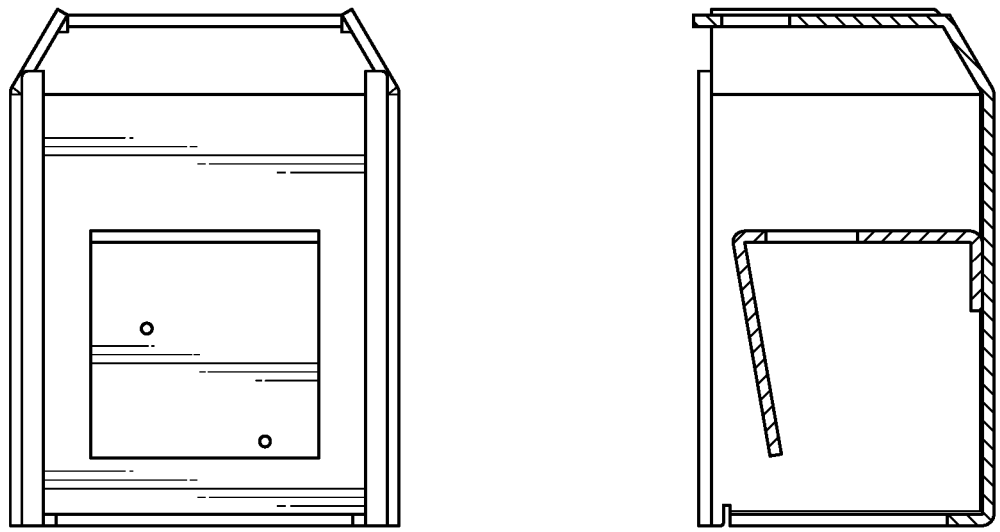
FIG. 45 illustrates views of a housing unit tied to an access control and identification system, according to an exemplary embodiment of the present disclosure.
Figure 46:
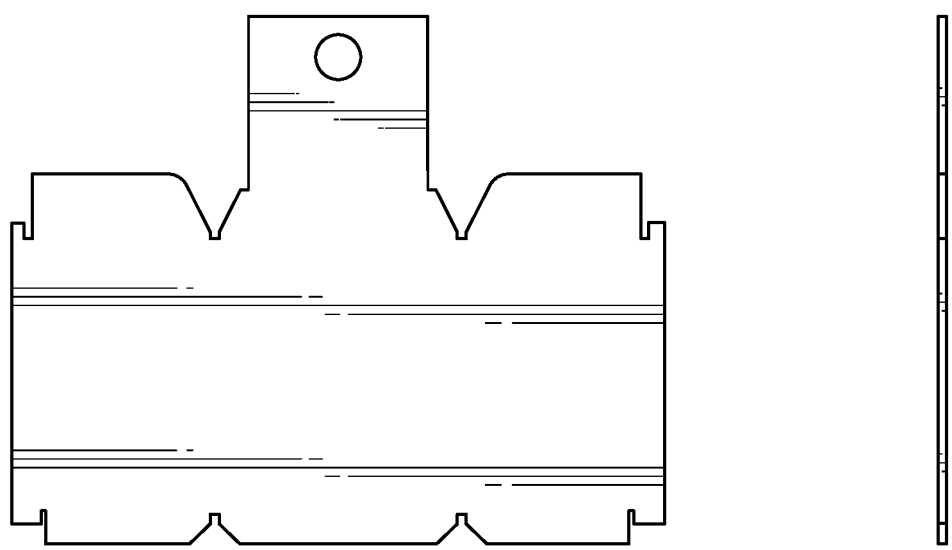
FIG. 46 illustrates views of a housing unit tied to an access control and identification system, according to an exemplary embodiment of the present disclosure.
Figure 47:
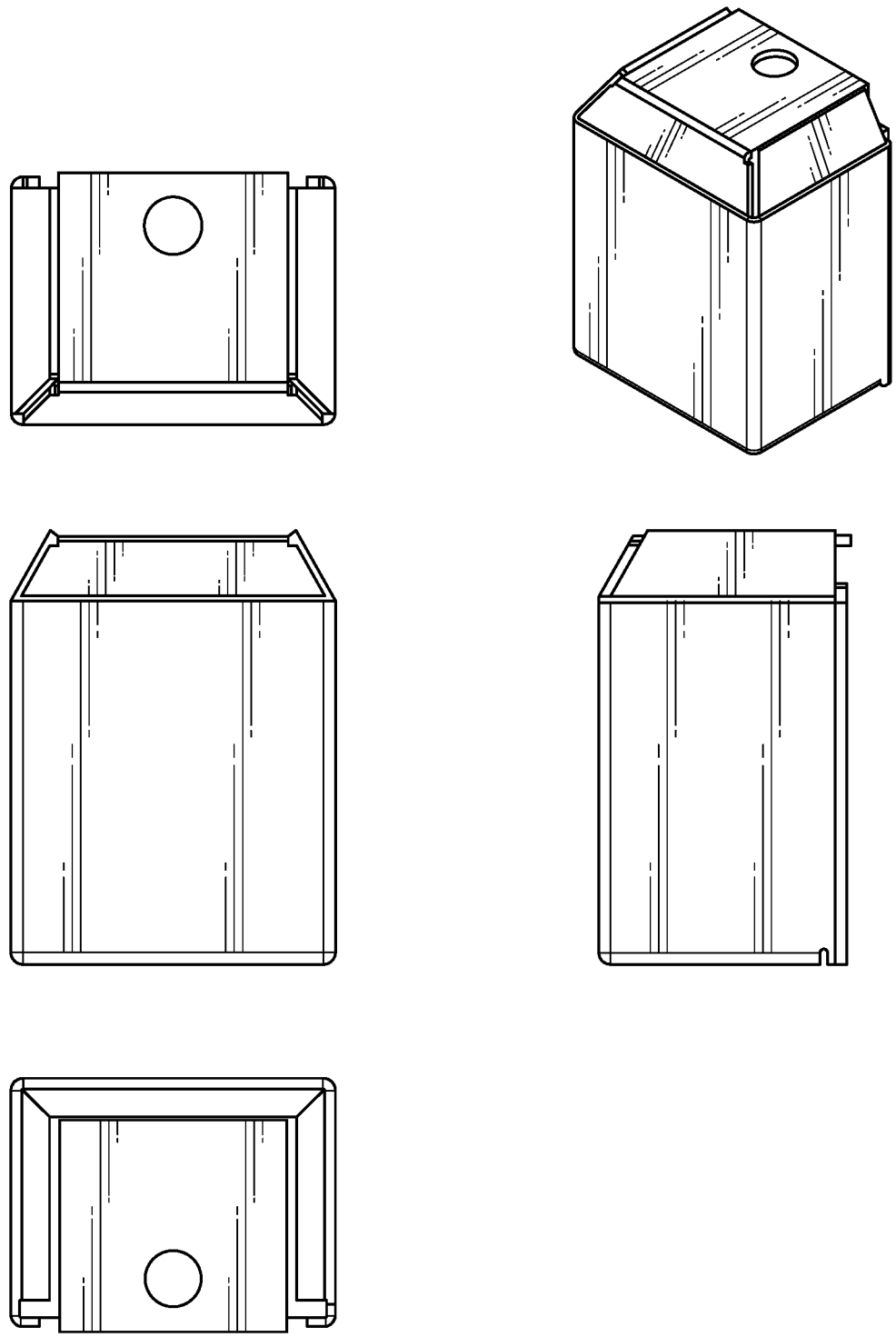
FIG. 47 includes views of a housing unit tied to an access control and identification system, according to an exemplary embodiment of the present disclosure.
Figure 48:
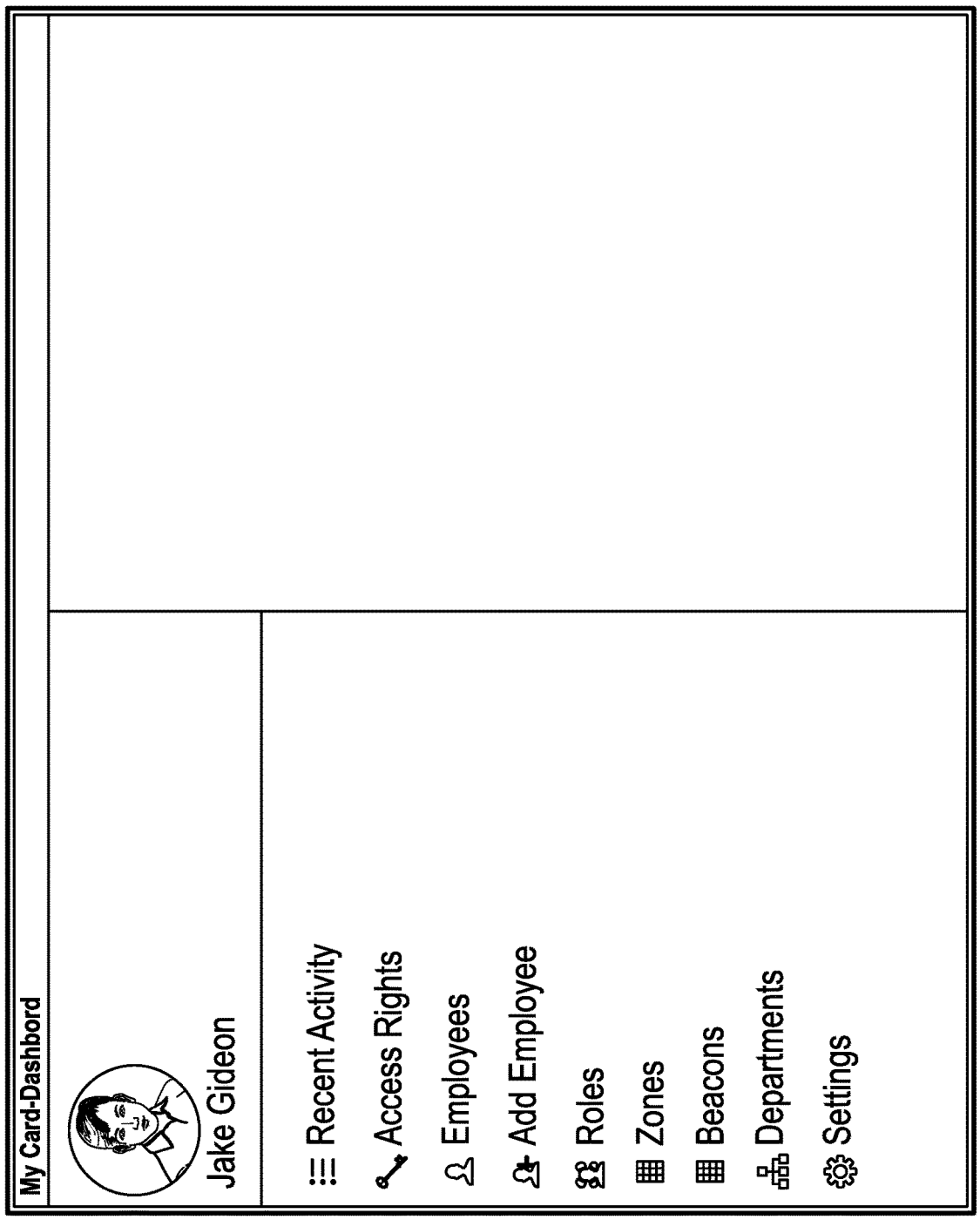
FIG. 48 illustrates an example user interface for access control and identification, according to one or more embodiments of the present disclosure.
Figure 49:
FIG. 49 illustrates an example user interface for access control and identification, according to one or more embodiments of the present disclosure.

Contact cards uploaded into the system may include information relating to the date and time of the exchange. Contact cards may also include GPS coordinates of the place where the exchange took place. End-users may search a list of contact cards according to people, places, organizations, dates/times, position/titles. Further, as is illustrated in FIGS. 31 and 32, the client device 210 may cause the display device 204 to present selectable visual elements representative of options for communication with other client devices. Users may communicate with contacts within the MyCard mobile app as follows. A user may search a list of contact cards to find a contact card for desired contact. The user may then view the desired contact card to determine the time and place (e.g., recorded as GPS coordinates) where the exchange of digital business cards took place. The user may then use the MyCard app to email, call, or send a text message to the desired contact as illustrated, for example, in FIG. 34.

Figure 33:
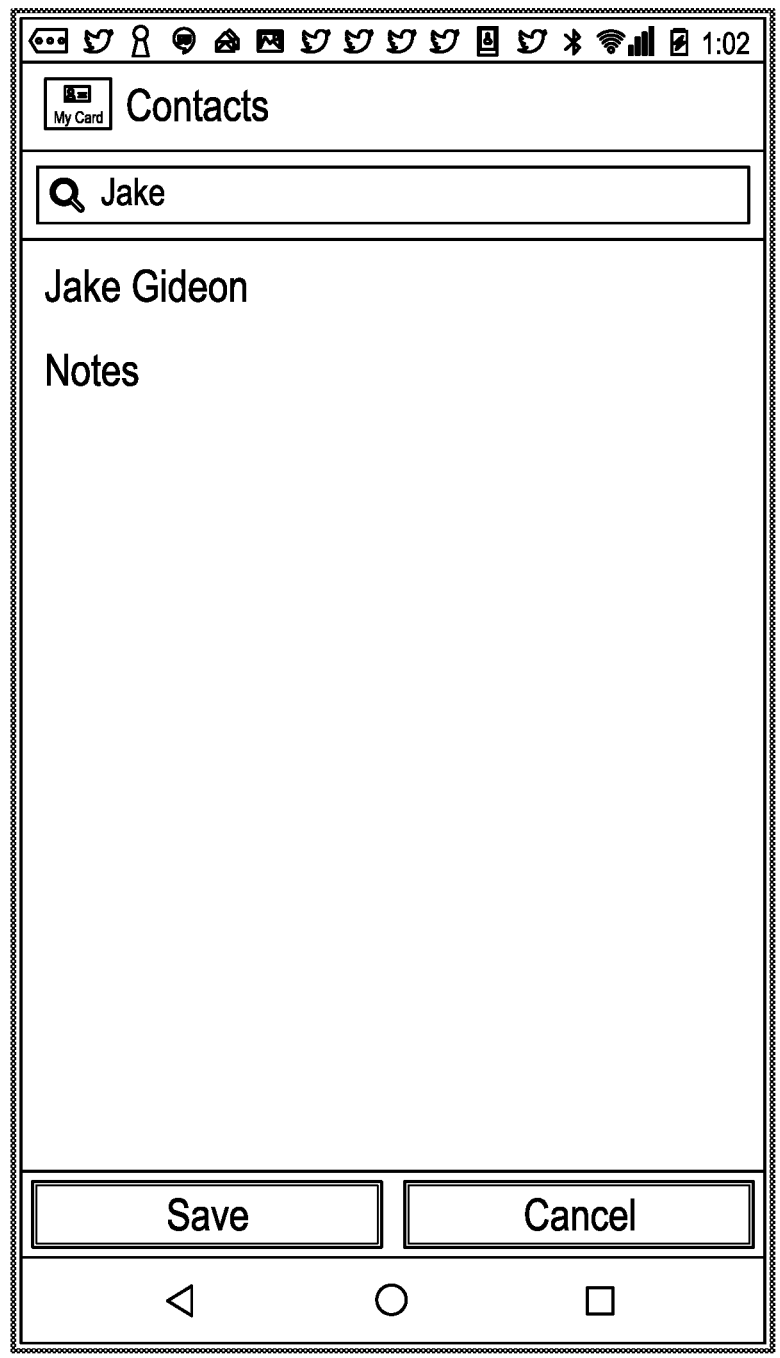
FIG. 33 illustrates an example user interface for access control and identification, according to an embodiment.

Upon or after receiving an exchanged contact card, users may add notes to the new contact (e.g., see FIG. 33) thereby allowing the user to make a digital record of the exchange or meeting. Digital cards may be exported/uploaded to a database program such as, for example, an Excel, Apple numbers, or other type of spreadsheet. Camera module(s) 211 may enable a user to take a picture of a physical business card that may be rendered and stored as a digital business card. The picture may be saved as a scanned image in a place holder region (or card slot) of a digital business card template.

Further, as is illustrated by FIGS. 49, 50, 51, 52, and 43, the client device 210 may be utilized as an access key. The MyCard app may also enable the creation, storage, and exchange of digital business cards and digital ID badges that may be exchanged from mobile device to mobile device using wireless connections such as for NFC, Bluetooth, SMS text messages, email, etc. The exchanged card may be uploaded into the receiving MyCard mobile app and saved in the app's contact list. This contact's profile may now contain that contact's digital business card, the GPS location of the exchange, date and time of the exchange, and any notes the receiving user may want to add on their new contact.

Figure 50:
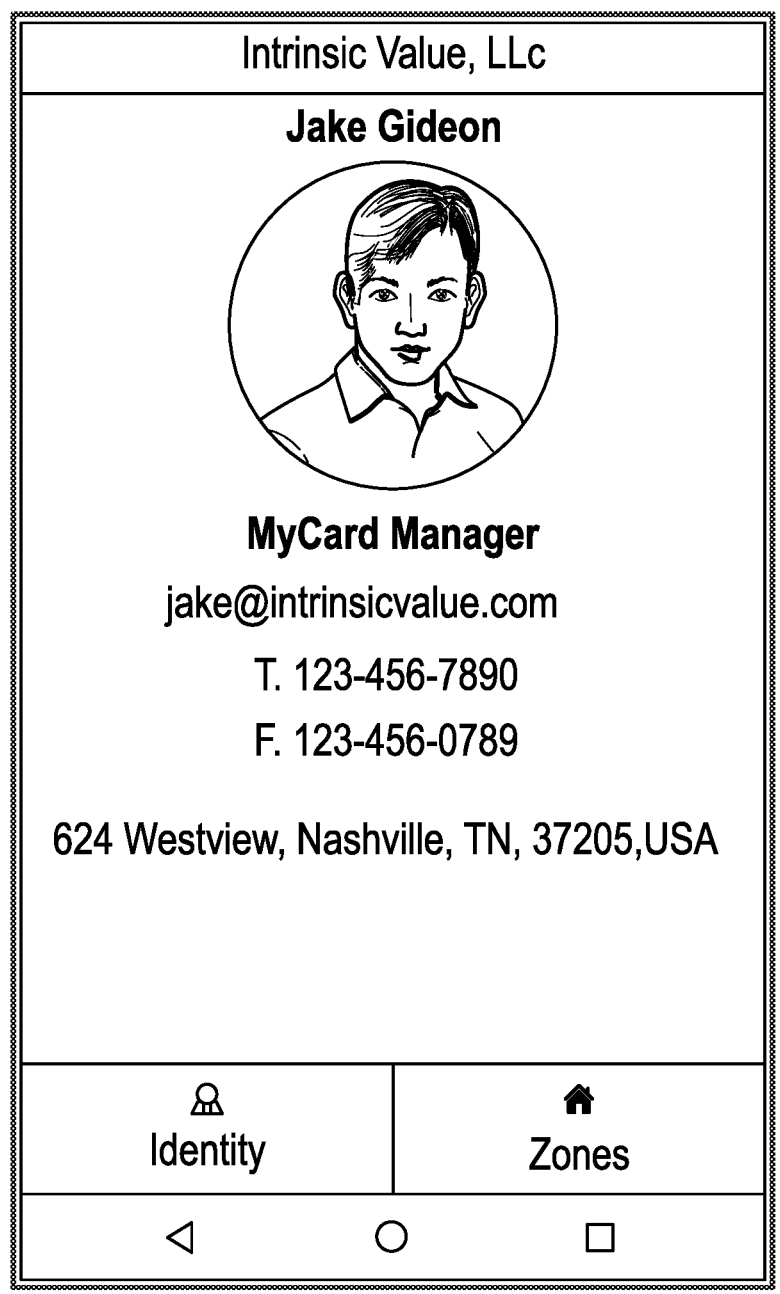
FIG. 50 illustrates an example user interface for access control and identification, according to one or more embodiments of the present disclosure.
Figure 51:
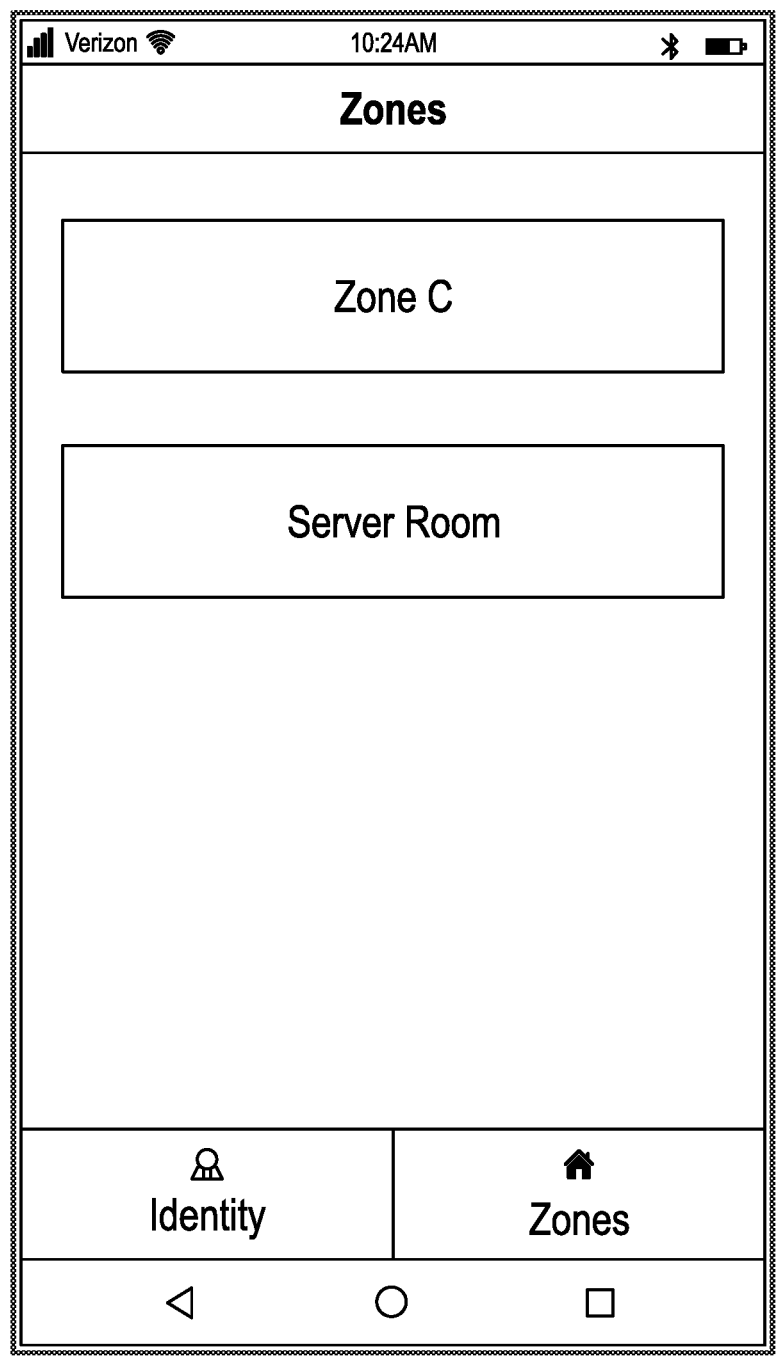
FIG. 51 illustrates an example user interface for access control and identification, according to one or more embodiments of the present disclosure.
Figure 52:
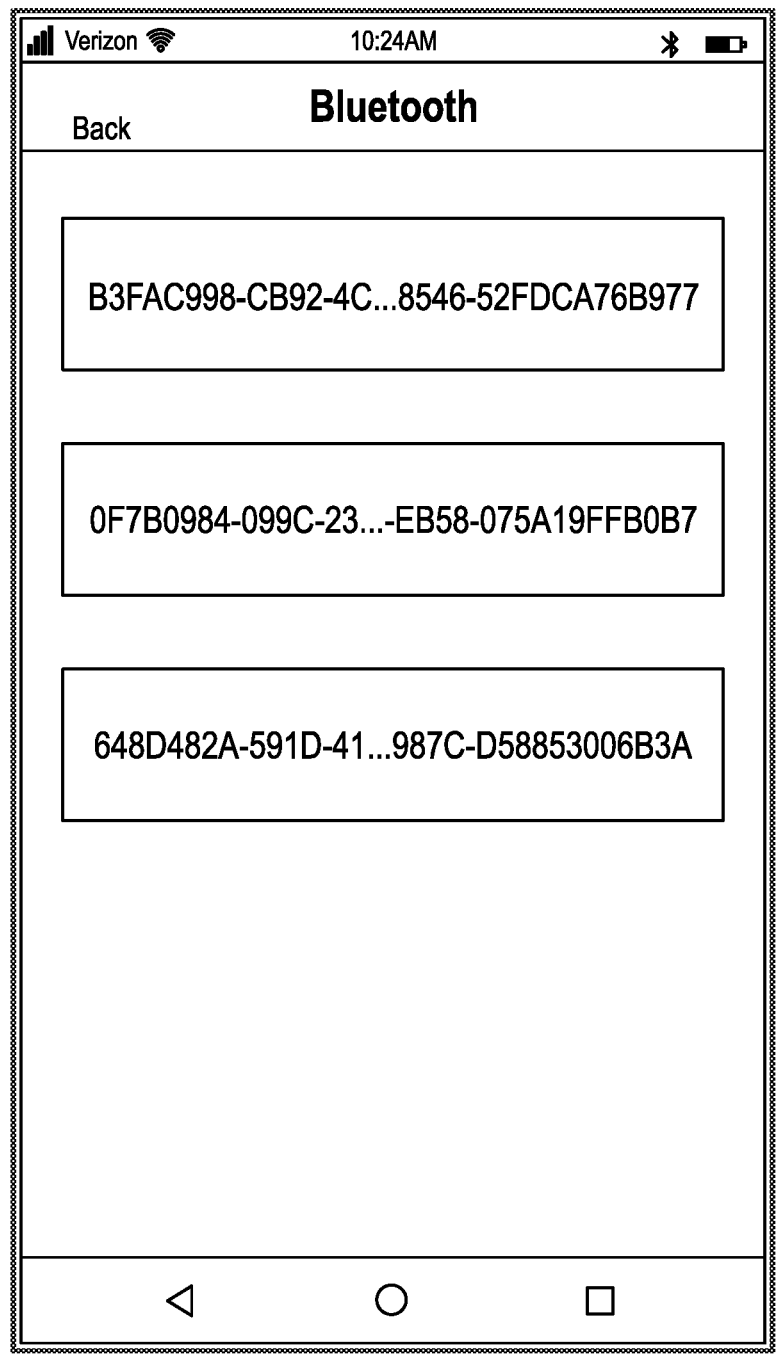
FIG. 52 illustrates an example user interface for access control and identification, according to one or more embodiments of the present disclosure.
Figure 53:
FIG. 53 illustrates an example user interface for access control and identification, according to one or more embodiments of the present disclosure.

As is illustrated in FIG. 50, for example, the main interface of the mobile app may be a personal badge for the user. This main page may include selectable options that allow the user to access key and card libraries. The user may choose a personal image for their "main badge" on a homepage. Like the card and key libraries, there may be a badge library of saved badges that may be accessed by the user. Saved badges may include, but are not limited to, work ID badges, government IDs, school IDs, driver's licenses, boarding passes, concert and venue tickets, etc. ID badges may include a unique barcode or QR code (e.g., see FIG. 53) similar to what may appear on a conventional physical identification badge. A barcode or QR code presented on a user's digital ID badge may be read by an appropriate reader.

In further embodiments, the MyCard mobile app may be configured to provide various other types of credentials for a user. For example, a client device may be configured to display a digital handgun carry permit, fishing/hunting license, and/or other government (local, state, and federal) identification credentials. Such credentials may be issued and displayed by the MyCard™ mobile app and displayed on a GUI of a client device. Such credentials may further be associated with various access keys (e.g., Bluetooth keys, QR codes, NFC radio chip credentials, etc.) that may be used to provide access to facilities, buildings, devices, vehicles, etc., that may be accessed by a credentialed user. Instances of access/activation may be logged by the system and may be saved on a client device, on a server device, or in a cloud computing infrastructure.

Records of such access/activation may further be displayed on a device running the MyCard™ web app. Failed access attempts may further be logged and stored for further review. Digital credentials, such as driver's licenses, permits, government IDs, etc., may be generated and issued by various entities (e.g., a state Department of Motor Vehicles, a private business, etc.) using a version of the MyCard™ web app. When displayed on a client device, digital credentials may further include features compatible with scanners built to fend off ID fraud. Such compatible scanners may be provided at any location where a typical ID would need to be checked.

Figure 54:
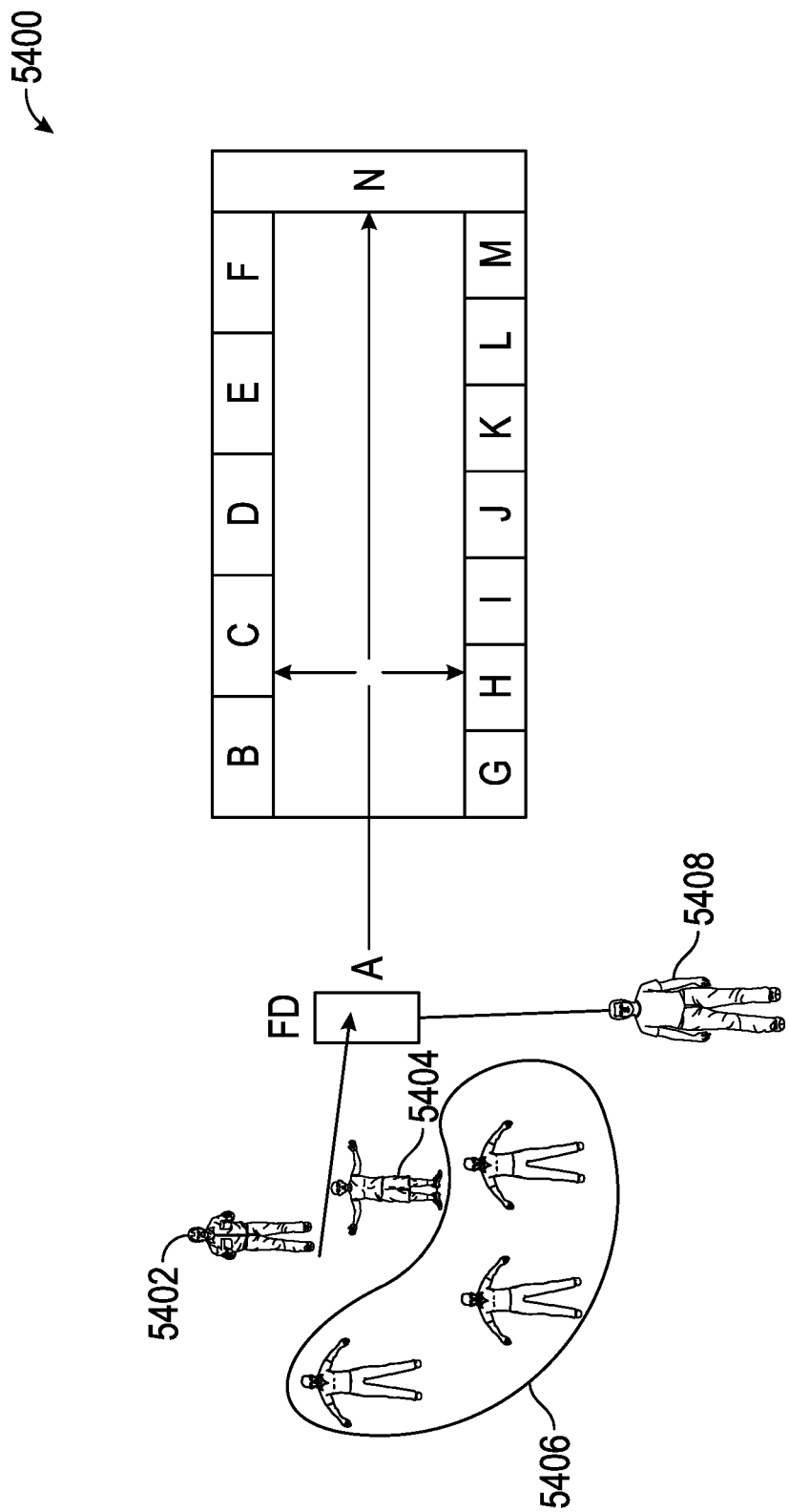
FIG. 54 illustrates an example environment in which security procedures in an emergency may be implemented and enforced using zone administration features of the MyCard™ app, according to an embodiment.

FIG. 54 illustrates an example environment 5400 in which emergency security procedures may be implemented and enforced using zone administration features of the MyCard app, according to an embodiment. Environment 5400 may represent an office building, a school, a hospital, etc. In this example, the building of environment 5400 may represent a school having an entrance A, and various classrooms B-N. Faculty, staff, and students each may gain access to the various rooms of the school using the MyCard app on a client device (e.g., client devices 110a and 110b). An example client device may include a smartphone. As described above, school administrators may configure access permissions for each user based on time of day and based on each user's schedule. For example, suppose a student 5402 has a class schedule that includes arriving at school at, say, 8:00 Monday through Friday. In this instance, the MyCard app for student 5402 may be configured to give student 5402 access to the front door A of the school for a time window including 8:00 am, say from 7:50 am to 8:10 am. In this case, student 5402 may be granted access to the front door A during the approved time window of 7:50 am-8:10 am. Outside of this time window, student 5402 may be denied access to the front door A.

Similarly, if student 5402 has a class schedule that places him or her in, say, rooms B, D, and F, at specific times, say 9:00 am, 10:00 am, and 11:00 am, respectively, the MyCard app may be configured to allow student 5402 access to rooms B, D, and F only during specified time windows associated the above described class times. For example, student 5402 may be granted access to enter room B only during a time window from, say, 8:55 am-9:05 am. Student 5402 may be granted access to enter room D only during a time window from, say, 9:55 am-10:04 am. Student 5402 may be granted access to enter room F only during a time window from, say, 10:55 am-11:05 am. In this way, each student is permitted access only to assigned rooms during assigned class times. Access to all other rooms may be denied. In this regard, access to rooms C, E, and G-N would be denied to student 5402 during the time frames described above during which student 5402 has access to rooms B, D, and F. Further, access to rooms C, E, and G-N may denied at all other times as well, if student 5402 is not scheduled for legitimate school functions in any of rooms C, E, and G-N.

Similar access rules may be implemented for administrators, teachers, and staff. For example, teacher 5404 may be scheduled to teach in room H for three class periods at times 10 am, 11 am, and 1 pm. In this example, teacher 5404 would be granted access to the front door A during a time window prior to the first scheduled teaching time of 10 am. For example, teacher 5404 may be granted access to front door A during a time window from, say, 9:50 am-10:10 am. Teacher 5404 may similarly be granted access to enter his/her assigned classroom H during a time period spanning the scheduled class times of 10 am, 11 am, and 1 pm.

In a further example, teacher 5404 may be granted access to classroom H for longer periods of time, say, during a preparation time period. For example, teacher 5404 may be scheduled to be in classroom H for a one hour planning period before the first class period. Teacher 5404 may be scheduled to be in room H from, say, 9 am-10 am to allow teacher 5404 to prepare for upcoming classes. In this situation, teacher 5404 may be granted access to the front door A during a time window preceding the planning period at 9 am, say, during the time period 8:50 am-9:10 am. Teacher 5404 may then be granted access to enter classroom H by the MyCard app during a time window spanning the preparation period as well as during the assigned class times. Teacher 5404 may further be granted access to enter and leave classroom H at any time during the scheduled planning period from 9 am-10 am.

In a further example, teachers and administrators may be granted access to other rooms in the school as required by their job duties. For example, teacher 5404 may be granted access to a faculty reception area (e.g., a faculty lounge) during longer time periods than just their assigned classes. For example, teachers may have access to the main office, lunch room, restrooms, etc., during the normal business hours of the school. Similar schedules may apply to staff that maintain the building, prepare and serve lunches, etc. Additional personnel 5406 may likewise have individual access rules dictated by each person's particular schedule.

During an emergency, access permissions provided by the MyCard app may be modified in real time in response to the emergency. In one scenario, an armed attacker 5408 may attempt to gain entry to the building in example environment 5400. Due to the access permissions granted or denied by MyCard, the would-be attacker 5408 may only gain access to the building of environment 5400 if the attacker 5408 already has access permissions. That is, only someone who is associated with the school, say a student, an administrator, or a member of the faculty or staff would possibly be able to gain access to the building. Persons not already associated with the school, in this example, would automatically be denied access to the building.

Suppose, however, that the armed attacker 5408 is indeed associated with the school as a student, an administrator, or a member of the faculty or staff. In this situation, the attacker 5408 may initially gain access to the building during a legitimate time period. Say, for example, the attacker 5408 is a student who is scheduled to attend classes in rooms C, H, and N, during respective time periods. Prior to the start of first class to be held in room C, for example, the attacker 5408 may legitimately gain access to the front door A. If the attacker 5408 appears to pose no threat upon entering the building through door A, the attacker 5408 may legitimately be granted access to room C during the scheduled class time.

Once the attacker 5408 begins to exhibit threatening behavior, however, the MyCard app may be used to prevent or reduce the ability of the attacker 5408 to inflict harm. For example, an administrator with privileges to modify access permissions for the MyCard app may quickly change access rights for attacker 5408 in real time using the web app. Say the attacker 5408 legitimately gains access to the front door but then begins to engage in threatening behavior once inside the front door, access to rooms C, H, and N may then be cut off in real time by an administrator. For example, an administrator using the web app may changer access permissions for the attacker 5408 to quickly deny access of the attacker 5408 to other rooms in the school such as rooms C, H, and N. Alternatively, if the attacker 5408 exhibits threatening behavior outside of the school, an administrator using the web app may quickly remove access permissions entirely denying access to the front door A as well as access to rooms C, H, and N.

The above examples implicitly assume that the identity of the attacker 5408 is known so that an administrator may change permissions associated with the known attacker 5408 to deny the attacker access to the building. However, the identity of the attacker 5408 may not be known at the inception of an attack. In this situation, however, it may be possible to narrow the possible list of identities of the attacker 5408 based on what rooms he/she is able to access at any given time. For example, suppose the attacker 5408 is able to access the front door A and then gains access to classroom C during a given class period. This information may be used to infer that the attacker 5408 is one of a reduced list of persons having access to room C during the particular time of the attack. As such, it may be possible to deduce the identity of the attacker 5408. Once the attacker is known to be in a given room, say room C, an administrator may then change access privileges to lock down the building by locking all other rooms. Alternatively, if the identity still cannot be determined, administrative personnel may remove access privileges for everyone known to have access to room C during the time of the attack. In this way, the attacker would be included with the group of people for whom access privileges are denied.

In other emergencies, the MyCard app may be used in similar ways. Suppose, for example, the example environment 5400 represents a single floor in a high-rise building. Upon discovery that an attack is in progress, administrators may restrict access privileges to reduce the ability of attacker 5408 to inflict harm. In an office building, for example, the MyCard app may be used to grant or deny access to certain floors of the building. For example, persons riding an elevator may only be granted access to one or several floors of the building. Similarly, persons using stairwells may be required to gain access to a particular floor using the MyCard app. In the event of an attack, access to the floor on which the attack is taking place may be denied to all persons not already on the floor. This denial of access may be also imposed in elevators and stairwells.

Similarly, environment 5400 may be partitioned into various zones. For example, regions labeled B-N in this example may represent individual rooms or may represent zones that contain multiples rooms, hallways, etc. Once an attack is in progress, an administrator may restrict access to only one or several zones near the location of the attacker 5408 to prevent the attacker from gaining wider access. In the event that an attacker is alone in a region, elevator, stairwell, etc., egress access may be denied to the attacker

5408, effectively locking the attacker into a given region or room. As such, the attacker 5408 may be prevented from leaving the room, zone, floor, or building until law enforcement personnel may arrive to deal with the attacker 5408.

The MyCard app may similarly be used as a security tool in many other environments such as in a government facility, on a ship, on a plane, in a shopping center, in a zoo, etc. In recent years, attacks of violence such as mass shootings have often occurred in settings in which victims or would-be victims are generally unprotected, such as in schools or in churches. The security of such places may be greatly increased by securing such facilities using the MyCard app in which access is granted only to persons authorized to be in a facility at a specified time. For example, using the MyCard app, only church-goers may be granted access to a church or worship facility during a designated time, such as during a scheduled service, group meeting, or other event. Would-be attackers who are not associated with the church or worship facility would automatically be denied access by default.

As described above, the MyCard mobile app, along with the MyCard web app, functions like a set of virtual keys that may replace a user's conventional physical keychain. Each virtual key unlocks a door or otherwise grants access to a given building, room, etc. Unlike a conventional key, however, the virtual keys of the MyCard app grant access to a building, room, etc., to a user, only during scheduled time intervals corresponding to a schedule of a user's legitimate accesses privileges. In this way, a virtual key may act like a conventional key fob that may open a door to an office building during business hours but may deny access during times outside of business hours. A conventional key fob, however, generally only opens one door or several doors associated with a given facility. Access to several different facilities requires several different conventional key fobs. In contrast, the MyCard app may grant access to any number of buildings, facilities, etc., based on corresponding sets of predetermined access rules.

A user who is inside or approaching a facility having access control devices managed by the MyCard™ mobile app, may be presented with specific access keys for that facility in various ways. For example, access key may be received by a client device in the form of a push notification. Such keys may then be presented to a user using visually selectable items (e.g., icons) on a GUI of the user's client device. Selecting (e.g., clicking a button or touching a visually selectable item) may then open the MyCard™ mobile app. Upon opening, the MyCard™ mobile app may then take the user directly to a key page in the app. A specific key to a specific access control device in a specific facility may be presented to the user based on geolocation information that correlates a position of the user's client device relative to a specific facility having a specific access control device. In this way, a matching access key may automatically be presented for use in unlocking a specific access control device when a user is near the specific access control device. The access key may then be provided to the access control device in various ways (e.g., optically via scanning a barcode or QR code, wirelessly through transfer of wireless signals, etc.) as described in greater detail above.

In further embodiments, the MyCard™ mobile app along with the MyCard™ web app, may be configured to monitor and control access to various building utilities. For example, the web app may be configured to log, store, and monitor zones which govern control of lights, sound systems, television, heating, ventilation, air conditioning, temperature control, trash receptacles, etc. Access keys may then be sent from the MyCard™ web app to the credentialed mobile users running the MyCard™ mobile app. Credentialed users may, in turn, use the access keys to control the various utilities. As in other embodiments, access may be granted, changed, or withdrawn at any time based on decisions made by a manager of the system through interaction with the MyCard™ web app. The access keys may then be provided to access control devices from a user's client device in various ways, as described above (e.g., optically via scanning a barcode or QR code, wirelessly through transfer of wireless signals, etc.).

Figure 55:
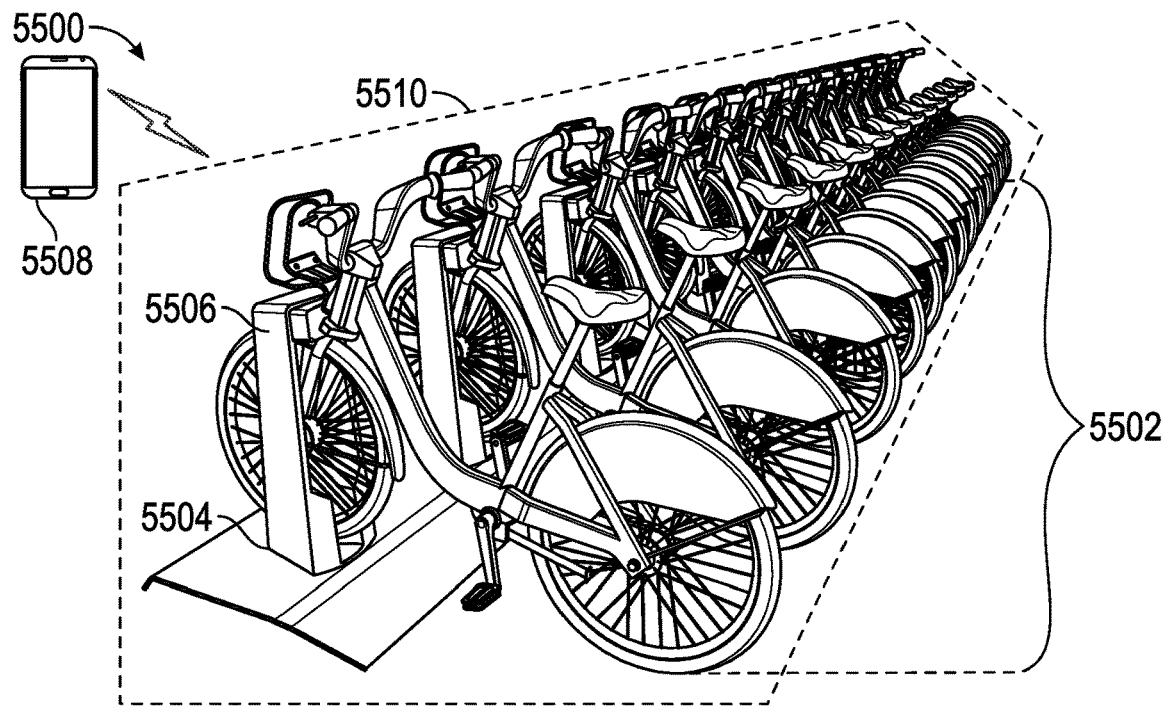
FIG. 55 illustrates an example environment having a plurality of locking devices that may be locked and unlocked through interaction between a locking device and a client device, according to an embodiment.

FIG. 55 illustrates an example environment 5500 having a plurality of locking devices 5506 that may be locked and unlocked through interaction between a locking device 5506 and a client device 5508, according to an embodiment. In this example, a plurality of rental bicycles 5502 may be secured through interaction with a bicycle rack 5504 that includes a respective plurality of locking devices 5506. Locking devices 5506 may be associated with one or more beacon devices (not shown) as described above, for example, with reference to FIGS. 1 and 2.

As described above, with reference to FIG. 1, a locking device 106a may be actuated to transition between a locked state and an unlocked state, thus unlocking or locking a gate, a door, a turnstile, a padlock, or other type of access structure (e.g., locking devices for rental car access, front door, checking in for an appointment with a doctor, dentist, etc.). Also, as described above, client device 5508 (e.g., see FIG. 55) may interact with one or more locking devices 5506 that are defined within a zone 5510 that is associated with a defined region. The defined region may include a confined area indoors, a confined area outdoors, or a confined area that includes a combination of indoor and outdoor spaces.

In this example, the zone 5510 is a defined region associated with the bicycle rack 5504. For example, the zone 5510 may be a region of interaction between client device 5508 and the bicycle rack 5504. Client device 5508 may interact with locking device 5506 to unlock locking device 5506 to thereby initiate rental of a bicycle 5502. In this regard, client device 5508 may provide an access key to locking device 5506. As described above, access keys may be received by barcode/QR code scanners, Bluetooth readers, chip readers, radio signal readers, among other electronic receiving and processing devices. The reader devices (also referred to as beacon devices, such a beacon devices 104a and 104b of FIG. 1)—whichever type they may be (or location of installment) may be functionally coupled (e.g., wirelessly coupled) to a client device (e.g., client devices 110a and 110b of FIG. 1, client device 5508 of FIG. 55, etc.).

Client device 5508 may interact wirelessly with locking device 5506 according to the method described above with reference to FIG. 11. As such, client device 5508 may establish a wireless connection with locking device 5506. One or both of the client device 5508 and the locking device 5506 may establish a connection with a remote server (e.g., server 120a or 120b of FIG. 1). As such, the server may provide an access key directly to the locking device 5506 or the server may provide the access key to client device 5508. Client device 5508 may then provide the access key to locking device 5506. In other embodiments, client device may receive a unique identifier from the locking device that may be used to initiate communication with the server device. For example, client device may scan or take a picture of a barcode or QR code (not shown) displayed on the bicycle rack 5504. Information retrieved based on the scanned or photographed barcode or QR code may be used to initiate interaction with the server device.

Alternatively, client device 5508 and locking device 5506 may interact without further interaction with a server device. For example, client device 5508 may have one or more access keys that have been previously stored on client device. The one or more access keys may be provided to locking device 5506 to initiate unlocking of the locking device. An access key may be provided to locking device 5506 through a wireless connection between client device 5508 and locking device 5506. Alternatively, a barcode or QR code may be visually displayed on a GUI of client device 5508. The displayed barcode or QR code may then be read by a barcode or QR code scanning device (not shown) associated with locking device 5506. Thus, client device 5508 may interact with locking device 5506 through many different ways using optical signals, wireless signals, and with or without interaction with a server device.

Financial transactions associated with renting a bicycle 5502 may also be handled by client device 5508. For example, upon successfully unlocking locking device 5506, a bicycle 5502 may be removed from bicycle rack 5504 for use. Client device 5508 may record a date and time at which locking device 5506 was successfully unlocked. The recorded date and time may then be used to determine a start date/time for the bicycle rental. After use, bicycle 5502 may be returned to the rack 5504 and locking device 5506 may re-engage bicycle 5502 in a locked state. Client device 5508 may then record the date and time of successful return of bicycle 5502 to rack 5504. Alternatively, a computing device associated with the bicycle rack 5504 may record the date/time of unlocking and locking of locking device 5506. Such information may then be communicated with a server device. A rental time duration may be determined based on the recorded date/time that bicycle 5502 was unlocked from locking device 5506 and subsequently re-locked by locking device 5506. A rental payment may then be determined based on a rental time duration. The rental payment may then be processed by client device 5508 through interaction of client device 5508 with a server device that may be configured to communicate with a user's bank account to process payments to an entity associated with rental of bicycles 5502, as described in greater detail below. In further embodiments, a bicycle may be rented from one location and returned at a different location, as described in greater detail below.

In the above example, client device 5508 was used to interact with locking device 5506 to a unlock bicycle 5502 from bicycle rack 5504. Rental duration and resulting fees were determined based on when bicycle 5502 was taken from rack 5504 and returned to rack 5504, or when bicycle 5502 is returned to another rack. In further examples, a bicycle rack is not needed. In such embodiments, bicycles may be provided in various locations with or without a rack. In embodiments without a bicycle rack, a bicycle may be provided with a locking device (not shown) associated entirely with the bicycle. In this regard, a locking device may be provided that makes the bicycle unusable until it is unlocked through interaction with client device 5508. For example, a bicycle may include a device (not shown) that prevents one or both wheels from moving when the locking device is in a locked state. As such, the locking device may be configured to be unlocked through interaction with client device 5508, either directly or through interaction with a server devices, as described above. Thus, a rental start date/time may be determined when the user unlocks the locking device associated with the bicycle and a rental end date/time may be determined when the user locks the locking device associated with the bicycle.

Figure 56:
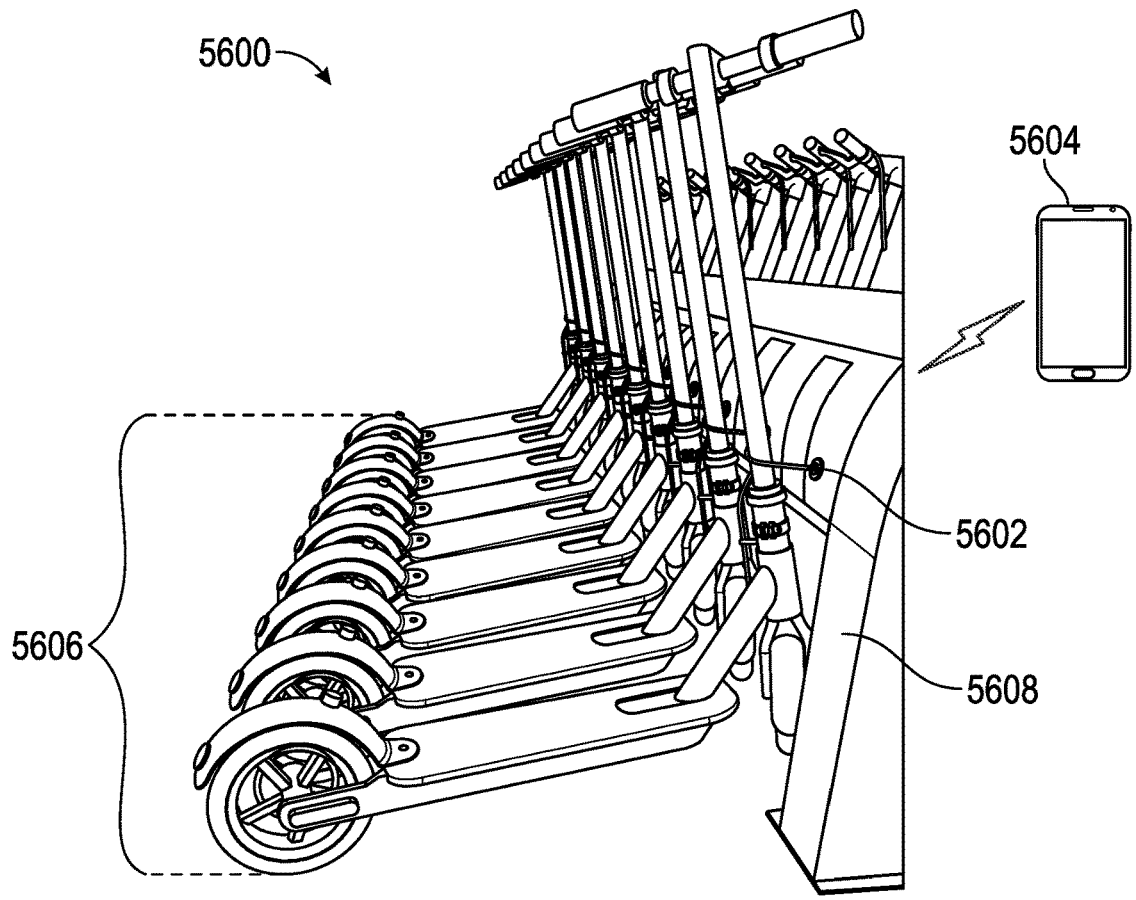
FIG. 56 illustrates a further example environment having a plurality of locking devices that may be locked and unlocked through interaction between a locking device and a client device, according to an embodiment.

FIG. 56 illustrates a further example environment 5600 having a plurality of locking devices 5602 that may be locked and unlocked through interaction between a locking device 5602 and a client device 5604, according to an embodiment. In this example, a plurality of motorized scooters 5606 may be secured through interaction of client device 5604 with a scooter rack 5608 that includes a respective plurality of locking devices 5602. Locking devices 5602 may be associated with one or more beacon devices (not shown) as described above, for example, beacon devices 104a and 104b shown in FIGS. 1 and 2. As with the example described with reference to FIG. 55, scooters 5606 may be unlocked from rack 5608 through interaction with client device 5604. Upon successfully unlocking a scooter 5606 from rack 5608, client device 5604 may record a date/time of removal of scooter 5606 for use. Upon successful return of scooter 5606 to rack 5608, client device 5604 may determine a rental duration based on a time interval between unlocking and re-locking of scooter 5606 to rack 5608. A rental payment may then be determined and processed by client device 5604, as was the case described above with reference to FIG. 55 for bicycle rental. Alternatively, a computing device associated with rack 5608 may record the date/time of unlocking and relocking of locking device 5602 and determine a payment due, or may communicate the date/time of locking and relocking to a server device for processing of payment.

In a further embodiment, scooter rack 5608 may include an electrical power source (not shown) that may be used for charging batteries associated with scooters 5606. Further, client device 5604 may determine and record charging information of various scooters 5606. In this regard, when a user wishes to rent a scooter 5606, client device 5604 may recommend a scooter 5606 having a battery with greatest electrical charge. Alternatively, a computing device associated with rack 5608 may determine charging information of various scooters 5606.

In further embodiments, client devices 5508 (e.g., see FIG. 55) and 5604 (e.g., see FIG. 56) may store information regarding various locations for vehicle rental and return. For example, bicycle racks 5504 and scooter racks 5608 may be located in various locations within a given geographical area (e.g., within a city). Vehicles (e.g., bicycles 5502, scooters, 5606, etc.) may be unlocked and rented from a first location and returned and re-locked at a second location. Client devices 5508 and 5604 may keep track of pick-up and drop-off locations and dates/times for vehicles, and may process rental payments accordingly. Further, once a vehicle has been rented, client devices 5508 and 5604 may provide information regarding availability of drop-off/return locations.

In the above example, client device 5604 was used to interact with locking device 5602 to unlock a scooter 5606 from rack 5608. Rental duration and resulting fees were determined based on when scooter 5606 was taken from rack 5608 and returned to rack 5608, or when scooter 5606 is returned to another rack. In further examples, a rack is not needed. In such embodiments, scooters may be provided in various locations with or without a rack. In embodiments without a rack, a scooter may be provided with a locking device (not shown) associated entirely with the scooter. In this regard, a locking device may be provided that makes a scoter unusable until it is unlocked through interaction with client device 5604. For example, a scooter may include a device (not shown) that prevents one or both wheels from moving when the locking device is in a locked state. As such, the locking device may be configured to be unlocked through interaction with client device 5604, either directly or through interaction with a server devices, as described above. Thus, a rental start date/time may be determined when the user unlocks the locking device associated with the scooter and a rental end date/time may be determined when the user locks the locking device associated with the scooter.

Figure 57:
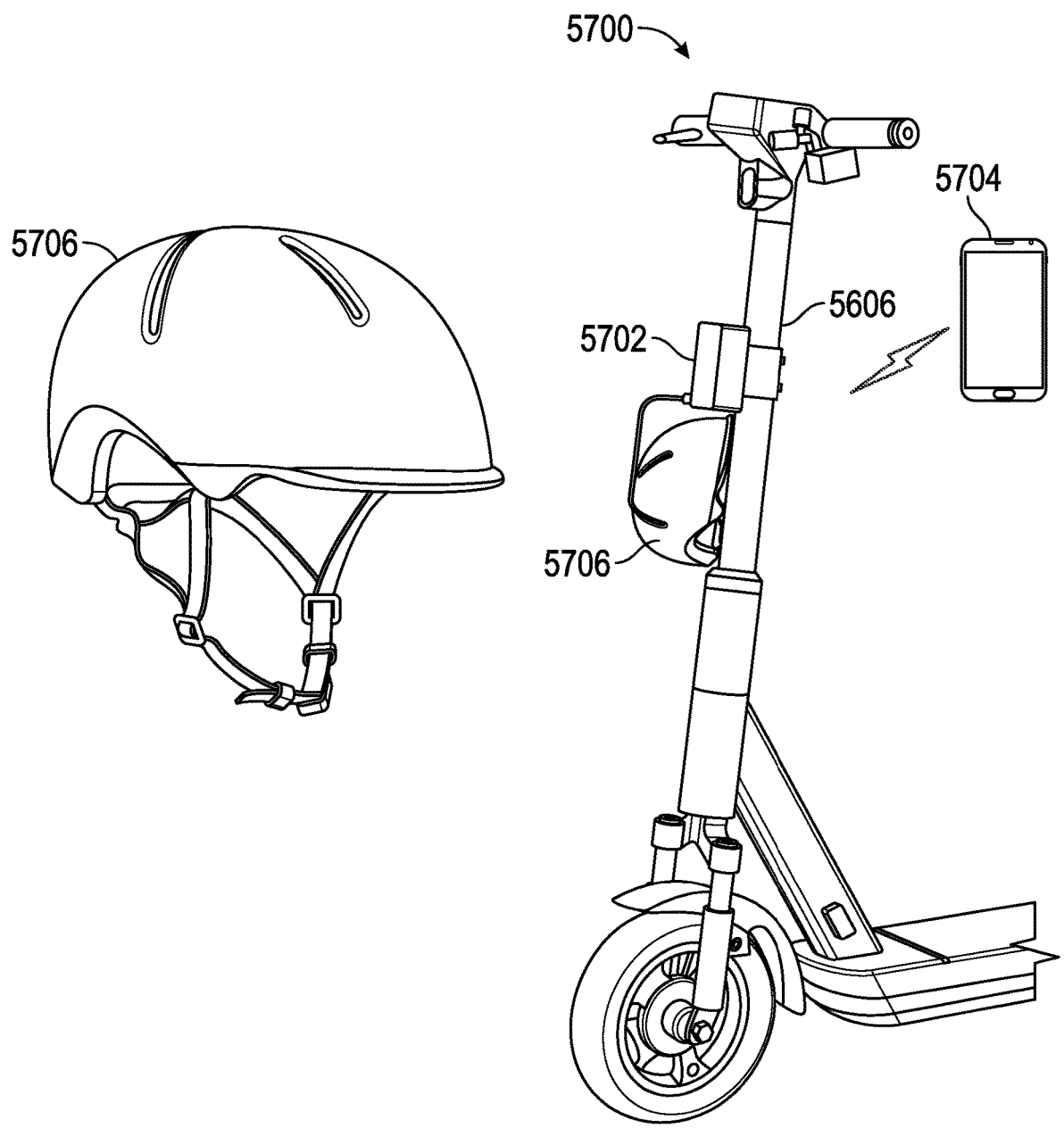
FIG. 57 illustrates a further example environment having a one or more locking devices that may be locked and unlocked through interaction between a locking device and a client device, according to an embodiment.

FIG. 57 illustrates a further example environment 5700 having a one or more locking devices 5702 that may be locked and unlocked through interaction between a locking device 5702 and a client device 5704, according to an embodiment. In this example, a scooter 5606 may be provided with a helmet 5706 that may be secured to scooter 5606 via locking device 5702. Helmet 5706 may be unlocked from scooter 5606 according to methods described above (e.g., with reference to FIGS. 1, 2, 11, 55, and 56). In this regard, an access key may be provided to locking device 5702 via client device 5704 or through interaction with a server device (not shown). Locking device may communicate with client device 5704 and/or with a server device using wireless signals, optical signals, etc. Further, locking device 5702 may include a power source such as a battery (not shown) that may be charged along with a battery (not shown) that powers an electric motor of the scooter 5606. In this regard, the electrical power source of the scooter rack 5608 (described above with reference to FIG. 56) may also be used to charge a battery associated with locking device 5702. As with other embodiments, locking device 5702 need not have wireless signal communication capability. For example, locking device 5702 may be configured to receive an access key via a barcode or QR code reader that is configured to read a barcode or QR code displayed by client device 5704.

Client device 5704 may be further configured to determine a date and time of helmet locking and unlocking to thereby monitor helmet use by users of scooter rentals. For example, in some cities/states, helmet use may be mandatory according to state and local laws. Information recorded by client device 5704 regarding helmet locking and unlocking may be used to track compliance with helmet use laws. In another example, helmet use may not be required by law but may be required by the scooter provider for compliance with insurance coverage.

Figure 58C:
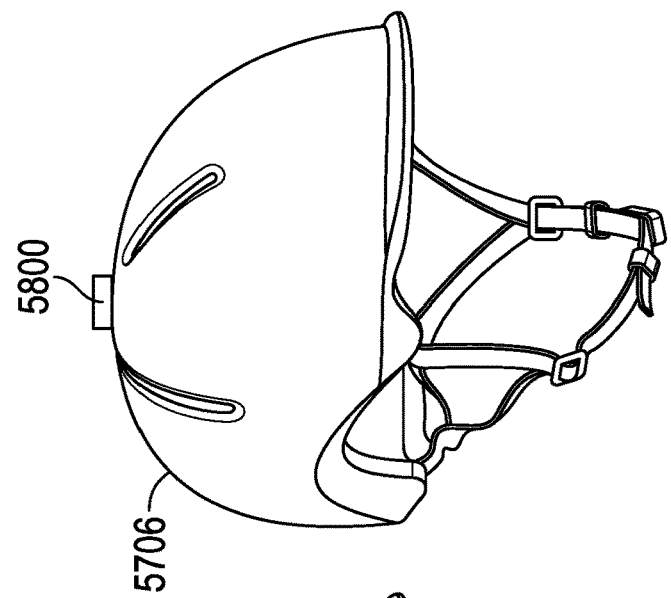
FIG. 58C illustrates a helmet having a locking device in a third configuration, according to an embodiment.
Figure 58B:
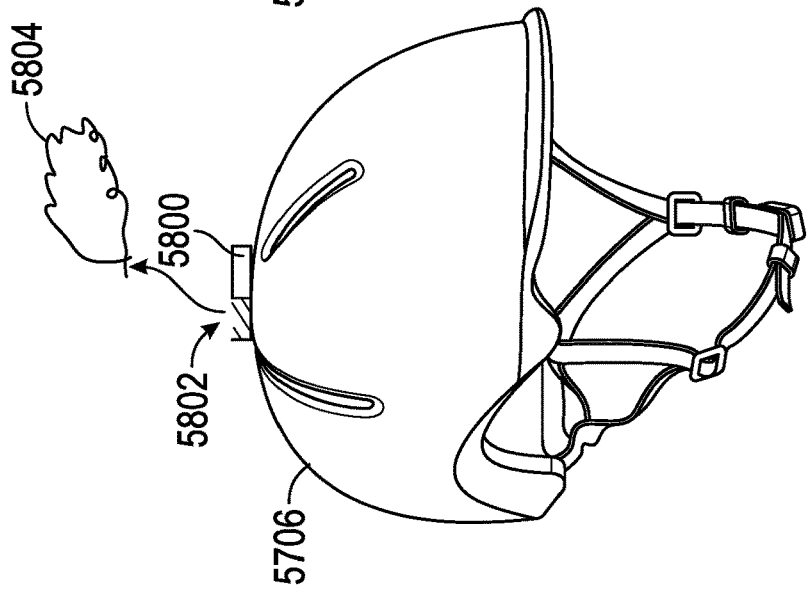
FIG. 58B illustrates a helmet having a locking device in a second configuration, according to an embodiment.
Figure 58A:
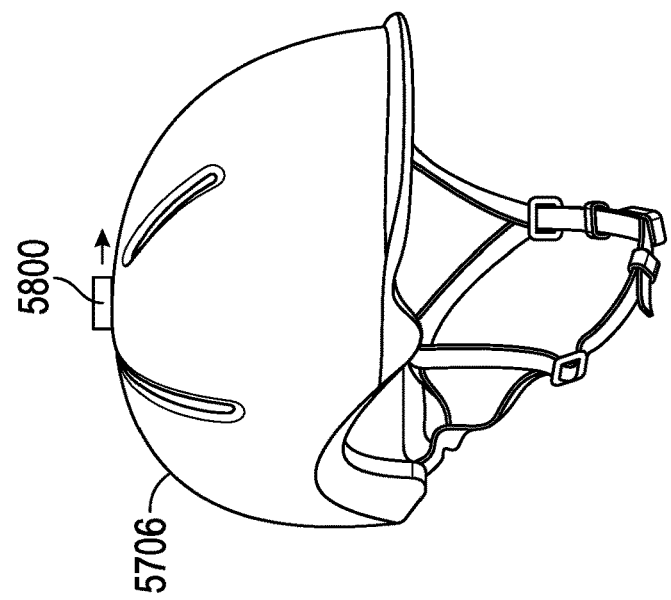
FIG. 58A illustrates a helmet having a locking device in a first configuration, according to an embodiment.

FIGS. 58A, 58B, and 58C illustrate a helmet 5706 having a locking device 5800 in various configurations, according to an embodiment. In this example, helmet 5706 includes a storage compartment 5802 (e.g., see FIG. 58B) that is locked by locking device 5800. Storage compartment 5802 may be provided with a plurality of disposable sterile helmet liners. Upon unlocking a scooter 5606 (e.g., see FIG. 56) from scooter rack 5608, a user may unlock helmet 5706 from scooter 5606 (e.g., see FIG. 57). A user may then use client device 5704 (e.g., see FIG. 57) to unlock locking device 5800. In this example, locking device 5800 may be associated with a lid of storage compartment 5802. As shown in FIG. 58B, storage compartment 5802 may be opened so that a disposable sterile helmet liner 5804 may be removed from helmet 5706. Once disposable sterile helmet liner 5804 has been removed, the lid may be re-closed and locked by locking device 5800, as shown in FIG. 58C. In this example, locking device 5800 is shown as being slidable to open storage compartment 5802. However, a lid to storage container 5802 may be configured to open in many different ways (e.g., to open by rotation about one or more hinges, etc.). In further embodiments, a disposable sterile helmet liner dispenser need not be associated with helmet 5706. Rather, a dispenser may be attached to scooter 5606, to scooter rack 5608, or may be attached to some other housing that is accessible to a user renting a scooter 5606.

Figure 59:
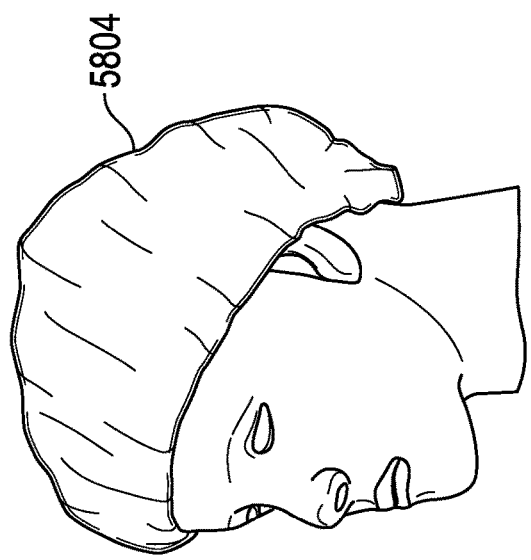
FIG. 59 illustrates placement of a disposable sterile helmet liner on a user's head, according to an embodiment.

FIG. 59 illustrates placement of disposable sterile helmet liner 5804 on a user's head, according to an embodiment. As described above, a user may retrieve helmet liner 5804 from compartment 5802 (e.g. see FIG. 58B) of helmet 5706 by unlocking locking device 5800 through interaction with a client device 5704 (e.g., see FIG. 57). Alternatively, a separate dispenser may be provided on scooter rack 5608 (not shown in FIG. 56), on scooter 5606, or on another structure. As with the dispenser provided on helmet 5706 (e.g., see FIGS. 58A to 58C), a client device 5704 may be used to unlock the separate dispenser provided on scooter rack 5608 or other structure. In the example of FIG. 59, disposable sterile helmet liner 5804 is first placed on a user's head before a helmet 5706 is placed on a user's head. In further embodiments, helmet liner 5804 may be configured to be first installed in helmet 5706 before helmet 5706 is placed on the user's head.

Client device 5704 (e.g., see FIG. 57) may record information regarding locking and unlocking of locking device 5800, or of locking and unlocking of another dispenser that provides helmet liners. Client device 5704 may further record information regarding use of disposable sterile helmet liners 5804 and communicate such information to a provider of helmet liners 5804. In this way, a provider may be informed of when it is time to replenish a supply of disposable sterile helmet liners 5804. Information regarding use of helmet liners (e.g., if a user takes more than one liner) may also be tracked by client device 5704. For example, a provider of helmet liners may choose to charge a fee per helmet liner used. Client device 5704 may thereby determine appropriate fees for helmet liner use based on the information regarding helmet liner use.

Figure 60:
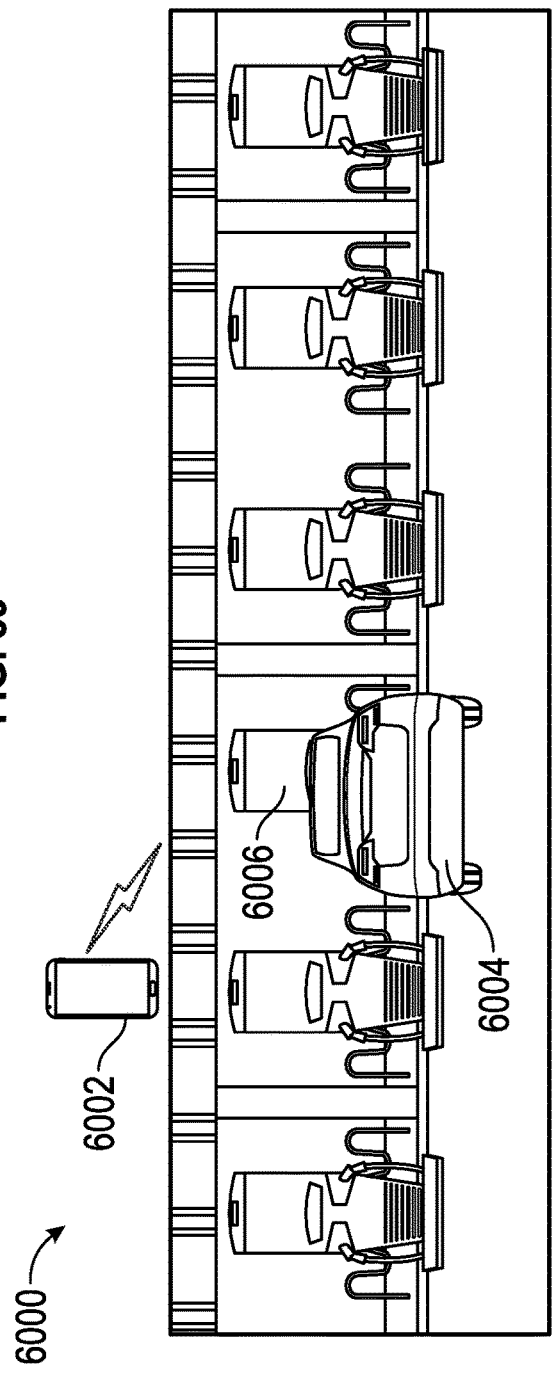
FIG. 60 illustrates an example environment in which a client device may interact with an electric motor vehicle charging station to charge a vehicle, according to an embodiment.

FIG. 60 illustrates an example environment 6000 in which a client device 6002 may interact with an electric motor vehicle 6004 charging station 6006, according to an embodiment. In this example, motor vehicle 6004 may be an electric vehicle that is parked near one of a plurality of electric vehicle charging stations 6006. Environment 6000 may be configured to operate in a completely self-service manner. As such, a user may use a client device 6002 to authorize charging of the vehicle via charging station 6006. As described above with reference to FIG. 11, or according to other methods, client device 6006 may establish a connection with charging station 6006, either directly or via communication with a server device (not shown). As such, client device 6002 may provide an access key to charging station 6006 to thereby initiate charging of vehicle 6004 by charging station 6006. Payment for the charging operation may then be processed by client device 6002 through interaction of client device 6002 with a server device (not shown) that may be configured to communicate with a user's bank account to process payments to an entity associated with electric vehicle charging station 6006. Alternatively, a computing device associated with charging station 6006 may be configured to process the payment via interaction with the server device.

Figure 61:
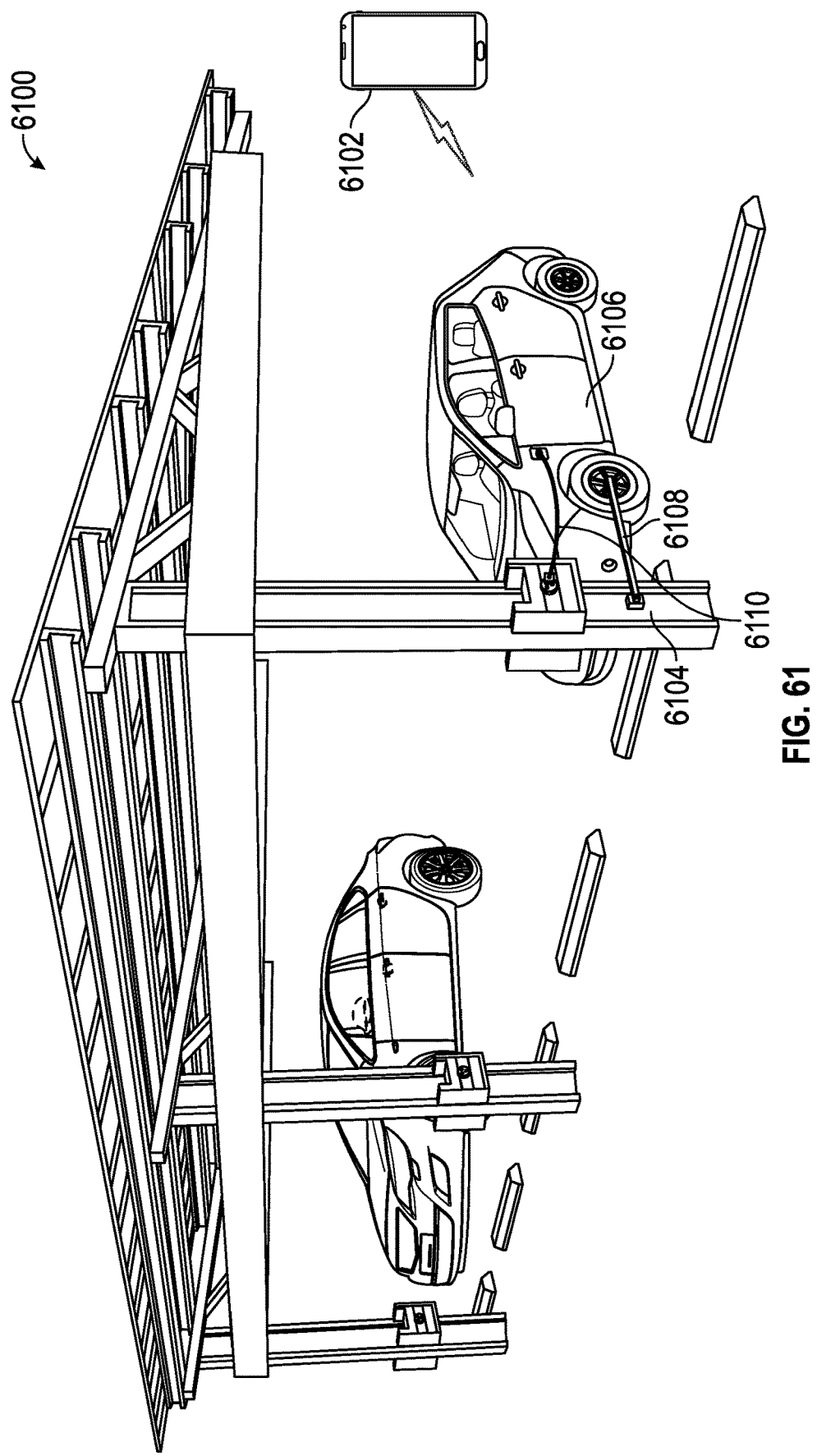
FIG. 61 illustrates a further example environment in which a client device may interact with an electric motor vehicle charging station to charge an electric vehicle, according to an embodiment.

FIG. 61 illustrates a further example environment 6100 in which a client device 6102 may interact with an electric motor vehicle charging station 6104 to charge an electric vehicle 6106, according to an embodiment. In this example, charging station 6104 may include a locking device 6108 that makes a mechanical connection with a vehicle wheel to thereby lock the vehicle to the charging station 6104. Charging station 6104 may further include a charging link

6110 that is configured to make an electrical connection with electric vehicle 6106. As in the example of FIG. 60, client device 6102 may interact with charging station 6104 to initiate charging of vehicle 6106 and to process payment for the charging operation. As with the examples described above with reference to FIGS. 55 and 56, electric vehicles 6106 may be provided as rental vehicles that may be rented from one location and returned to the same location or to a different location. Payment for the rental may be determined and processed by client device 6102, which may be configured to communicate with a user's bank account to process payments to an entity associated with an electric vehicle provider. For example, client device 6102 may be configured to communicate with a server device that is configured to process the payment. Alternatively, a computing device associated with charging station 6104 may be configured to communicate with the server device to process the payment.

In the examples of FIGS. 60 and 61, client devices 6002 and 6102 were configured to interact with facilities related to electric vehicles. In the first example, client device 6002 was configured to interact with electric vehicle charging station 6006, and in the second example, client device 6102 was configured to interact with charging station 6104. Further, in the second example, client device 6102 was configured to unlock locking device 6108. In further examples, mobile devices may interact directly with various vehicles, which may be electric vehicles or conventional vehicles. For example, a rental vehicle (electric or conventional) may simply be parked in a parking lot or along a street. A client device (e.g., client device 6002 or 6102) may be configured to interact with the vehicle to thereby unlock a door of the vehicle, to start/stop the vehicle, and to actuate various other functionality of the vehicle (e.g., to control a radio/audio system, a navigation system, to open/close windows, etc.). As described above in other examples, a rental start date/time may be determined based on when a client device interacts with one or more locking devices of the vehicle. Similarly, a rental end date/time may be determined when a client device re-locks the vehicle after use.

In further examples, the vehicle need not be a rental vehicle. For example, a client device may be configured to unlock and to control various functionality of a user's personal vehicle. Further, the vehicle may be configured to be locked/unlocked by various other client devices. For example, a family may have a plurality of client devices that are each configured to interact with one or more vehicles to lock/unlock the vehicles and to actuate various other functionality of the one or more vehicles (e.g., to control a radio/audio system, a navigation system, to open/close windows, etc.). Further, access to a given vehicle may be changed as desired by a user. For example, a vehicle user may grant temporary access to a vehicle to a third party (e.g., neighbor, relative from out of town, etc.). A user can further grant or limit access based on a daily, weekly, monthly schedule, etc. For example, a parent may configure a child's client device to allow the child to operate the vehicle only on certain days or at certain times.

Figure 62:
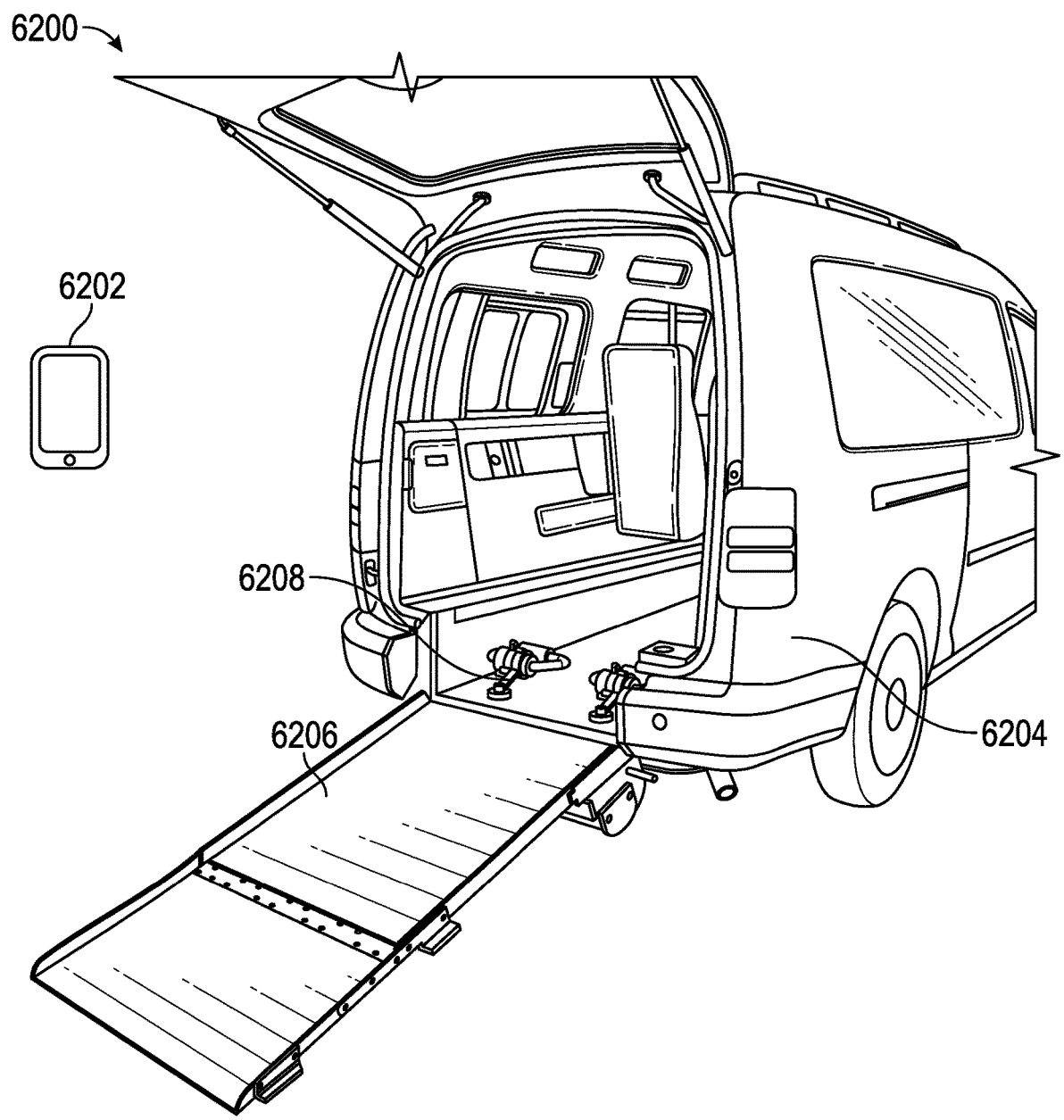
FIG. 62 illustrates an example environment in which a client device may interact with a motor vehicle, according to an embodiment.

FIG. 62 illustrates a further example environment 6200 in which a client device 6202 may interact with a motor vehicle 6204, according to an embodiment. Client device 6202 may be used instead of a conventional door key. As described earlier, client device 6202 may have a defined form factor, and may be embodied in or may include a smartphone, tablet computer, a wearable device, a key fob, a pocket card, etc. In this way, client device 6202 may provide an access key to one or more beacon devices (not shown) within motor vehicle 6204. As such, client device 6202 may be used to lock and unlock doors and/or to control various functionality of motor vehicle 6204. In this example, client device 6202 may be used do deploy a ramp 6206. Other accessories may be provided with motor vehicle 6204 that may be secured or deployed by using client device 6202. For example, motor vehicle 6204 may include a storage compartment 6208 that may be configured to store a portable cart, as described in greater detail with reference to FIGS. 63A, 63B, and 63C, below.

Figure 63C:
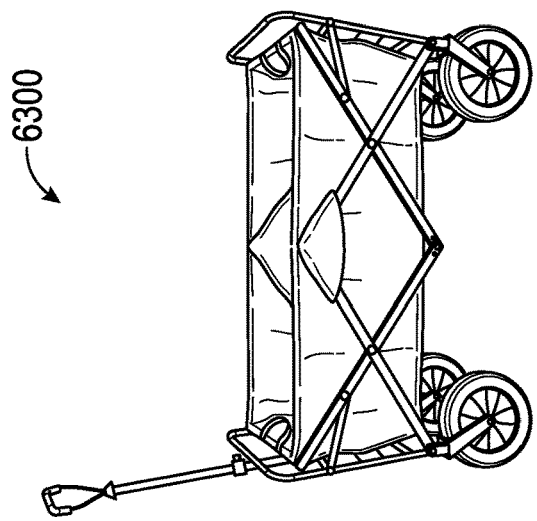
FIG. 63C illustrates the portable cart of FIGS. 63A and 63B, in a third configuration, according to an embodiment.
Figure 63B:
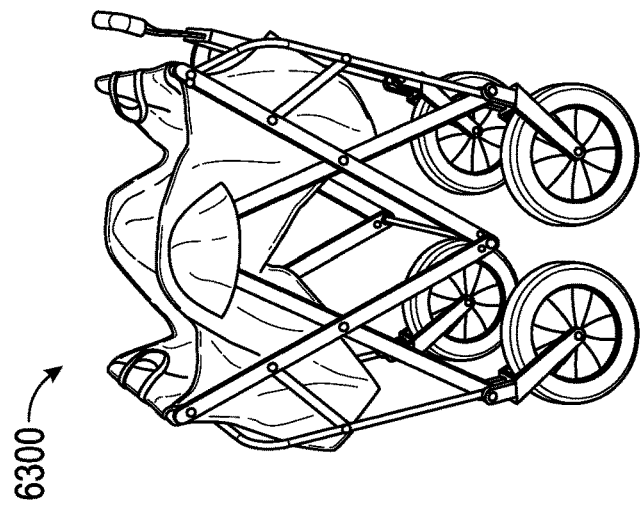
FIG. 63B illustrates the portable cart of FIG. 63A in a second configuration, according to an embodiment.
Figure 63A:
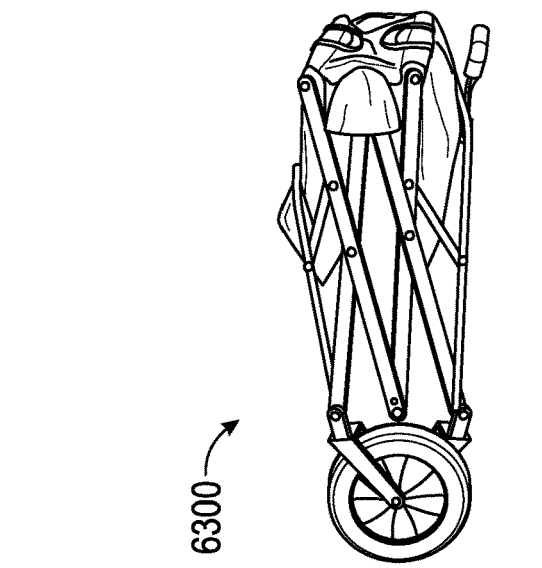
FIG. 63A illustrates a portable cart in a first configuration, according to an embodiment.

FIGS. 63A, 63B, and 63C illustrate a portable cart 6300 in three configurations, according to an embodiment. As described above, cart 6300 may be stored in a storage compartment 6208 of motor vehicle 6204 (e.g., see FIG. 62). Cart 6300 may be secured within motor vehicle 6204 using a locking device (not shown) that may be controlled by client device 6202. When the cart is needed for use, client device 6202 may be used to unlock the locking device. Cart 6300 may then be removed from storage compartment 6208. As shown in FIG. 63A, cart 6300 may have a first configuration that is a compact collapsed configuration. Such a collapsed configuration may be advantageous for easy storage of cart 6300 in storage compartment 6208 of vehicle 6204. As shown in FIG. 63B, cart may be expanded as shown in a second configuration. Once fully expanded, as shown in FIG. 63C, cart 6300 is ready for use. Cart 6300 may be conveniently employed for grocery shopping or for moving various items to and from motor vehicle 6204. Once a user is finished with use, cart 6300 may then be collapsed down to its compact configuration as shown in FIG. 63A. Once collapsed, cart 6300 may then be returned to storage compartment 6208 of vehicle 6204. Client device 6202 may then be used to activate locking of the locking device to thereby secure cart 6300 within storage compartment 6208.

Figure 64B:
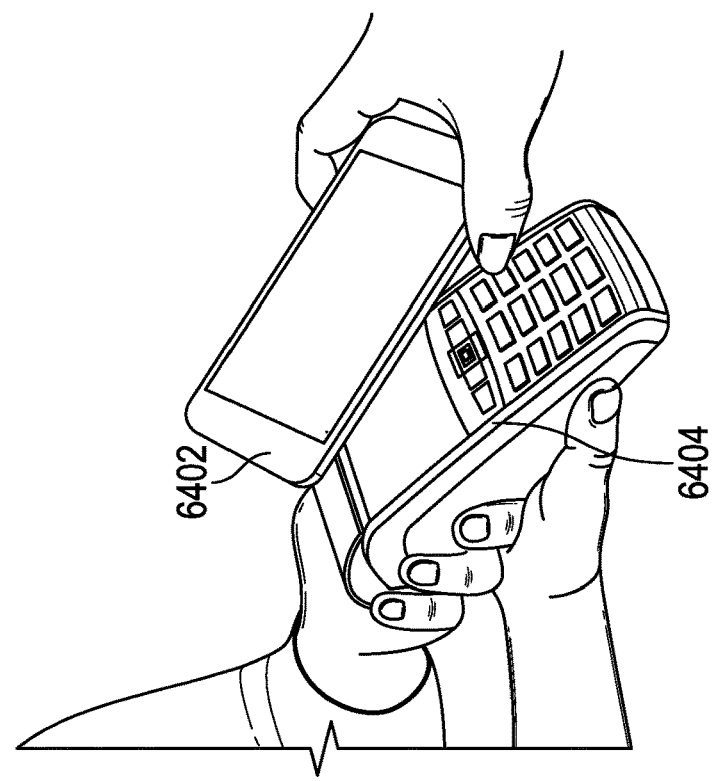
FIG. 64B illustrates a first computing device interacting with a second computing device to processes a purchase, according to an embodiment.
Figure 64A:
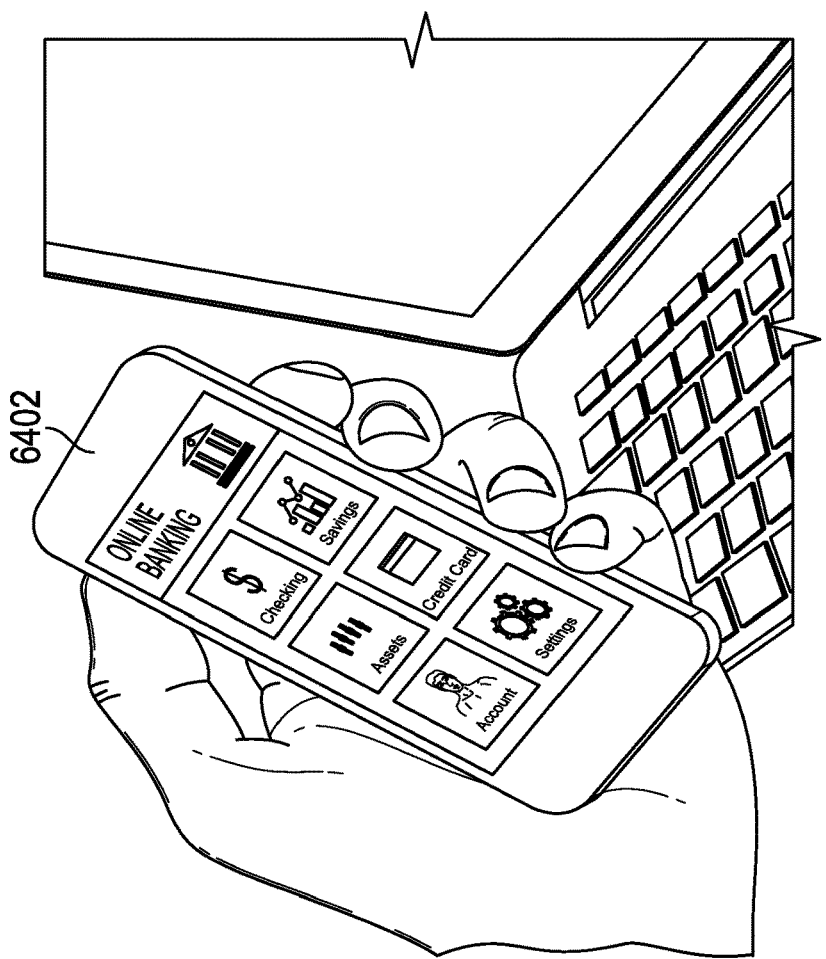
FIG. 64A illustrates a first computing device interacting with a second computing device to conduct financial transactions, according to an embodiment.

FIGS. 64A and 64B illustrate various computing devices that are configured to process financial and banking transactions, according to an embodiment. For example, a client device 6402 may be configured to run the MyCard™ mobile app. The MyCard™ mobile app stores and processes various access keys that may be used with various locking devices, as described above, for example, with reference to FIGS. 1, 2, 11, 55 to 58, and 60 to 62. In this way, a client device running the MyCard™ mobile app may control locking and unlocking of locking devices associated with bicycles, scooters, shopping carts, pushcarts, accessories (e.g., bicycle/scooter helmet, helmet liner), etc. The MyCard™ mobile app may further be configured to process payments and other financial transactions associated with various locking devices. For example, as described above, the MyCard™ mobile app may be used to process payment for bicycle rentals, scooter rentals, car rentals, electric car charging, etc. In this way, client device 6402 may be configured, through the MyCard™ mobile app, to functionally couple a user's banking information with a merchant's banking information to thereby process electronic payments. Payment may be processed via interactions between client device 6402 and a server device, or directly with a merchant device 6404, as shown in FIG. 64B, for example.

A user running the MyCard™ mobile app on a client device 6402 may thereby process payments through an application programming interface (API) that includes a Gateway that is configured to couple the user, running the MyCard™ mobile app, to various other users (e.g., merchants) who may or may not be running the MyCard™ mobile app. For example, a user may have checking account information tied to the MyCard™ mobile app. Use of the MyCard™ mobile app then allows a user to process a transfer of funds from the user's checking account to a receiving account tied to a merchant (e.g., a store, a gas station, etc.), without the need for the recipient of funds to be running the MyCard™ mobile or web app.

FIGS. 65A, 65B, and 65C illustrate ways in which a client device 6502 may be triggered to display enhanced content by scanning a barcode or QR code 6504, according to an embodiment. In this example, a user may scan or photograph the barcode or QR code 6504 (e.g., see FIG. 65B) using a client device 6502, as shown in FIG. 65A. The MyCard™ mobile app, running on client device 6502, may then be triggered to process information retrieved from the barcode or QR code 6504 to then retrieve enhanced content that may be displayed on a GUI 6506 of client device 6502, for example, as shown in FIG. 65C. In this example, the consumer product is a coffee cup 6508 with a barcode or QR code 6504 displayed on the cup 6508. The enhanced content displayed on the GUI 6506, in this example, is a coupon that may be used to provide a discount on the purchase of the consumer product. For example, when the consumer purchases the product 6508, the displayed coupon may be provided to a merchant device 6404, as shown in FIG. 64B, for example. In this regard, the merchant device 6404 (e.g., see FIG. 54B) may scan the coupon displayed on the client device 6502 to thereby process a discount on the purchase price of the consumer product 6508. In other embodiments, enhanced content may take many other forms. For example, enhanced content may include images, graphics, videos, celebrity testimonials, etc.

In other embodiments, client devices (e.g., client devices 6402 and 6502 of FIGS. 64A to 65C) may receive enhanced content in various other ways. For example, rather than scanning a barcode or QR code, client devices may interact with consumer products, displays, kiosks, etc., via RFID, Bluetooth, NCF radio technologies, or other radio technologies (e.g., ZigBee, etc.). The MyCard™ mobile app may be further configured to allow users to control the receipt of enhanced content, advertising, etc. For example, the MyCard™ mobile app may have a utility that allows users to set preferences regarding visibility of client devices and to change a degree to which client devices allow or block enhanced content triggered by interaction of client devices with other devices, products, etc.

The MyCard™ mobile app may further receive digital receipts from a merchant device 6404 (e.g., see FIG. 64B) upon completion of a digital transaction. Such receipts may be stored on a "receipt page" in the MyCard™ mobile app. Digital receipts may be further be emailed to one or more recipients, saved on a client device 6402 (e.g., see FIGS. 64A and 64B), stored on a server device (e.g., using a cloud based computing infrastructure), or may be deleted. Digital receipts may be received from merchant device 6404 in various ways. For example, a digital receipt may be displayed on merchant device 6404 so that the receipt may be scanned or photographed by client device 6402. In other embodiments, digital receipts may be received wirelessly from merchant device 6404 via an exchange of wireless signals between merchant device 6404 and client device 6402. As described above, merchant device 6404 may or may not be configured to run the MyCard™ mobile app. Alternatively, receipts may be received from a server device that interacts with both merchant device 6404 and client device 6402.

In further embodiments, the MyCard™ mobile app may control and process access to other goods and services. For example, transportation fares (e.g., bus, train, airline, etc.) may be processed using a client device running the MyCard™ mobile app. In this regard, a client device may display a barcode or QR code that may be read/scanned by a barcode or QR code reader on a bus to process a fare for a user to ride a bus. In other embodiments, an access key may be provide to a receiving device on the bus via exchange of wireless signals between the client device and the receiving device, or via a server device that interacts with both the client device and the receiving device. The MyCard™ mobile app may be configured to manage an account associated with a specific mode of transportation.

For example, a regular train/bus rider may set up an account with a certain amount of money to cover transportation fares for a certain period of time (e.g., weekly, monthly, yearly, etc.). Each time the client device running the MyCard™ mobile app interacts with a receiving device of the train/bus to grant transportation access to the user, the MyCard™ mobile app may process a payment for a corresponding fare. As such, an amount of money corresponding to the fare may be deducted from the user's account. The MyCard™ mobile app may then be configured to provide an up-to-date balance of the user's account. In alternative embodiments, a user may pay a certain fee to be granted access to a mode of transportation for a given time period (e.g., daily, weekly, monthly, yearly, etc.). As such, payments would be processed only at designated intervals and the MyCard™ mobile app would provide validated transportation access during time periods for which corresponding payments have been processed.

In further embodiments, the MyCard™ mobile app may be configured to manage and control various other types of accounts that may be used to process financial transactions. For example, for users who receive money from government assistance programs to buy food/groceries, etc., may have an account set up and managed by the MyCard™ mobile app. In this way, MyCard™ mobile app may facilitate transactions between a user and a merchant such that payments to the merchant are transferred from the user's bank account, credit card, pre-paid debit card, etc., to the merchant's account.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions may be read or otherwise accessed and executed by one or more processors to perform or permit the performance of the operations described herein. The instructions may be provided in any suitable form, such as source code, compiled code, interpreted code, executable code, static code, dynamic code, assembler code, combinations of the foregoing, etc. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media may include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It may be understood that each block of the block diagrams and flowchart illustrations, and combinations of blocks in the block diagrams and flowchart illustrations, respectively, may be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks may be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, etc.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device may be a component. One or more components may reside within a process and/or thread of execution. A component may be localized on one computing device or distributed between two or more computing devices. As described herein, a component may execute from various computer-readable non-transitory media having various data structures stored thereon. Components may communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component may be an apparatus with specific functionality provided by mechanical parts operated by electric or electronic circuitry that is controlled by a software application or firmware application executed by a processor, wherein the processor may be internal or external to the apparatus and may execute at least a part of the software or firmware application. As yet another example, a component may be an apparatus that provides specific functionality through electronic components without mechanical parts, and the electronic components may include a processor therein to execute software or firmware that provides, at least in part, the functionality of the electronic components. In certain embodiments, components may communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components may communicate or otherwise be coupled via thermal, mechanical, electrical, and/or electromechanical coupling mechanisms (such as conduits, connectors, combinations thereof, etc.). An interface may include input/output (I/O) components as well as associated processors, applications, and/or other programming components. The terms "component," "environment," "system," "architecture," "interface," "unit," "module," and "pipe" may be utilized interchangeably and may be referred to collectively as functional elements.

As utilized in this disclosure, the term "processor" may refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor may refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor may be implemented as a combination of computing processing units. In certain embodiments, processors may utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It may be appreciated that the memory components or memories described herein embody or comprise non-transitory computer storage media that may be readable or otherwise accessible by a computing device. Such media may be implemented in any methods or technology for storage of information such as computer-readable instructions, information structures, program modules, or other information objects. The memory components or memories may be either volatile memory or non-volatile memory, or may include both volatile and non-volatile memory. In addition, the memory components or memories may be removable or non-removable, and/or internal or external to a computing device or component. Examples of various types of non-transitory storage media may include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which may be accessed by a computing device.

As an illustration, non-volatile memory may include read only memory (ROM), programmable ROM (PROM), electrically programmable ROM (EPROM), electrically erasable programmable ROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that may provide access control and/or identification of user devices. It is, of course, not possible to describe every conceivable combination of elements and/or methods for purposes of describing the various features of the disclosure, but it may be recognized that many further combinations and permutations of the disclosed features are possible. Accordingly, it may be apparent that various modifications may be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A computing system, comprising:
a processor circuit configured to perform operations including:
generating a user-profile including one or more access rules governing a user's access rights to one or more respective point-of-entry devices associated with one or more respective rental vehicles;
transmitting the user-profile to a user's mobile computing device;
receiving a communication from the user's mobile computing device or from a first point-of-entry device, the communication indicating a successful or unsuccessful attempt to unlock the first point-of-entry device to thereby access a rental vehicle using an access key provided to the first point-of-entry device by the user's mobile computing device, the access key based on the user-profile;
generating and storing a record of the successful or unsuccessful attempt to unlock the first point-of-entry device;
when an attempt to unlock the first point-of-entry device is successful:
generating a date/time record of the successful unlocking of the first point-of-entry device;
receiving a communication from the user's mobile computing device or from the first point-of-entry device or from a second point-of-entry device indicating that the rental vehicle was returned and successfully locked by the first or second point-of-entry device; and
generating a date/time record of the successful locking of the first or second point-of-entry device.

2. The computing system of claim 1, wherein the processor circuit is further configured to perform operations including:
determining a payment due for usage of the rental vehicle based on the recorded date/time records unlocking the first point-of-entry device and locking of the first or second point-of-entry device; and
processing a payment for usage of the rental vehicle to thereby transmit a payment from a user's account to a receiving account associated with a provider of the rental vehicle.

3. The computing system of claim 1, wherein each of the one or more rental vehicles is an electrically powered vehicle having a battery, and the one or more point-of-entry devices are part of a housing structure, which secures the rental vehicles while locked and provides a power source to the electrically powered vehicles,
wherein the processor circuit is configured to perform further operations including:
receiving a communication from a communication device associated with the housing structure providing information regarding a charge state of each of the one or more electrically powered vehicles; and
sending a communication to the user's mobile computing device providing information regarding the charge state of each of the one or more electrically powered vehicles.

4. The computing system of claim 1, wherein the rental vehicle is bicycle or scooter having a third point-of-entry device that is configured to removably secure a helmet to the rental vehicle or to a helmet housing structure,
wherein the processor circuit is further configured to perform operations including:
receiving a communication from the user's mobile computing device or from the third point-of-entry device, the communication indicating a successful or unsuccessful attempt to unlock the third point-of-entry device to thereby access the helmet;
generating and storing a record of the successful or unsuccessful attempt to unlock the third point-of-entry device;
when an attempt to unlock the third point-of-entry device is successful:
generating a date/time record of the successful unlocking of the third point-of-entry device;
receiving a communication from the user's mobile computing device or from the third point-of-entry device that the helmet was returned and successfully locked by the third point-of-entry device; and
generating a date/time record of the successful locking of the third point-of-entry device.

5. The computing system of claim 4, wherein the rental vehicle, helmet, or other housing structure, includes a helmet liner dispenser that is secured by a fourth point-of-entry device, wherein the processor circuit is further configured to perform operations including:
receiving a communication from the user's mobile computing device or from the fourth point-of-entry device, the communication indicating a successful or unsuccessful attempt to unlock the fourth point-of-entry device to thereby access one or more helmet liners from the helmet liner dispenser;
generating and storing a record of the successful or unsuccessful attempt to unlock the fourth point-of-entry device;
when an attempt to unlock the fourth point-of-entry device is successful:
generating a date/time record of the successful unlocking of the fourth point-of-entry device;
determining that one or more helmet liners were removed from the helmet liner dispenser; and
determining a supply of helmet liners in the dispenser based on an initial supply of helmet liners in the dispenser and a number of helmet liners removed from the helmet liner dispenser.

6. A processor implemented method of controlling access to one or more rental vehicles, the method comprising:
generating, by processor circuit, a user-profile including one or more access rules governing a user's access rights to one or more respective point-of-entry devices associated with one or more respective rental vehicles;
transmitting the user-profile to a user's mobile computing device;
receiving a communication from the user's mobile computing device or from a first point-of-entry device, the communication indicating a successful or unsuccessful attempt to unlock the first point-of-entry device to thereby access a rental vehicle using an access key provided to the first point-of-entry device by the user's mobile computing device, the access key based on the user-profile;
generating and storing a record of the successful or unsuccessful attempt to unlock the first point-of-entry device;
when an attempt to unlock the first point-of-entry device is successful:
generating a date/time record of the successful unlocking of the first point-of-entry device;
receiving a communication from the user's mobile computing device or from the first point-of-entry device or from a second point-of-entry device indicating that the rental vehicle was returned and successfully locked by the first or second point-of-entry device; and
generating a date/time record of the successful locking of the first or second point-of-entry device.

7. The method of claim 6, the method further comprising:
determining, by the processor circuit, a payment due for usage of the rental vehicle based on the recorded date/time records unlocking the first point-of-entry device and locking of the first or second point-of-entry device; and
processing a payment for usage of the rental vehicle to thereby transmit a payment from a user's account to a receiving account associated with a provider of the rental vehicle.

8. The method of claim 6, wherein each of the one or more rental vehicles is an electrically powered vehicle having a battery, and the one or more point-of-entry devices are part of a housing structure, which secures the rental vehicles while locked and provides a power source to the electrically powered vehicles, the method further comprising:
receiving a communication from a communication device associated with the housing structure providing information regarding a charge state of each of the one or more electrically powered vehicles; and
sending a communication to the user's mobile computing device providing information regarding the charge state of each of the one or more electrically powered vehicles.

9. The method of claim 6, wherein the rental vehicle is bicycle or scooter having a third point-of-entry device that is configured to removably secure a helmet to the rental vehicle or to a helmet housing structure, the method further comprising:
receiving, by the processor circuit, a communication from the user's mobile computing device or from the third point-of-entry device, the communication indicating a successful or unsuccessful attempt to unlock the third point-of-entry device to thereby access the helmet;
generating and storing a record of the successful or unsuccessful attempt to unlock the third point-of-entry device;
when an attempt to unlock the third point-of-entry device is successful:
generating a date/time record of the successful unlocking of the third point-of-entry device;
receiving a communication from the user's mobile computing device or from the third point-of-entry device that the helmet was returned and successfully locked by the third point-of-entry device; and
generating a date/time record of the successful locking of the third point-of-entry device.

10. The method of claim 9, wherein the rental vehicle, helmet, or other housing structure, includes a helmet liner dispenser that is secured by a fourth point-of-entry device, the method further comprising:
receiving, by the processor circuit, a communication from the user's mobile computing device or from the fourth point-of-entry device, the communication indicating a successful or unsuccessful attempt to unlock the fourth point-of-entry device to thereby access a helmet liner from the helmet liner dispenser;
generating and storing a record of the successful or unsuccessful attempt to unlock the fourth point-of-entry device;
when an attempt to unlock the fourth point-of-entry device is successful:
generating a date/time record of the successful unlocking of the fourth point-of-entry device;
determining that one or more helmet liners was removed from the helmet liner dispenser; and
determining a supply of helmet liners in the dispenser based on an initial supply of helmet liners in the dispenser and a number of helmet liners removed from the helmet liner dispenser.

11. A mobile computing device, comprising:
a processor circuit configured to perform operations including:
receiving, from an external computing device, a user-profile including one or more access rules governing a user's access rights to one or more respective point-of-entry devices associated with one or more respective rental vehicles;
transmitting an access key to a first point-of-entry device to thereby attempt to unlock the first point-of-entry device to access a rental vehicle;

receiving, from the first point-of-entry or from the external computing device, a communication indicating that the attempt to unlock the first point-of-entry device was successful or unsuccessful;

when an attempt to unlock the first point-of-entry device is successful:

after use of the rental vehicle, transmitting a communication to the first point-of-access device or to a second point of entry device to thereby lock the first or second point-of-access device to secure the rental vehicle to the first or second point-of-access device; and receiving, from the first or second point-of-entry device or from the external computing device, a communication indicating that the rental vehicle was returned and successfully locked by the first or second point-of-entry device.

12. The mobile computing device of claim 11, wherein the processor circuit is further configured to perform operations including:

generating a date/time record of the successful attempt to unlock the first point-of-entry device when the rental vehicle is accessed;

generating a date/time record of the successful locking of the first or second point-of-entry device when the rental vehicle is returned; and sending, to the external computing device, instructions to process a payment for usage of the rental vehicle to instruct the external computing device to transmit a payment from a user's account to a receiving account associated with a provider of the rental vehicle, wherein the mobile computing device or the external computing device is configured to determine an amount of the payment based on the recorded date/time records unlocking the first point-of-entry device and locking of the first or second point-of-entry device.

13. The mobile computing device of claim 11, wherein each of the one or more rental vehicles is an electrically powered vehicle having a battery, and the one or more point-of-entry devices are part of a housing structure, which secures the rental vehicles while locked and provides a power source to the electrically powered vehicles, wherein the processor circuit is configured to perform further operations including:

receiving a communication from a communication device associated with the housing structure or from the external computing device, the communication providing information regarding a charge state of the one or more electrically powered vehicles;

displaying, on a graphical user device (GUI) of the user's mobile computing device, information regarding the charge state of the one or more electrically powered vehicles, the information indicating one or more selectable vehicles that are sufficiently charged;

receiving a user selection of a rental vehicle that is sufficiently charged and that is secured by the first point-of-entry device; and transmitting the access key to the first point-of-entry device based on the user selection.

14. The mobile computing device of claim 11, wherein each of the one or more rental vehicles is bicycle or scooter having a third point-of-entry device that is configured to removably secure a helmet, that may be used by the user of the rental vehicle, to the rental vehicle or to a helmet housing structure, wherein the processor circuit is further configured to perform operations including:

transmitting an access key to the third point-of-entry device to thereby attempt to unlock the third point-of-entry device to access the helmet;

receiving, from the third point-of-entry or from the external computing device, a communication indicating that the attempt to unlock the third point-of-entry device was successful or unsuccessful;

when an attempt to unlock the third point-of-entry device is successful:

after use of the helmet, transmitting a communication to the third point-of-access device to thereby lock the third point-of-access device to thereby secure the helmet to the rental vehicle; and receiving, from the third point-of-entry device or from the external computing device, a communication indicating that the helmet was returned and successfully locked by the third point-of-entry device.

15. The mobile computing device of claim 11, wherein each of the one or more rental vehicles includes a fourth point-of-entry device, wherein the fourth point-of-entry device is configured as one of:

a door lock for a motor vehicle;

a lock for a storage compartment of a motor vehicle; and a lock for a helmet liner dispenser provided on a bicycle or scooter, on a helmet for a bicycle or scooter, or on another housing structure, wherein the processor circuit is further configured to perform operations including:

transmitting an access key to the fourth point-of-entry device to thereby attempt to unlock the fourth point-of-entry device;

receiving, from the fourth point-of-entry or from the external computing device, a communication indicating that the attempt to unlock the fourth point-of-entry device was successful or unsuccessful;

when an attempt to unlock the fourth point-of-entry device is successful:

transmitting a communication to the fourth point-of-access device to thereby lock the fourth point-of-access device; and receiving, from the fourth point-of-entry device or from the external computing device, a communication indicating that the fourth point-of-entry device was successfully locked.

16. A processor implemented method, comprising:

receiving, by a processor circuit from an external computing device, a user-profile including one or more access rules governing a user's access rights to one or more respective point-of-entry devices associated with one or more respective rental vehicles;

transmitting an access key to a first point-of-entry device to thereby attempt to unlock the first point-of-entry device to access a rental vehicle;

receiving, from the first point-of-entry or from the external computing device, a communication indicating that the attempt to unlock the first point-of-entry device was successful or unsuccessful;

when an attempt to unlock the first point-of-entry device is successful:

after use of the rental vehicle, transmitting a communication to the first point-of-access device or to a second point of entry device to thereby lock the first or second point-of-access device to secure the rental vehicle to the first or second point-of-access device; and receiving, from the first or second point-of-entry device or from the external computing device, a communication indicating that the rental vehicle was returned and successfully locked by the first or second point-of-entry device.

17. The method of claim 16, further comprising:
generating, by the processor circuit, a date/time record of the successful attempt to unlock the first point-of-entry device when the rental vehicle is accessed;
generating a date/time record of the successful locking of the first or second point-of-entry device when the rental vehicle is returned; and
sending, to the external computing device, instructions to process a payment for usage of the rental vehicle to instruct the external computing device to transmit a payment from a user's account to a receiving account associated with a provider of the rental vehicle,
wherein the mobile computing device or the external computing device is configured to determine an amount of the payment based on the recorded date/time records unlocking the first point-of-entry device and locking of the first or second point-of-entry device.

18. The method of claim 16, wherein each of the one or more rental vehicles is an electrically powered vehicle having a battery, and the one or more point-of-entry devices are part of a housing structure, which secures the rental vehicles while locked and provides a power source to the electrically powered vehicles, the method further comprising:
receiving, by the processor circuit, a communication from a communication device associated with the housing structure or from the external computing device, the communication providing information regarding a charge state of the one or more electrically powered vehicles;
displaying, on a graphical user device (GUI) of the user's mobile computing device, information regarding the charge state of the one or more electrically powered vehicles, the information indicating one or more selectable vehicles that are sufficiently charged;
receiving a user selection of a rental vehicle that is sufficiently charged and that is secured by the first point-of-entry device; and
transmitting the access key to the first point-of-entry device based on the user selection.

19. The method of claim 16, wherein the rental vehicle is bicycle or scooter having a third point-of-entry device that is configured to removably secure a helmet to the rental vehicle or to a helmet housing structure, the method further comprising:
transmitting, by the processor circuit, an access key to the third point-of-entry device to thereby attempt to unlock the third point-of-entry device to access the helmet;
receiving, from the third point-of-entry or from the external computing device, a communication indicating that the attempt to unlock the third point-of-entry device was successful or unsuccessful;
when an attempt to unlock the third point-of-entry device is successful:
after use of the helmet, transmitting a communication to the third point-of-access device to thereby lock the third point-of-access device to thereby secure the helmet to the rental vehicle; and
receiving, from the third point-of-entry device or from the external computing device, a communication indicating that the helmet was returned and successfully locked by the third point-of-entry device.

20. The method of claim 16, wherein each of the one or more rental vehicles includes a fourth point-of-entry device, wherein the fourth point-of-entry device is configured as one of:
a door lock for a motor vehicle;
a lock for a storage compartment of a motor vehicle; and
a lock for a helmet liner dispenser provided on a bicycle or scooter, on a helmet for a bicycle or scooter, or on another housing structure, the method further comprising:
transmitting, by the processor circuit, an access key to the fourth point-of-entry device to thereby attempt to unlock the fourth point-of-entry device;
receiving, from the fourth point-of-entry or from the external computing device, a communication indicating that the attempt to unlock the fourth point-of-entry device was successful or unsuccessful;
when an attempt to unlock the fourth point-of-entry device is successful:
transmitting a communication to the fourth point-of-access device to thereby lock the fourth point-of-access device; and
receiving, from the fourth point-of-entry device or from the external computing device, a communication indicating that the fourth point-of-entry device was successfully locked.

* * * * *